US012335807B2

(12) United States Patent
Koga et al.

(10) Patent No.: US 12,335,807 B2
(45) Date of Patent: Jun. 17, 2025

(54) ACTIVE TRUCK TRACKING AND ALERTS FOR RESIDENTIAL REFUSE CAN COLLECTION

(71) Applicant: OSHKOSH CORPORATION, Oshkosh, WI (US)

(72) Inventors: Jeffrey Koga, Oshkosh, WI (US); Emily Davis, Rochester, MN (US); Jerrod Kappers, Oshkosh, WI (US); Vince Schad, Oshkosh, WI (US); Robert S. Messina, Oshkosh, WI (US); Christopher K. Yakes, Oshkosh, WI (US); Joshua D. Rocholl, Rochester, MN (US); Vincent Hoover, Byron, MN (US); Clinton T. Weckwerth, Pine Island, MN (US); Zachary L. Klein, Rochester, MN (US); John Beck, Oshkosh, WI (US); Brendan Chan, Oshkosh, WI (US); Skylar A. Wachter, Dodge Center, MN (US); Dale Matsumoto, Oshkosh, WI (US); Bryan S. Datema, Rochester, MN (US); Cody D. Clifton, Oshkosh, WI (US); Zhenyi Wei, Oshkosh, WI (US); Kevin Dunn, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 42 days.

(21) Appl. No.: 17/232,855

(22) Filed: Apr. 16, 2021

(65) Prior Publication Data

US 2021/0345062 A1 Nov. 4, 2021

Related U.S. Application Data

(60) Provisional application No. 63/011,586, filed on Apr. 17, 2020.

(51) Int. Cl.
*H04W 4/021* (2018.01)
*G06Q 50/26* (2024.01)
(Continued)

(52) U.S. Cl.
CPC ............ *H04W 4/021* (2013.01); *G06Q 50/26* (2013.01); *H04W 4/029* (2018.02); *H04W 4/12* (2013.01)

(58) Field of Classification Search
CPC ....... H04W 4/021; H04W 4/029; H04W 4/02; H04W 4/12; H04W 4/023; H04W 64/00;
(Continued)

(56) References Cited

U.S. PATENT DOCUMENTS 4,276,975 A 7/1981 Jenkins
5,378,010 A 1/1995 Marino et al.
(Continued)

FOREIGN PATENT DOCUMENTS

CN 204238563 U 4/2015
EP 2 357 486 A1 8/2011
(Continued)

*Primary Examiner* — Alison Slater
*Assistant Examiner* — Jing Gao
(74) *Attorney, Agent, or Firm* — FOLEY & LARDNER LLP

(57) ABSTRACT

A system for tracking refuse collection vehicles includes one or more memory devices having instructions stored thereon that, when executed by one or more processors, cause the one or more processors to perform operations including receiving, from a user device, a first user input indicating one or more parameters of a geofence, the geofence defining a virtual perimeter around a geographical location, determining whether the refuse collection vehicle is within the virtual perimeter of the geofence based on a current location of the refuse collection vehicle, and transmitting, to the user device, a first notification based on a determination that the
(Continued)

refuse collection vehicle is within the geofence, the first notification indicating to a user of the user device that the refuse collection vehicle is within the geofence.

18 Claims, 22 Drawing Sheets

(51) Int. Cl.
*H04W 4/029* (2018.01)
*H04W 4/12* (2009.01)

(58) Field of Classification Search
CPC ....... H04W 4/90; H04W 4/027; H04W 4/025; H04W 12/64; H04W 84/12; H04W 4/33; H04W 4/024; H04W 64/003; H04W 48/04; H04W 88/02; H04W 68/00; H04W 4/38; H04W 12/63; H04W 8/005; H04W 60/04; H04W 36/32; H04W 28/0226; G06Q 30/0261; G06Q 30/02; G06Q 50/28; G06Q 50/26
See application file for complete search history.

(56) References Cited

U.S. PATENT DOCUMENTS

| | | |
|---|---|---|
| 5,640,996 A | 6/1997 | Schlecht et al. |
| 5,823,218 A | 10/1998 | Schlecht et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | Mcneilus et al. |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | Mcneilus et al. |
| 6,105,984 A | 8/2000 | Schmitz et al. |
| 6,120,235 A | 9/2000 | Humphries et al. |
| 6,123,500 A | 9/2000 | Mcneilus et al. |
| 6,202,013 B1 | 3/2001 | Anderson et al. |
| 6,210,094 B1 | 4/2001 | Mcneilus et al. |
| 6,213,706 B1 | 4/2001 | Christenson |
| 6,224,318 B1 | 5/2001 | Mcneilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,390,758 B1 | 5/2002 | Mcneilus et al. |
| 6,421,593 B1 | 7/2002 | Kempen et al. |
| 6,447,239 B2 | 9/2002 | Young et al. |
| 6,474,928 B1 | 11/2002 | Christenson |
| 6,516,914 B1 | 2/2003 | Andersen et al. |
| 6,565,305 B2 | 5/2003 | Schrafel |
| 6,757,597 B2 | 6/2004 | Yakes et al. |
| 6,862,509 B2 | 3/2005 | Rau et al. |
| 6,882,917 B2 | 4/2005 | Pillar et al. |
| 6,883,532 B2 | 4/2005 | Rau |
| 6,885,920 B2 | 4/2005 | Yakes et al. |
| 6,909,944 B2 | 6/2005 | Pillar et al. |
| 6,922,615 B2 | 7/2005 | Pillar et al. |
| 6,993,421 B2 | 1/2006 | Pillar et al. |
| 7,006,902 B2 | 2/2006 | Archer et al. |
| 7,011,108 B2 | 3/2006 | Benckert et al. |
| 7,024,296 B2 | 4/2006 | Squires et al. |
| 7,070,382 B2 | 7/2006 | Pruteanu et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,188,991 B1 | 3/2007 | Weiler |
| 7,254,468 B2 | 8/2007 | Pillar et al. |
| 7,274,976 B2 | 9/2007 | Rowe et al. |
| 7,277,782 B2 | 10/2007 | Yakes et al. |
| 7,284,943 B2 | 10/2007 | Pruteanu et al. |
| 7,302,320 B2 | 11/2007 | Nasr et al. |
| 7,357,203 B2 | 4/2008 | Morrow et al. |
| 7,379,797 B2 | 5/2008 | Nasr et al. |
| 7,392,122 B2 | 6/2008 | Pillar et al. |
| 7,448,460 B2 | 11/2008 | Morrow et al. |
| 7,520,354 B2 | 4/2009 | Morrow et al. |
| 7,555,369 B2 | 6/2009 | Pillar et al. |
| 7,556,468 B2 | 7/2009 | Grata |
| 7,559,735 B2 | 7/2009 | Pruteanu et al. |
| 7,578,379 B2 | 8/2009 | Gillmore et al. |
| 7,648,015 B2 | 1/2010 | Gillmore et al. |
| 7,657,355 B2 | 2/2010 | Rau et al. |
| 7,689,332 B2 | 3/2010 | Yakes et al. |
| 7,711,460 B2 | 5/2010 | Yakes et al. |
| 7,715,962 B2 | 5/2010 | Rowe et al. |
| 7,729,831 B2 | 6/2010 | Pillar et al. |
| 7,729,832 B2 | 6/2010 | Benckert et al. |
| 7,756,621 B2 | 7/2010 | Pillar et al. |
| 7,792,618 B2 | 9/2010 | Quigley et al. |
| 7,835,838 B2 | 11/2010 | Pillar et al. |
| 7,844,379 B2 | 11/2010 | Tang et al. |
| 7,848,857 B2 | 12/2010 | Nasr et al. |
| 7,878,750 B2 | 2/2011 | Zhou et al. |
| 7,909,059 B2 | 3/2011 | Wehner et al. |
| 7,931,103 B2 | 4/2011 | Morrow et al. |
| 7,931,397 B2 | 4/2011 | Lindblom et al. |
| 8,000,850 B2 | 8/2011 | Nasr et al. |
| 8,095,247 B2 | 1/2012 | Pillar et al. |
| 8,139,109 B2 | 3/2012 | Schmiedel et al. |
| 8,182,194 B2 | 5/2012 | Pruteanu et al. |
| 8,215,892 B2 | 7/2012 | Calliari |
| 8,281,811 B2 | 10/2012 | Rau et al. |
| 8,289,140 B2 | 10/2012 | Tabe |
| 8,360,706 B2 | 1/2013 | Addleman et al. |
| 8,540,475 B2 | 9/2013 | Kuriakose et al. |
| 8,561,735 B2 | 10/2013 | Morrow et al. |
| 8,613,543 B2 | 12/2013 | Lindblom et al. |
| 8,646,965 B2 | 2/2014 | Datema et al. |
| 8,807,613 B2 | 8/2014 | Howell et al. |
| 8,947,531 B2 | 2/2015 | Fischer et al. |
| 9,045,014 B1 | 6/2015 | Verhoff et al. |
| D737,866 S | 9/2015 | Datema et al. |
| 9,174,686 B1 | 11/2015 | Oshkosh |
| 9,216,856 B2 | 12/2015 | Howell et al. |
| 9,258,982 B1* | 2/2016 | Golden ............... A01K 15/021 |
| 9,387,985 B2 | 7/2016 | Gillmore et al. |
| 9,420,203 B2 | 8/2016 | Broggi et al. |
| D772,306 S | 11/2016 | Datema et al. |
| 9,656,640 B1 | 5/2017 | Verhoff et al. |
| 9,694,671 B2 | 7/2017 | Wildgrube et al. |
| 9,707,869 B1 | 7/2017 | Messina et al. |
| 9,845,859 B2 | 12/2017 | Pate et al. |
| 9,856,662 B2 | 1/2018 | Vierkotten et al. |
| 9,880,581 B2 | 1/2018 | Kuriakose et al. |
| 9,981,803 B2 | 5/2018 | Davis et al. |
| 10,187,745 B1* | 1/2019 | Zhao ...................... H04L 43/10 |
| 10,196,205 B2 | 2/2019 | Betz et al. |
| D843,281 S | 3/2019 | Gander et al. |
| 10,414,067 B2 | 9/2019 | Datema et al. |
| 10,434,995 B2 | 10/2019 | Verhoff et al. |
| 10,457,533 B2 | 10/2019 | Puszkiewicz et al. |
| D871,283 S | 12/2019 | Gander et al. |
| 10,558,234 B2 | 2/2020 | Kuriakose et al. |
| D888,629 S | 6/2020 | Gander et al. |
| 10,781,090 B2 | 9/2020 | Puszkiewicz et al. |
| 10,800,605 B2 | 10/2020 | Rocholl et al. |
| 10,843,379 B2 | 11/2020 | Rocholl et al. |
| 10,858,184 B2 | 12/2020 | Betz et al. |
| 10,859,167 B2 | 12/2020 | Jax et al. |
| D907,544 S | 1/2021 | Wall et al. |
| 10,899,538 B2 | 1/2021 | Nelson et al. |
| 10,901,409 B2 | 1/2021 | Datema et al. |
| D909,934 S | 2/2021 | Gander et al. |
| 10,940,610 B2 | 3/2021 | Clifton et al. |
| 10,987,829 B2 | 4/2021 | Datema et al. |

(56) References Cited

U.S. PATENT DOCUMENTS

| | | | |
|---|---|---|---|
| 10,997,802 B2 | 5/2021 | Koga et al. | |
| 11,001,135 B2 | 5/2021 | Yakes et al. | |
| 11,001,440 B2 | 5/2021 | Rocholl et al. | |
| 11,007,863 B2 | 5/2021 | Yakes et al. | |
| 2003/0158635 A1 | 8/2003 | Pillar et al. | |
| 2004/0133319 A1 | 7/2004 | Pillar et al. | |
| 2005/0113996 A1 | 5/2005 | Pillar et al. | |
| 2008/0215190 A1 | 9/2008 | Pillar et al. | |
| 2008/0215700 A1 | 9/2008 | Pillar et al. | |
| 2008/0217279 A1 | 9/2008 | Gelies et al. | |
| 2009/0238026 A1 | 9/2009 | Johnson | |
| 2016/0026982 A1* | 1/2016 | Schwarz | G01S 19/13 705/40 |
| 2016/0099927 A1* | 4/2016 | Oz | G07C 5/0808 726/9 |
| 2016/0223313 A1 | 8/2016 | Vierkotten | |
| 2017/0361491 A1 | 12/2017 | Datema et al. | |
| 2017/0361492 A1 | 12/2017 | Datema et al. | |
| 2018/0004199 A1 | 1/2018 | Randolph et al. | |
| 2018/0211515 A1* | 7/2018 | Geerlings | H04W 4/02 |
| 2018/0250847 A1 | 9/2018 | Wurtz et al. | |
| 2019/0185077 A1 | 6/2019 | Smith et al. | |
| 2019/0311333 A1* | 10/2019 | Kekalainen | H04W 4/38 |
| 2019/0320287 A1* | 10/2019 | Weiss | G06Q 30/0601 |
| 2019/0325220 A1 | 10/2019 | Wildgrube et al. | |
| 2019/0344475 A1 | 11/2019 | Datema et al. | |
| 2019/0351883 A1 | 11/2019 | Verhoff et al. | |
| 2020/0094671 A1 | 3/2020 | Wildgrube et al. | |
| 2020/0230841 A1 | 7/2020 | Datema et al. | |
| 2020/0230842 A1 | 7/2020 | Datema et al. | |
| 2020/0262328 A1 | 8/2020 | Nelson et al. | |
| 2020/0262366 A1 | 8/2020 | Wildgrube et al. | |
| 2020/0265656 A1 | 8/2020 | Koga et al. | |
| 2020/0316816 A1 | 10/2020 | Messina et al. | |
| 2020/0317083 A1 | 10/2020 | Messina et al. | |
| 2020/0346547 A1 | 11/2020 | Rocholl et al. | |
| 2020/0346556 A1 | 11/2020 | Rocholl et al. | |
| 2020/0346557 A1 | 11/2020 | Rocholl et al. | |
| 2020/0346657 A1 | 11/2020 | Clifton et al. | |
| 2020/0346854 A1 | 11/2020 | Rocholl et al. | |
| 2020/0346855 A1 | 11/2020 | Rocholl et al. | |
| 2020/0346856 A1 | 11/2020 | Rocholl et al. | |
| 2020/0346857 A1 | 11/2020 | Rocholl et al. | |
| 2020/0346858 A1 | 11/2020 | Buege et al. | |
| 2020/0346859 A1 | 11/2020 | Buege et al. | |
| 2020/0346860 A1 | 11/2020 | Buege et al. | |
| 2020/0346861 A1 | 11/2020 | Rocholl et al. | |
| 2020/0346862 A1 | 11/2020 | Rocholl et al. | |
| 2020/0347659 A1 | 11/2020 | Rocholl et al. | |
| 2020/0347661 A1 | 11/2020 | Rocholl et al. | |
| 2020/0347857 A1 | 11/2020 | Clifton et al. | |
| 2020/0348681 A1 | 11/2020 | Clifton et al. | |
| 2020/0348764 A1 | 11/2020 | Clifton et al. | |
| 2020/0398670 A1 | 12/2020 | Rocholl et al. | |
| 2020/0398695 A1 | 12/2020 | Rocholl et al. | |
| 2020/0398697 A1 | 12/2020 | Rocholl et al. | |
| 2020/0398772 A1 | 12/2020 | Wildgrube et al. | |
| 2020/0398857 A1 | 12/2020 | Clifton et al. | |
| 2020/0399058 A1 | 12/2020 | Rocholl et al. | |
| 2020/0401807 A1 | 12/2020 | Wildgrube et al. | |
| 2021/0031649 A1 | 2/2021 | Messina et al. | |
| 2021/0039719 A1 | 2/2021 | Datema et al. | |
| 2021/0054942 A1 | 2/2021 | Jax et al. | |
| 2021/0069934 A1 | 3/2021 | Rocholl et al. | |
| 2021/0081516 A1* | 3/2021 | Storey | G06Q 30/04 |
| 2021/0086991 A1 | 3/2021 | Betz et al. | |
| 2021/0124347 A1 | 4/2021 | Datema et al. | |
| 2021/0139237 A1 | 5/2021 | Nelson et al. | |

FOREIGN PATENT DOCUMENTS

| | | | |
|---|---|---|---|
| JP | 06-210619 A | 8/1994 | |
| KR | 100890154 B1 * | 3/2009 | G06F 19/00 |
| WO | WO-2013/104240 A1 | 7/2013 | |

* cited by examiner

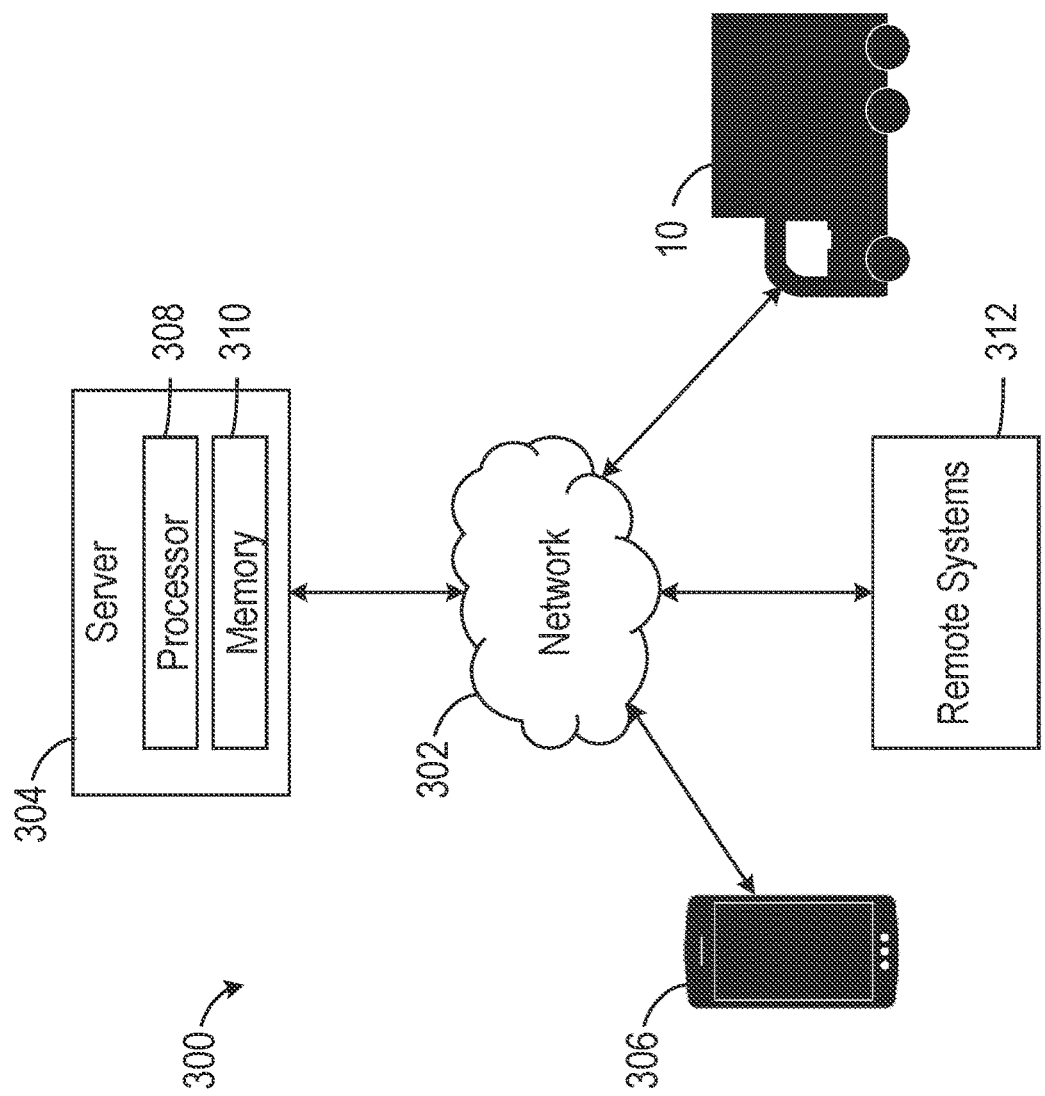

ACTIVE TRUCK TRACKING AND ALERTS FOR RESIDENTIAL REFUSE CAN COLLECTION

CROSS-REFERENCE TO RELATED PATENT APPLICATIONS

This application claims the benefit of U.S. Provisional Patent Application No. 63/011,586, filed Apr. 17, 2020, which is incorporated herein by reference in its entirety.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

SUMMARY

One implementation of the present disclosure is a system for tracking refuse collection vehicles. The system includes one or more memory devices having instructions stored thereon that, when executed by one or more processors, cause the one or more processors to perform operations including receiving, from a user device, a first user input indicating one or more parameters of a geofence, the geofence defining a virtual perimeter around a geographical location, determining whether the refuse collection vehicle is within the virtual perimeter of the geofence based on a current location of the refuse collection vehicle, and transmitting, to the user device, a first notification based on a determination that the refuse collection vehicle is within the geofence, the first notification indicating to a user of the user device that the refuse collection vehicle is within the geofence.

Another implementation of the present disclosure is a method for tracking a refuse collection vehicle. The method includes receiving, by a server and from a user device, a first user input indicating one or more parameters of a geofence, the geofence defining a virtual perimeter around a geographical location, determining, by the server, whether the refuse collection vehicle is within the virtual perimeter of the geofence based on a current location of the refuse collection vehicle, and transmitting, by the server to the user device, a first notification based on a determination that the refuse collection vehicle is within the geofence, the first notification indicating to a user of the user device that the refuse collection vehicle is within the geofence.

Yet another implementation of the present disclosure is a device including a user interface, one or more processors, and one or more memory devices having instructions stored thereon that, when executed by the one or more processors, cause the one or more processors to receive, via the user interface, a first user input indicating one or more boundaries of a geofence, the geofence defining a virtual perimeter around a geographical location, transmit the first user input to a remote server, receive a first notification based on a determination that a refuse collection vehicle is within the geofence, the first notification indicating a distance of the refuse collection vehicle from a central point of the geofence, and receive a second notification based on a determination that the refuse collection vehicle has left the geofence.

Another implementation of the present disclosure is a concrete mixer vehicle. The concrete mixer vehicle includes a mixer drum having an inner volume configured to hold a mixture for transportation and placement. The concrete mixer vehicle also includes a chute configured to receive mixture exiting the mixer drum and direct the mixture. The concrete mixer vehicle also includes a controller configured to transition the concrete mixer vehicle between a first autonomous mode and a second autonomous mode. The controller is configured to operate the mixer drum and the chute to perform a first autonomous action in the first autonomous mode, and operate the mixer drum and the chute to perform a second autonomous action in the second autonomous mode.

Another implementation of the present disclosure is a method for autonomously operating a concrete mixer vehicle. The method includes detecting a condition indicating that the concrete mixer vehicle is at a concrete plant. The method also includes transitioning the concrete mixer vehicle into an autonomous plant mode in response to detecting the condition that the concrete mixer vehicle is at the concrete plant. The method also includes operating the concrete mixer vehicle according to the autonomous plant mode for an autonomous plant operation. The method also includes detecting a condition indicating that the concrete mixer vehicle is at a jobsite. The method also includes transitioning the concrete mixer vehicle into an autonomous jobsite mode in response to detecting the condition that indicates that the concrete mixer vehicle is at the jobsite. The method also includes operating the concrete mixer vehicle according to the autonomous jobsite mode for an autonomous jobsite operation.

Another implementation of the present disclosure is a method for autonomously operating a concrete mixer vehicle. The method includes obtaining sensor data from a sensor of the concrete mixer vehicle, the sensor data indicating a jobsite area and one or more structures positioned at the jobsite area. The method also includes identifying boundaries of the one or more structures positioned at the jobsite area based on the sensor data. The method also includes receiving a user input comprising a desired pour area. The method also includes operating the chute and the mixer drum of the concrete mixer vehicle to pour a material according to the user input.

BRIEF DESCRIPTION OF THE DRAWINGS

The disclosure will become more fully understood from the following detailed description, taken in conjunction with the accompanying figures, wherein like reference numerals refer to like elements, in which:

FIG. 3 is a block diagram of a tracking and alert system for residential refuse can collection, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a system and methods for tracking a refuse vehicle and alerting a user to the refuse vehicle's location to aid in residential refuse can collection are disclosed herein. The refuse vehicle may be a garbage truck, a waste collection truck, a sanitation truck, etc., configured for side loading, front loading, or rear loading. The refuse vehicle may include a positioning system that includes components such as a global positioning system (GPS) transceiver, a cellular transceiver, inertia sensors, etc., to determine a location of the refuse vehicle. A server system may determine, based on the location of the refuse vehicle, whether the refuse vehicle is within a geofence established by a customer. When the refuse vehicle enters or exits an area defined by the geofence, an alert may be sent to a device of the customer.

Overview

Figure 1A:
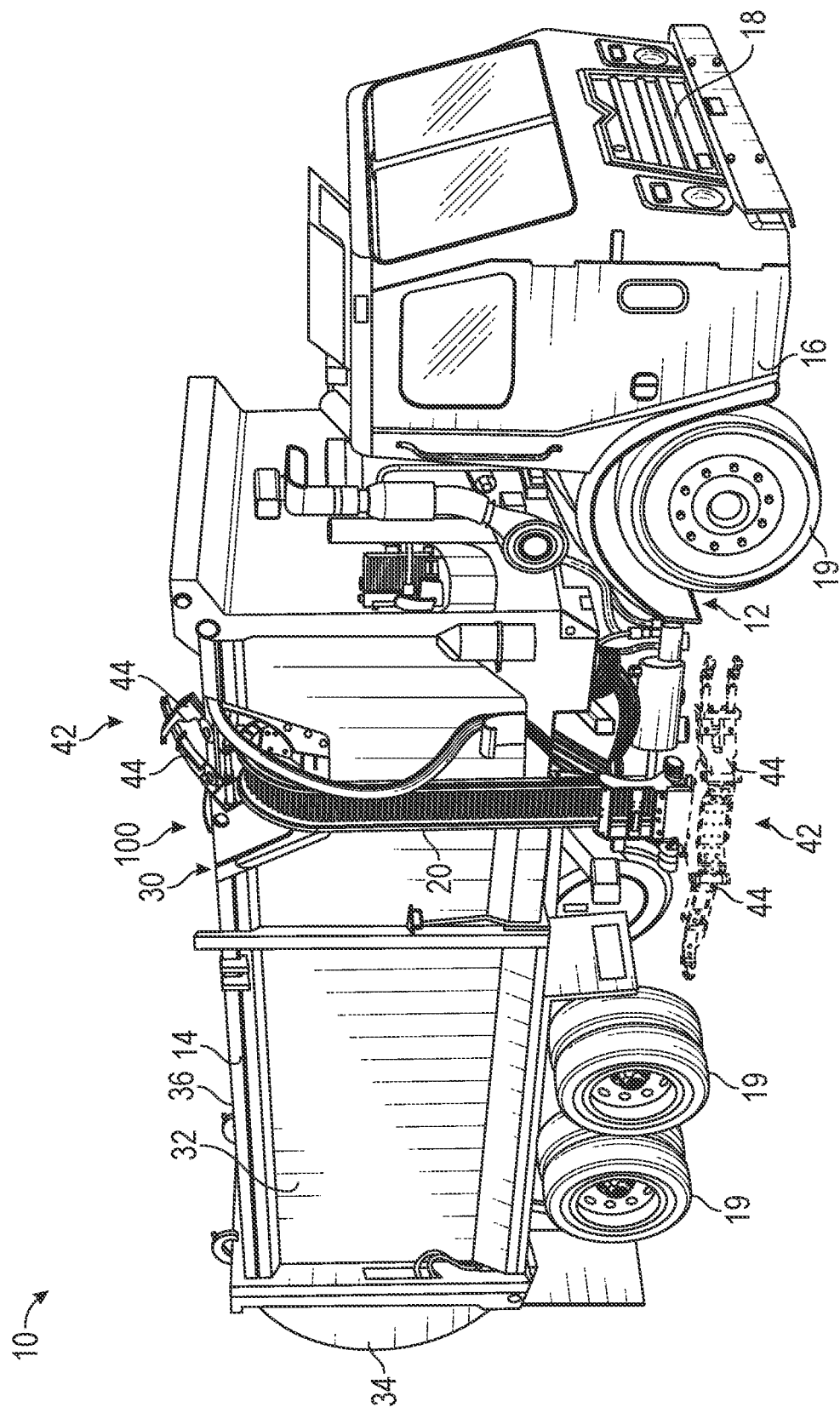
FIGS. 1A and 1B are perspective views of a refuse vehicle, according to some embodiments.
Figure 1B:
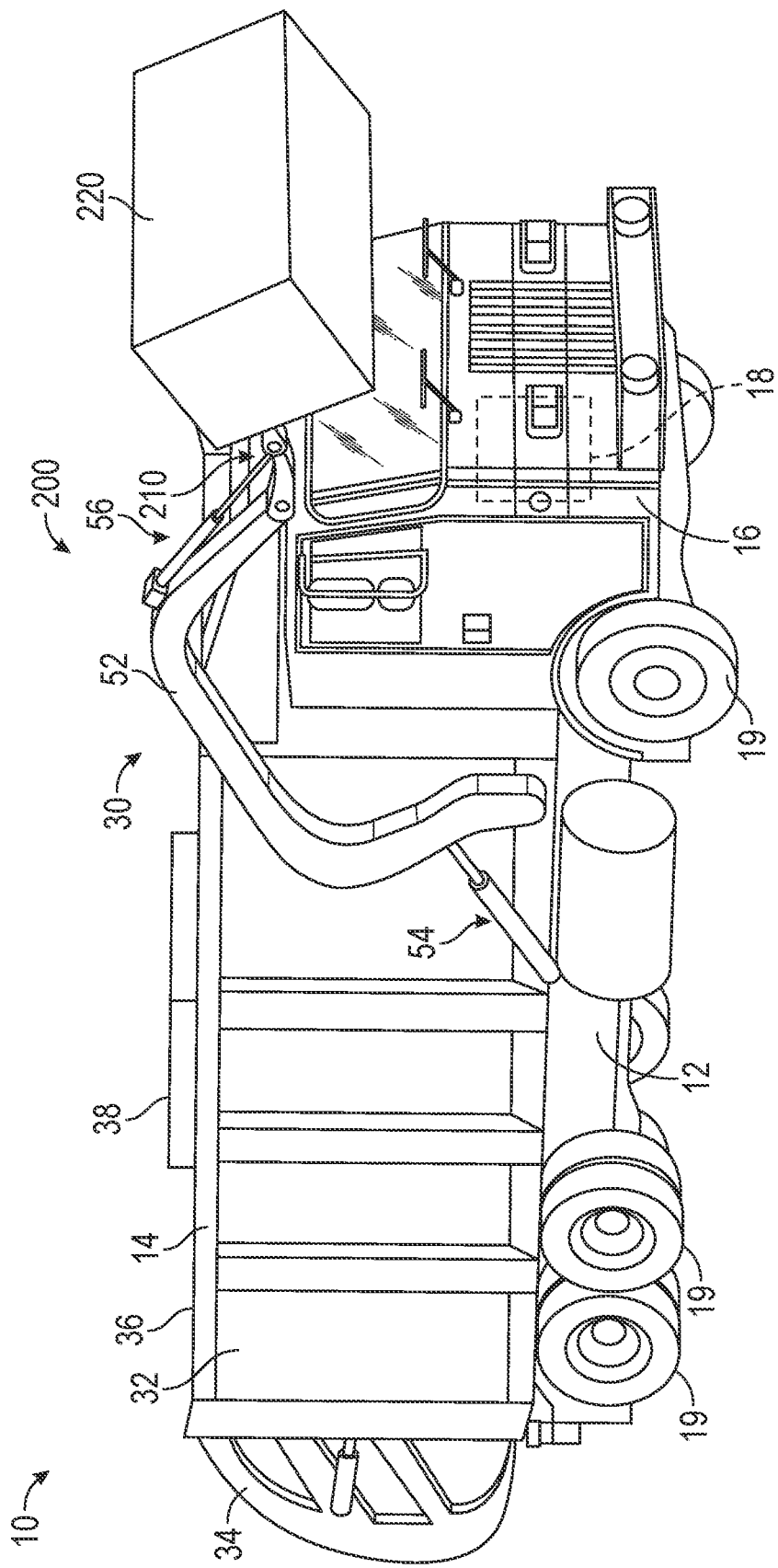

Referring first to FIGS. 1A and 1B, a refuse vehicle 10 is shown, according to some embodiments. Refuse vehicle 10 may be a garbage truck, a waste collection truck, a sanitation truck, etc., and may be configured as a side-loading refuse vehicle (e.g., as shown in FIG. 1A), front loading refuse vehicle (e.g., as shown in FIG. 1B), or a rear-loading refuse vehicle. In other embodiments, refuse vehicle 10 is another type of vehicle (e.g., a skid-loader, a telehandler, a plow truck, a boom lift, etc.). As shown, refuse vehicle 10 includes a chassis, shown as frame 12; a body assembly, shown as body 14, coupled to the frame 12 (e.g., at a rear end thereof, etc.); and a cab, shown as cab 16, coupled to the frame 12 (e.g., at a front end thereof, etc.). The cab 16 may include various components to facilitate operation of the refuse vehicle 10 by an operator, such as a seat, a steering wheel, hydraulic controls, a graphical user interface (e.g., a touchscreen user interface), switches, buttons, dials, etc.

As shown, refuse vehicle 10 includes a prime mover, shown as engine 18, coupled to the frame 12 at a position beneath the cab 16. Engine 18 is configured to provide power to a series of tractive elements, shown as wheels 19, and/or to other systems of refuse vehicle 10 (e.g., a pneumatic system, a hydraulic system, etc.). Engine 18 may be configured to utilize one or more of a variety of fuels (e.g., gasoline, diesel, bio-diesel, ethanol, natural gas, etc.), according to various exemplary embodiments. According to an alternative embodiment, engine 18 additionally or alternatively includes one or more electric motors coupled to frame 12 (e.g., a hybrid refuse vehicle, an electric refuse vehicle, etc.). The electric motors may consume electrical power from an on-board storage device (e.g., batteries, ultracapacitors, etc.), from an on-board generator (e.g., an internal combustion engine, etc.), and/or from an external power source (e.g., overhead power lines, etc.) and provide power to the systems of refuse vehicle 10.

In some embodiments, refuse vehicle 10 is configured to transport refuse from various waste receptacles within a municipality to a storage and/or processing facility (e.g., a landfill, an incineration facility, a recycling facility, etc.). As shown, the body 14 includes a plurality of panels, shown as panels 32, a tailgate 34, and a cover 36. In some embodiments, as shown in FIG. 1B, body 14 further includes a door, shown as top door 38, which is movably coupled along cover 36 to seal the opening thereby preventing refuse from escaping the refuse compartment 30 (e.g., due to wind, bumps in the road, etc.). Panels 32, tailgate 34, cover 36, and/or door 38 define a collection chamber (e.g., hopper, etc.), shown as refuse compartment 30. Loose refuse may be placed into refuse compartment 30 where it may thereafter be compacted. Refuse compartment 30 may provide temporary storage for refuse during transport to a waste disposal site and/or a recycling facility. In some embodiments, at least a portion of body 14 and refuse compartment 30 extend in front of cab 16. In some embodiments, body 14 and refuse compartment 30 are positioned behind cab 16.

In some embodiments, refuse compartment 30 includes a hopper volume and a storage volume. Refuse may be initially loaded into the hopper volume and thereafter compacted into the storage volume. According to an exemplary embodiment, the hopper volume is positioned between the storage volume and cab 16 (i.e., refuse is loaded into a position of refuse compartment 30 behind cab 16 and stored in a position further toward the rear of refuse compartment 30). In other embodiments, the storage volume is positioned between the hopper volume and cab 16 (e.g., a rear-loading refuse vehicle, etc.).

As shown in FIG. 1A, refuse vehicle 10, when configured as a side-loading refuse vehicle, may include a side-loading lift mechanism/system (i.e., a side-loading lift assembly), shown as lift assembly 100. Lift assembly 100 includes a grabber assembly, shown as grabber assembly 42, slidably coupled to a guide, shown as track 20, and configured to move along an entire length of the track 20. Track 20 is shown to extend along substantially an entire height of the body 14 and is configured to cause the grabber assembly 42 to tilt or rotate near an upper height of the body 14. In other embodiments, the track 20 extends along substantially an entire height of the body 14 on a rear side of the body 14.

Figure 2A:
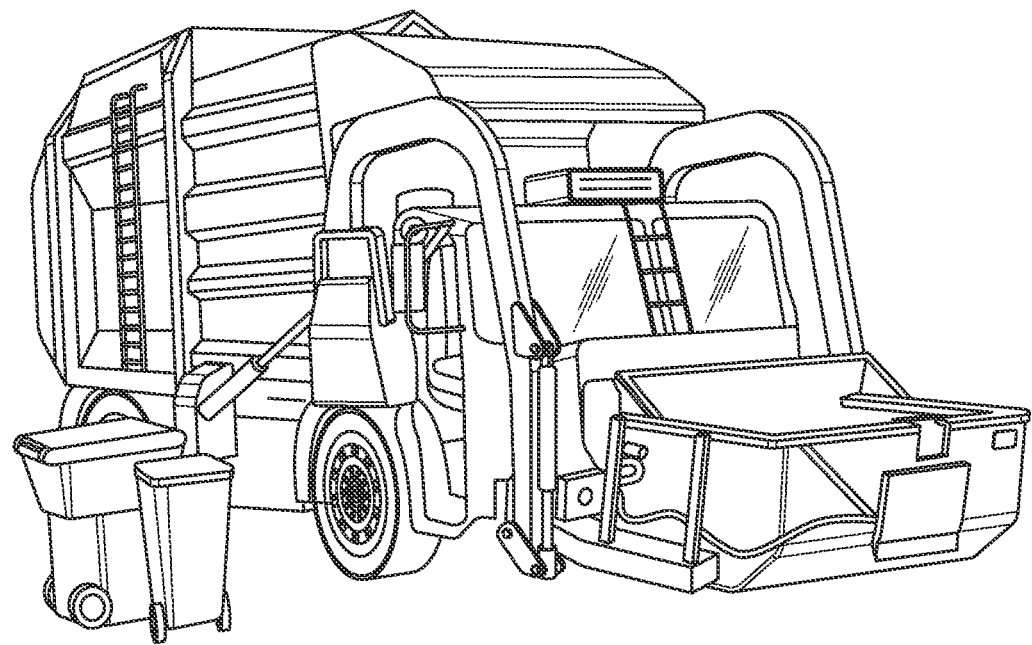
FIGS. 2A-2C are examples configurations of the refuse vehicle of FIGS. 1A and 1B, according to some embodiments.

Grabber assembly 42 is shown to include a pair of actuators, shown as actuators 44. Actuators 44 are configured to releasably secure a refuse can to grabber assembly 42, according to an exemplary embodiment. Actuators 44 are selectively repositionable (e.g., individually, simultaneously, etc.) between an engaged position or state and a disengaged position or state. In the engaged position, actuators 44 are rotated towards one other such that the refuse can may be grasped therebetween. In the disengaged position, actuators 44 rotate outwards (e.g., as shown in FIG. 2A) such that the refuse can is not grasped by actuators 44. By transitioning between the engaged position and the disengaged position, actuators 44 releasably couple the refuse can to grabber assembly 42.

In operation, the refuse vehicle 10 may pull up alongside the refuse can, such that the refuse can is positioned to be grasped by the grabber assembly 42 therein. The grabber assembly 42 may then transition into an engaged state to grasp the refuse can. After the refuse can has been securely grasped, the grabber assembly 42 may be transported along the track 20 (e.g., by an actuator) with the refuse can. When the grabber assembly 42 reaches the end of track 20, grabber assembly 42 may tilt and empty the contents of the refuse can into the refuse compartment 30. The tilting is facilitated by the path of track 20. When the contents of the refuse can have been emptied into refuse compartment 30, the grabber assembly 42 may descend along track 20 and return the refuse can to the ground. Once the refuse can has been placed on the ground, the grabber assembly 42 may transition into the disengaged state, releasing the refuse can.

As shown in FIG. 1B, refuse vehicle 10, when configured as a front loading refuse vehicle, may include a front loading lift mechanism/system (i.e., a front loading lift assembly), shown as lift assembly 200. Lift assembly 200 includes a pair of arms, shown as lift arms 52, coupled to the frame 12 and/or the body 14 on either side of the refuse vehicle 10 such that the lift arms 52 extend forward of the cab 16 (e.g., a front loading refuse vehicle, etc.). In other embodiments, the lift assembly 200 extends rearward of the body 14 (e.g., a rear-loading refuse vehicle, etc.). In still other embodiments, the lift assembly 200 extends from a side of the body 14 (e.g., a side-loading refuse vehicle, etc.). The lift arms 52 may be rotatably coupled to frame 12 with a pivot (e.g., a lug, a shaft, etc.). As shown, the lift assembly 200 includes first actuators, shown as lift arm actuators 54 (e.g., hydraulic cylinders, etc.), coupled to the frame 12 and the lift arms 52. The lift arm actuators 54 are positioned such that extension and retraction thereof rotates the lift arms 52 about an axis extending through the pivot, according to an exemplary embodiment.

An attachment assembly 210 may be coupled to the lift arms 52 of the lift assembly 200. As shown, the attachment assembly 210 is configured to engage with a first attachment, shown as container attachment 220, to selectively and releasably secure the container attachment 220 to the lift assembly 200. In some embodiments, attachment assembly 210 may be configured to engage with a second attachment, such as a fork attachment, to selectively and releasably secure second attachment to the lift assembly 200. In various embodiments, attachment assembly 210 may be configured to engage with another type of attachment (e.g., a street sweeper attachment, a snow plow attachment, a snowblower attachment, a towing attachment, a wood chipper attachment, a bucket attachment, a cart tipper attachment, a grabber attachment, etc.).

As shown in FIG. 1B, the lift arms 52 are rotated by the lift arm actuators 54 to lift the container attachment 220 or other attachment over the cab 16. Lift assembly 200 includes second actuators, shown as articulation actuators 56 (e.g., hydraulic cylinders, etc.). In some embodiments, the articulation actuators 56 are positioned to articulate the attachment assembly 210. Such articulation may assist in tipping refuse out of the container attachment 220 and/or a refuse can (e.g., coupled to the lift assembly 200 by a fork attachment, etc.) and into the hopper volume of the refuse compartment 30 through an opening in the cover 36. The lift arm actuators 54 may thereafter rotate the lift arms 52 to return the empty container attachment 220 to the ground. In some embodiments, top door 38 is movably coupled along the cover 36 to seal the opening thereby preventing refuse from escaping the refuse compartment 30 (e.g., due to wind, bumps in the road, etc.).

In some embodiments, refuse truck 10 includes a positioning system configured to determine a location of refuse truck 10 during operations. The positioning system may include, for example, a global positioning system (GPS) transceiver, a radio transceiver for a cellular network, inertial sensors, etc. In one example, refuse truck 10 includes at least a GPS transceiver for determining a location of refuse truck 10 as it operates (e.g., traverses a refuse can collection route). In another example, the location of refuse truck 10 may be triangulated based on signals from or more cellular radio transceivers, or by any combination of data from one or more components of a positioning system.

Figure 2B:
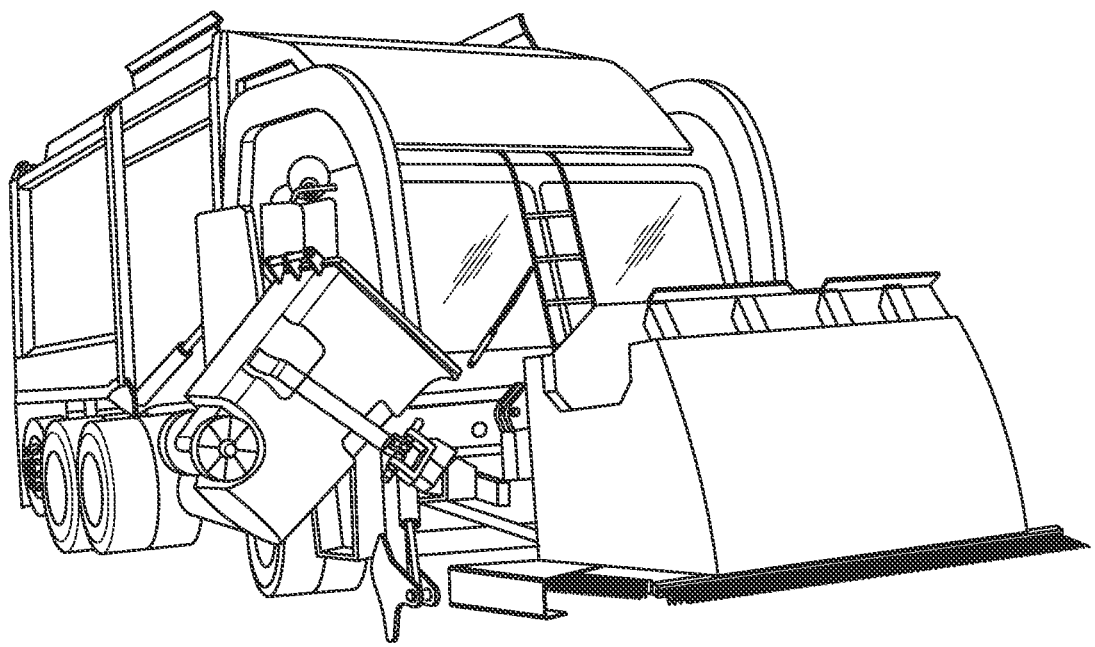
Figure 2C:
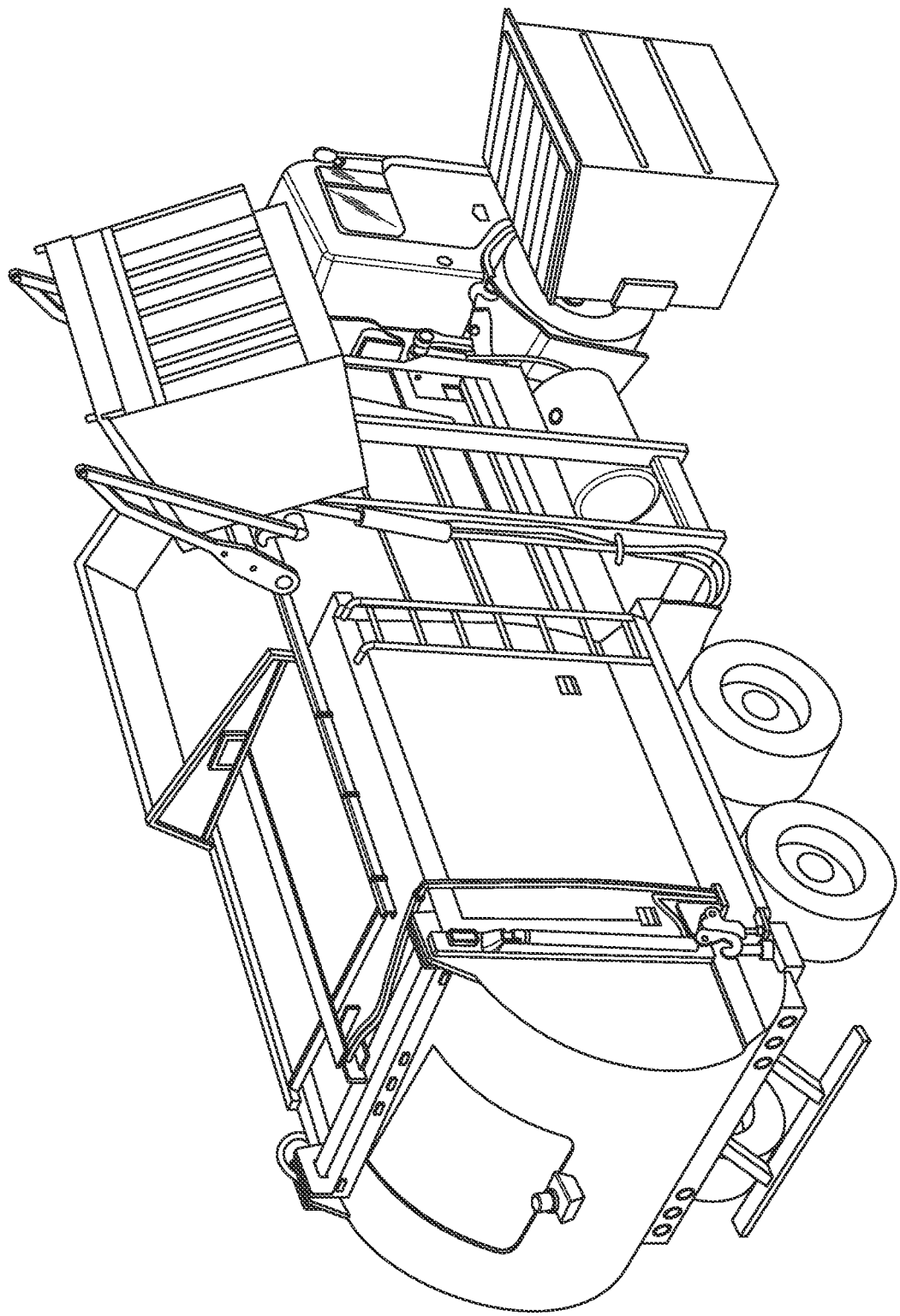

Referring now to FIGS. 2A-2C, example configurations of refuse vehicle 10 are shown, according to some embodiments. FIGS. 2A-2C may illustrate examples of potential configurations of refuse vehicle 10 in addition to the configurations described above with respect to FIGS. 1A-1B. Specifically, FIG. 2A illustrates a front loading configuration of refuse vehicle 10 with an intermediate storage container. FIG. 2B illustrates another front loading configuration of refuse vehicle 10 with an intermediate storage container that includes an actuator assembly (e.g., similar to container attachment 220). FIG. 2C illustrates a side-loading configuration of refuse vehicle 10 (e.g., an auto side-loader) with a grabber-tipper assembly configured to engage an industrial or commercial refuse can. It will be appreciated that the configurations shown in FIGS. 2A-2C illustrate example configurations of refuse vehicle 10 and are not intended to be limiting. As described above, refuse vehicle 10 may be configured in any number of front, side, and/or rear-loading configurations, with any type of lift and/or grabber assembly for engaging a commercial or residential refuse can.

Tracking and Alert System

Referring now to FIG. 3, a tracking and alert system 300 for residential refuse can collection is shown, according to some embodiments. System 300 may track (i.e., determine) a location of refuse vehicle 10 as it operates, such as while refuse vehicle 10 traverses a refuse can collection route. System 300 may alert a customer (e.g., having a refuse can) to the location of refuse vehicle 10 when refuse vehicle 10 enters an area defined by a geofence set by the customer. In this manner, the customer may be alerted when refuse vehicle 10 is within a certain proximity of a location set by the customer (e.g., the customer's location or a location of the customer's refuse can(s)). Accordingly, the customer may place the refuse can to be retrieved and/or emptied by refuse truck 10 in an appropriate position once the customer receives the alert.

System 300 is shown to include a network 302. Network 302 may be any type of network (e.g., a VPN, WAN, LAN, etc.) that allows the components of system 300 to communicate remotely. In communication with network 302 is a server 304, a user device 306, and refuse vehicle 10. Each of server 304, user device 306, and refuse vehicle 10 may include a wired or wireless network interface (e.g., an antenna, a transmitter, a transceiver, etc.) for conducting data communications with network 302. In some embodiments, the network interfaces of each of user device 306 and/or refuse vehicle 10 may include a cellular device configured to provide Internet access by connecting to a cellular tower via a 2G network, a 3G network, an LTE network, etc. In some embodiments, network interfaces may include other types of wireless interfaces such as Bluetooth, WiFi, Zigbee, etc. As an example, server 304 may include a wired network interface to communicate with network 302 and user device 306 may include a cellular and/or WiFi network interface. It will be appreciated that each of server 304, user device 306, and refuse vehicle 10 may include a different type of network interface.

Server 304 may be any remote computing system (i.e., a computer, a cloud server, etc.) having at least a processor 308 and a memory 310. Processor 308 may be coupled to memory 310. Processor 308 may be a general purpose or specific purpose processor, an application specific integrated circuit (ASIC), one or more field programmable gate arrays (FPGAs), a group of processing components, or other suitable processing components. Processor 308 is configured to execute computer code or instructions stored in memory 310 or received from other computer readable media (e.g., CDROM, network storage, a remote server, etc.).

Memory 310 may include one or more devices (e.g., memory units, memory devices, storage devices, etc.) for storing data and/or computer code for completing and/or facilitating the various processes described in the present disclosure. Memory 310 may include random access memory (RAM), read-only memory (ROM), hard drive storage, temporary storage, non-volatile memory, flash memory, optical memory, or any other suitable memory for storing software objects and/or computer instructions. Memory 310 may include database components, object code components, script components, or any other type of information structure for supporting the various activities and information structures described in the present disclosure. Memory 310 may be communicably connected to processor 308 and may include computer code for executing (e.g., by processor 308) one or more of the processes described herein.

In some embodiments, server 304 may include (i.e., host) one or more application programming interfaces (API) for processing geofence data inputted by a user, tracking refuse vehicle 10, and/or transmitting alerts to user device 306. For example, server 304 may host at least a geofencing API and an API configured to generate and transmit alerts to user device 306.

User device 306 may be any electronic device that allows a user to transmit and/or receive information or other data via network 302. Examples of user devices include, but are not limited to, mobile phones, electronic tablets, laptops, desktop computers, workstations, and other types of electronic devices. Generally, user device 306 may include at least a display for presenting information to a user and a user input device for receiving user inputs. The user input components of user device 306 may include, for example, a keyboard, buttons, a touchscreen, etc. In one example, user device 306 is a smart phone having a touchscreen display configured to present an application or other user interface for establishing a geofence.

In some embodiments, a user of user device 306 (e.g., a customer of a refuse collection company having a refuse can) may input one or more parameters to define a geofence around a particular location. A geofence is a virtual boundary that defines a perimeter around a physical (i.e., geographical) location. In other words, the geofence data inputted by the user defines a virtual boundary around an area or location specified by the user. For example, the user may input a perimeter around the user's home address to define the geofence. The user may input geofence data (i.e., geofence parameters) via a user interface of user device 306, for example. In one example, the user may establish a geofence around a location where a refuse can is stored (e.g., the home address of the user). In some embodiments, the user may input a geofence and/or geofence data via an application on a computer or smart phone, via a website, or by any other appropriate means.

In some embodiments, the user of user device 306 may be presented with a map of an area around a particular location, and the user may draw or otherwise indicate a perimeter (i.e., boundary) of a geofence. In other embodiments, the user may enter a distance (e.g., time, miles, number of stops, etc.) from the particular location. In yet other embodiments, any other known or appropriate means for establishing a geofence may be used. The geofence data may be transmitted from user device 306 to server 304. Subsequently, server 304 may store the geofence data in memory 310 and/or process the geofence data via processor 308. Processing the geofence data may include generating a geofence from received geofence data (i.e., parameters) and/or storing a generated geofence or geofence data in memory 310.

While in operation, the location of refuse vehicle 10 may be tracked by server 304. Generally, the location of refuse vehicle 10 may be tracked by server 304 by any suitable or known method. As an example, a GPS transceiver and/or controller of refuse vehicle 10 may determine the location of refuse vehicle 10, and the location may be transmitted (e.g., via a cellular network) from refuse truck 10 to server 304. Based on the location of refuse vehicle 10, server 304 may determine whether refuse vehicle 10 is within the geofence (e.g., has crossed a boundary of the geofence) established by the user.

In the event that server 304 determines that refuse vehicle 10 is within the geofence, server 304 may generate and transmit a notification (i.e., an alert) to user device 306. In this regard, the notification may indicate to the user that a refuse collection vehicle is within a specified proximity of the user's location (e.g., within a given distance of the user's refuse container). In one example, the user may receive (e.g., via user device 306) a push notification or a text message that notifies the user that the refuse vehicle is in their area. In another example, the notification may indicate how close the refuse vehicle is to the user (e.g., in miles, in number of stops, etc.).

In some embodiments, when refuse vehicle 10 leaves the geofenced area (e.g., when refuse vehicle 10 crosses a boundary of the geofence a second time), server 304 may generate and transmit a second notification to user device 306. The second notification may indicate to the user that refuse truck 10 has left the geofence area, thereby notifying the user that they may retrieve their refuse can from a curb, a street side, or other location where the refuse can is placed for pickup.

In some embodiments, server 304 can also communicate with remote systems 312, which may include any system or device related to the tracking of refuse collections vehicles, as described herein. For example, remote systems 312 may include computing devices such as laptop or desktop computers, mobile phones, additional servers, etc. In some embodiments, remote systems 312 can include an access control system configured to control access to a location, such as a building, a parking lot, a storage area, etc. In some such embodiments, the access control system may be configured to control a gate, door, etc., that secures a refuse can containment area. A refuse can containment area may be a secure area for containing (i.e., housing) one or more refuse cans. For example, the refuse can containment area may be a garage or an open lot containing one or more refuse cans.

In some embodiments, server 304 may transmit commands to the access control system to cause an access control device (e.g., an electronic lock, a motor, an actuator, etc.) to actuate, thereby allowing access to the refuse can containment area. For example, the command may cause access control system to actuate an electronic lock to allow access to the refuse can containment area. In another example, the command may cause access control system to actuate a motor to open a gate, thereby allowing access to the refuse can containment area. In some embodiments, a user (e.g., of user device 306) can define a distance from a particular location (e.g., a location of the refuse can containment area) at which the server 304 transmits commands to the access control system. Thus, in some such embodiments, the user may establish a second geofence for allowing access to the refuse can containment, which may be similar in area to a first geofence for notifying the user that a refuse collection vehicle (e.g., refuse vehicle 10) is nearby. In other such embodiments, the second geofence may be smaller and/or may be contained within the first geofence. For example, the user may be notified when refuse vehicle 10 crosses a boundary of the first geofence (e.g., a few miles from a target location), and an operator of refuse vehicle 10 may be granted access to the refuse can containment area when crossing a boundary of the second geofence (e.g., a few hundred from a target location). In this manner, the refuse can containment area may remain secured until refuse vehicle 10 is nearby.

Figure 4:
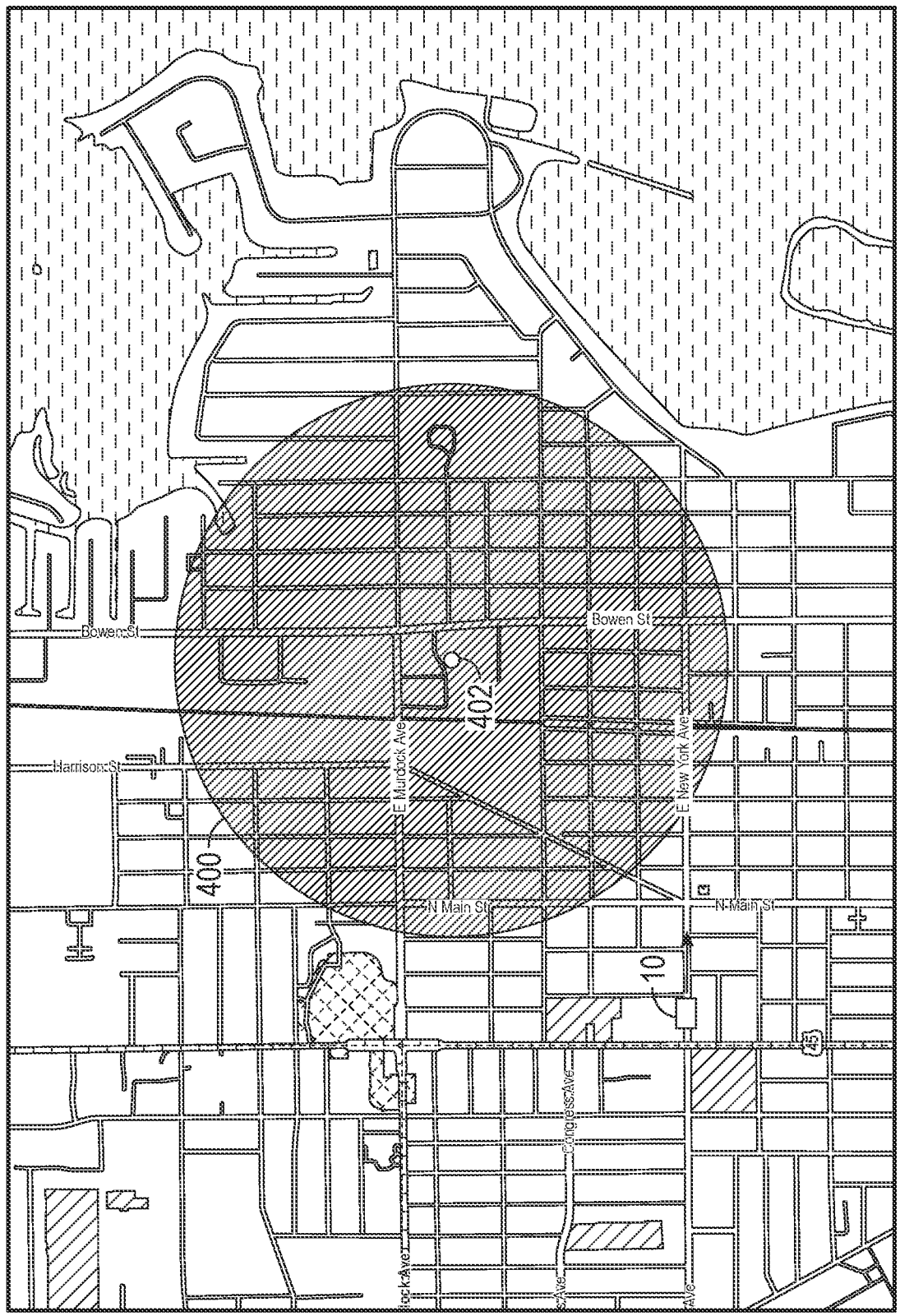
FIG. 4 is an example diagram of a geofence, according to an exemplary embodiment.

Referring now to FIG. 4, an example of a geofence 400 is shown, according to some embodiments. Geofence 400 is shown as a substantially circular geofence that surrounds a location 402 set by a user (e.g., a user's home address), shown on a map of an area around location 402. In this example interface, geofence 400 may have been generated based on geofence data input by the user by specifying a distance from location 402 (e.g., 2-miles), where the boundary of geofence 400 is a radius from location 402. As shown in FIG. 4, refuse truck 10 may be tracked as it travels along a roadway or other path. When refuse truck 10 crosses the boundary of geofence 400 (e.g., enters the geofenced area), a notification may be sent to a device of the user (e.g., by server 304). Similarly, a notification may be sent to a device of the user when refuse truck 10 leaves the geofenced area or crosses the boarder of geofence 400 a second time.

While a circular geofence defining a radius of a particular distance from location 402 is shown in FIG. 4, it will be appreciated that the geofence may be defined by any number of parameters. For example, a user may specify a distance from a location based on typical driving times or distances via known roadways (e.g., rather than a straight-line distance). Accordingly, the geofence may not necessarily be substantially circular, as shown in FIG. 4, but may take any shape (e.g., any polygonal shape). For example, the geofence may be defined by one or more straight lines such as roadways or other boundaries. In another example, a user may establish a geofence based on a number of stops refuse vehicle 10 is from the user's location. In such embodiments, the geofence may not necessarily be presented as an overlay to a map.

Figure 5:
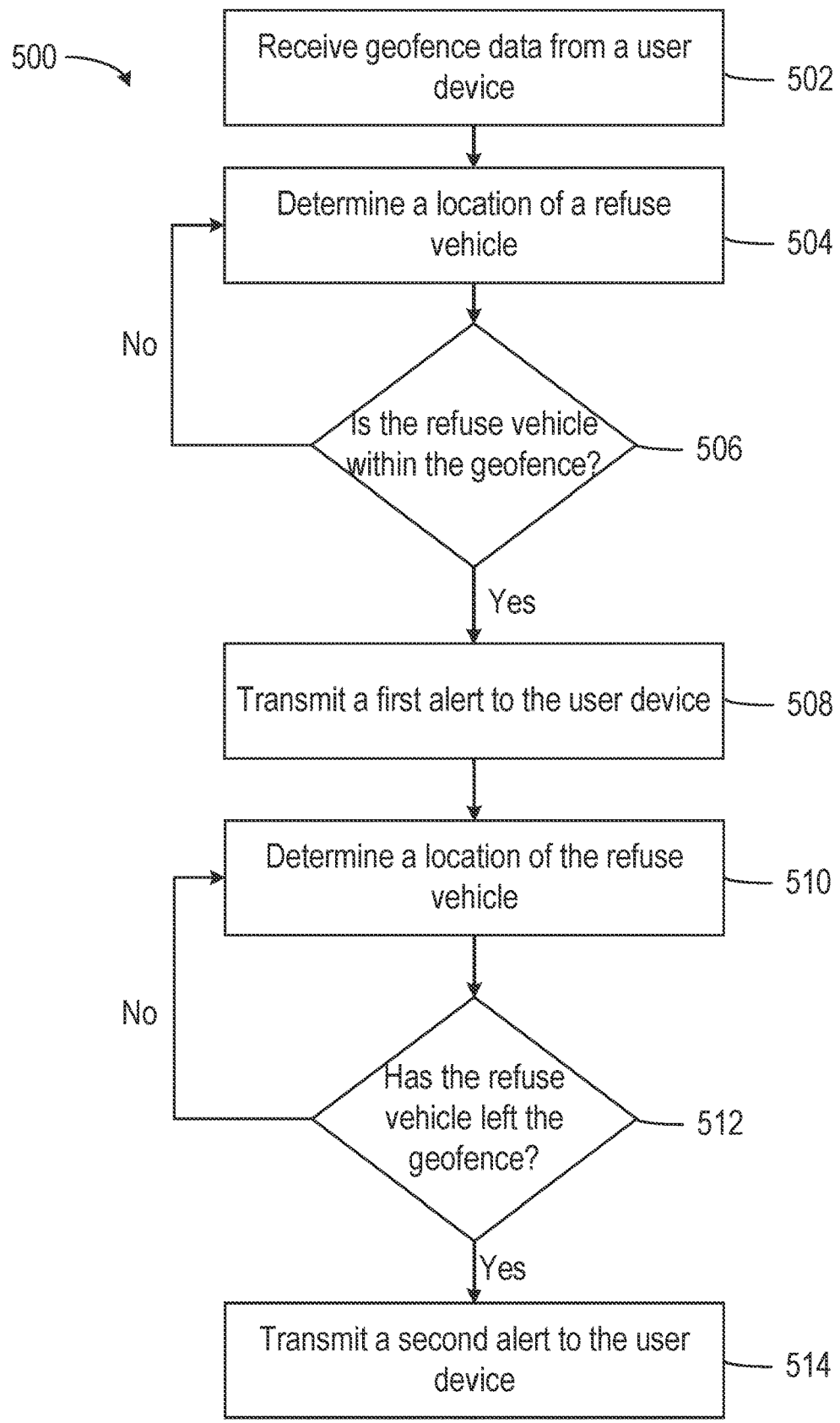
FIG. 5 is a process for tracking a refuse vehicle and alerting a user for residential refuse can collection, according to an exemplary embodiment.

Referring now to FIG. 5, a process 500 for tracking a refuse vehicle and alerting a user for residential refuse can collection is shown, according to some embodiments. Process 500 may be implemented by system 300, for example. Process 500 may alert a user when a tracked refuse vehicle (e.g., refuse vehicle 10) is within a particular distance or proximity of a location specified by the user to facilitate the placement and/or retrieval of a refuse can by the user. It will be appreciated that the steps of process 500 are not intended to be limiting, such that process 500 may include more or few steps that those shown and that the steps of process 500 may be completed in any order.

At step 502, geofence data is received from a user device. As described above with respect to FIG. 3, for example, the geofence data may be received by server 304 or another computer system from user device 306 (e.g., via network 302). In some embodiments, the user may input geofence data via an application on a computer or smart phone, via a website, etc. As described above, for example, the user may be presented with a map of an area around a particular location or a central point, and the user may draw or otherwise indicate a boundary that defines a geofence. To continue this example, the user may enter an address (e.g., a home address) and a user interface may be presented with a map of the area around the address. The user may then enter a distance (e.g., miles, time, etc.) such as by entering a number, moving a slide or other graphical element, drawing a boundary, or by any other appropriate means.

In some embodiments, the user may not be presented with a map of the area but may be able to enter a distance or other data that defines a distance or proximity from the particular location. For example, the user may selectively turn on a setting of an application that alerts the user when a refuse vehicle is within a predefined distance of the user's location. Subsequent to receiving the geofence data, the geofence data may be processed by the server or computer system (e.g., server 304 of system 300). Processing the geofence data may include generating a geofence from parameters received from the user device, for example. The geofence may then be stored by the server. In some embodiments, a user may define multiple geofences or may access a previously stored or entered geofence to modify parameters of the geofence. For example, the user may change a distance (e.g., a radius) of the geofence or may change a location (e.g., an address) that the geofence is centered on.

At step 504, a location of a refuse vehicle (e.g., refuse vehicle 10) is determined. In some embodiments, the location of the refuse vehicle is tracked by a server (e.g., server 304) or computer system of a tracking and alert system, such as system 300. It will be appreciated that any number of known method may be used to determine the location of the refuse vehicle. In some embodiments, the location of the refuse vehicle may be determined based on GPS data received from the refuse vehicle by the tracking and alert system. In this regard, a GPS transceiver of the refuse vehicle may determine a location of the refuse vehicle and transmit the location to the tracking and alert system via a network connection (e.g., a cellular connection). In some embodiments, GPS data may be used in combination with other data (e.g., inertial data indicating movement of the refuse vehicle) to determine a location and/or trajectory of the refuse vehicle.

At step 506, the determined location of the refuse vehicle may be compared with the geofence stored by the tracking and alert system and/or received from the user device to determine whether the refuse vehicle is within the geofenced area (e.g., whether the refuse vehicle has crossed a boundary of the geofence or the perimeter established by the geofence). In the event that the refuse vehicle has not crossed the geofence boundary or entered the geofenced area, the location of the refuse vehicle may continue to be tracked. Once the refuse vehicle crosses the geofence boundary or enters the area defined by the geofence, process 500 may continue to step 508.

At step 508, based on a determination that the refuse vehicle is within the geofenced area, a first alert (i.e., a notification) is transmitted to the user device. As described above, the first alert may be transmitted to user device 306 from server 304, in some embodiments. The first alert may inform the user that the refuse vehicle is within the geofenced area and/or indicate that the refuse vehicle is within a user-specified distance of a particular location set by the user (e.g., the user's home address). In one example, the first alert may simply indicate that the refuse vehicle is nearby. Accordingly, the user may place the refuse can in a pickup location (e.g., at a curb, at a side of a roadway, etc.) in response to receiving the first alert. In another example, the first alert may indicate the distance that the refuse truck is from the user's location, such as in miles, time (e.g., minutes), number of stops, etc. In various embodiments, the first alert may be sent as a text message, an email, a push notification, an automated voice call, or by any other suitable method.

In some embodiments, at step 508, a command may also be transmitted to an access control system for a refuse can containment area. The command may cause an actuator (e.g., a door actuator, a gate actuator, a motor, an electronic lock, etc.) to facilitate access to a refuse can containment area. For example, the command may cause an electronic lock to be disengaged, allowing access to the refuse can containment area to retrieve a refuse can. As another example, the command may cause a motor coupled to a gate to be activate, opening the gate and allowing access to the refuse can containment area to retrieve the refuse can.

At step 510, a location of a refuse vehicle (e.g., refuse vehicle 10) is once again determined, as described above with respect to step 504. At step 512, the newly determined location of the refuse vehicle may be compared with the geofence stored by the tracking and alert system and/or received from the user device to determine whether the refuse vehicle has left the geofenced area. For example, after determining that the refuse vehicle entered the geofence at step 506, subsequently determined locations of the refuse vehicle may be compared to the geofence to determine whether the refuse vehicle has crossed a boundary of the geofence or the perimeter established by the geofence a second time. In the event that the refuse vehicle has not left the geofenced area, the location of the refuse vehicle may continue to be tracked. Once the refuse vehicle crosses the geofence boundary and/or leaves the area defined by the geofence, process 500 may continue to step 514.

At step 514, responsive to a determination that the refuse vehicle has left the geofenced area, a second alert (i.e., a notification) is transmitted to the user device. The second alert may inform the user that the refuse vehicle has left the geofenced area, thereby indicating to the user that the user may retrieve a refuse can from a pickup location (e.g., a curb, a sidewalk, etc.) In one example, the second alert may indicate that the refuse vehicle has left the geofenced area and/or that the user's refuse can has been emptied. The second alert may be transmitted in a similar manner to the first alert and may be sent as a text message, an email, a push notification, an automated voice call, or by any other suitable method.

Concrete Mixer Vehicle Modes

Referring to the FIGS. 6-15, a system and a controller for a concrete mixer truck or a concrete placement vehicle are shown, according to an exemplary embodiment. The system and/or the controller facilitate selection and transition between various predefined modes of operation of one or more controllable elements. In some embodiments, the various predefined modes of operation include an add water mode, a spreader mode, an admixture mode, a smooth mode, a wet load mode, and an aggressive mode. The various modes may be for different concrete placement and concrete transit environments setup to minimize operator interaction while enhancing the experience for a specific instant, according to some embodiments. Based on load, location, environment, job, etc., operators of concrete mixing trucks need to hold various skill sets to manually control the concrete mixer truck to accomplish various functions in different situations, according to some embodiments. The system and the controller facilitate simple transitioning of the concrete mixer truck between various predefined modes of operation to automate many of the operations which the operator may have to do manually in other systems, according to some embodiments. The predefined modes of operation and the automated operations therein increase repeatability, and help remove human errors which may occur due to distractions at a plant, while in transit and on the jobsite.

Figure 6:
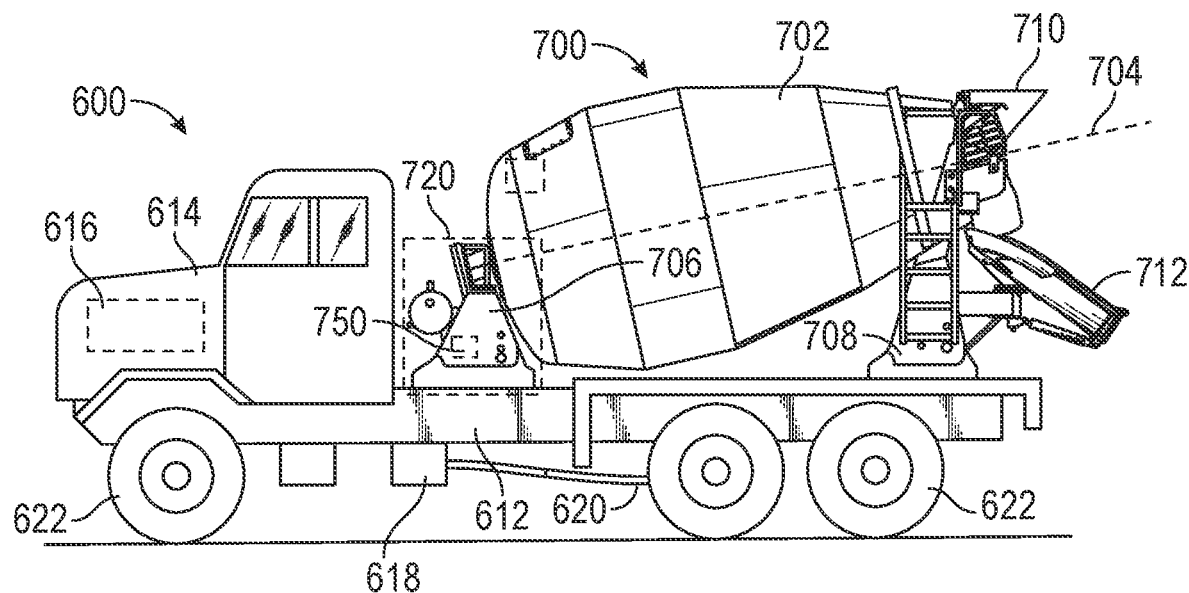
FIG. 6 is a side view of a concrete mixer truck with a drum assembly and a control system, according to an exemplary embodiment.

According to the exemplary embodiment shown in FIGS. 6-10, a vehicle, shown as concrete mixer truck 600, includes a drum assembly, shown as drum assembly 700, and a control system, shown as drum control system 750. According to an exemplary embodiment, the concrete mixer truck 600 is configured as a rear-discharge concrete mixer truck. In other embodiments, the concrete mixer truck 600 is configured as a front-discharge concrete mixer truck. As shown in FIG. 6, the concrete mixer truck 600 includes a chassis, shown as frame 612, and a cab, shown as cab 614, coupled to the frame 612 (e.g., at a front end thereof, etc.). The drum assembly 700 is coupled to the frame 612 and disposed behind the cab 614 (e.g., at a rear end thereof, etc.), according to the exemplary embodiment shown in FIG. 6. In other embodiments, at least a portion of the drum assembly 700 extends in front of the cab 614. The cab 614 may include various components to facilitate operation of the concrete mixer truck 600 by an operator (e.g., a seat, a steering wheel, hydraulic controls, a user interface, switches, buttons, dials, etc.).

Figure 8:
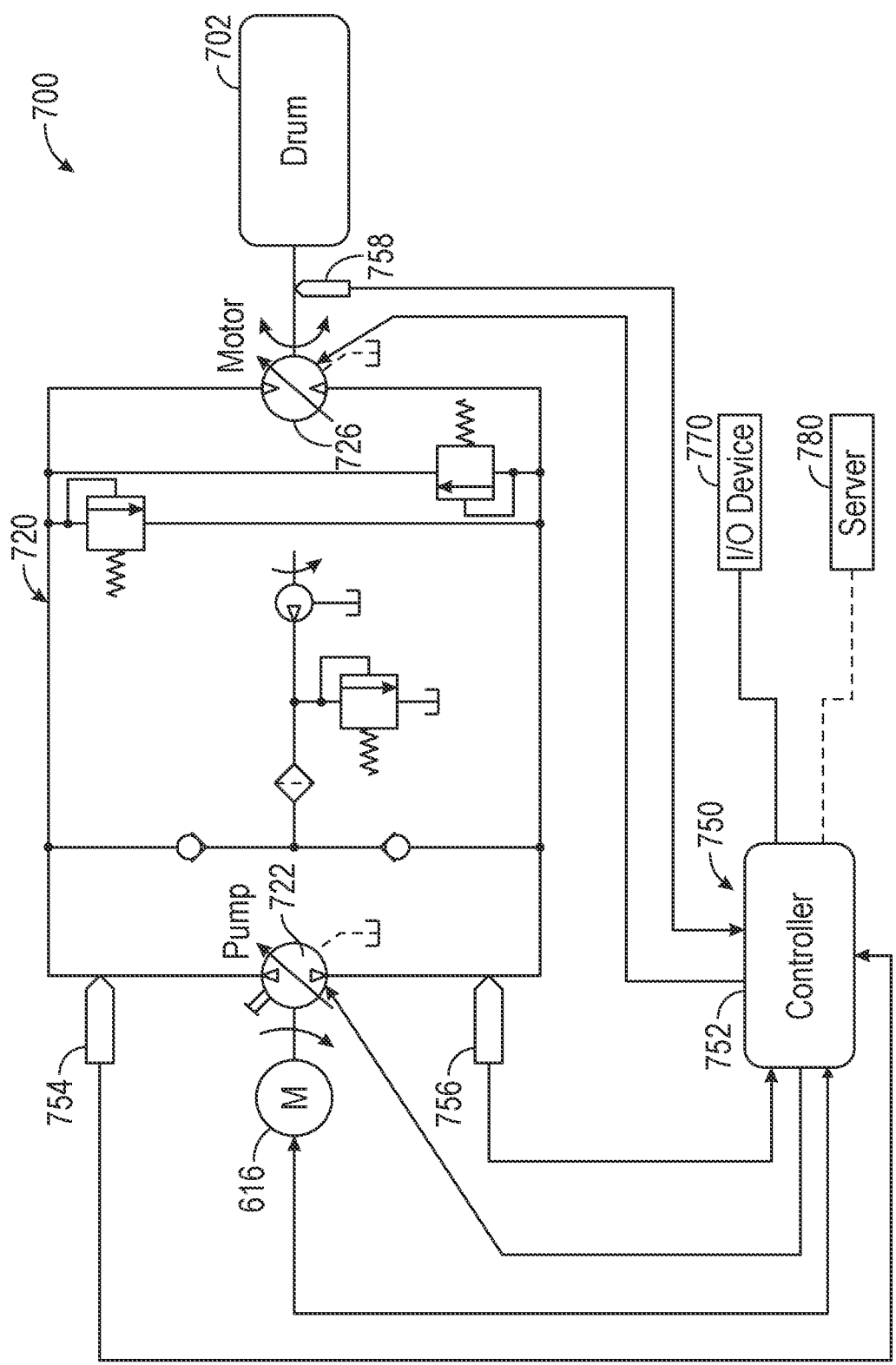
FIG. 8 is a schematic diagram of a drum drive system of the concrete mixer truck of FIG. 1, according to an exemplary embodiment.
Figure 9:
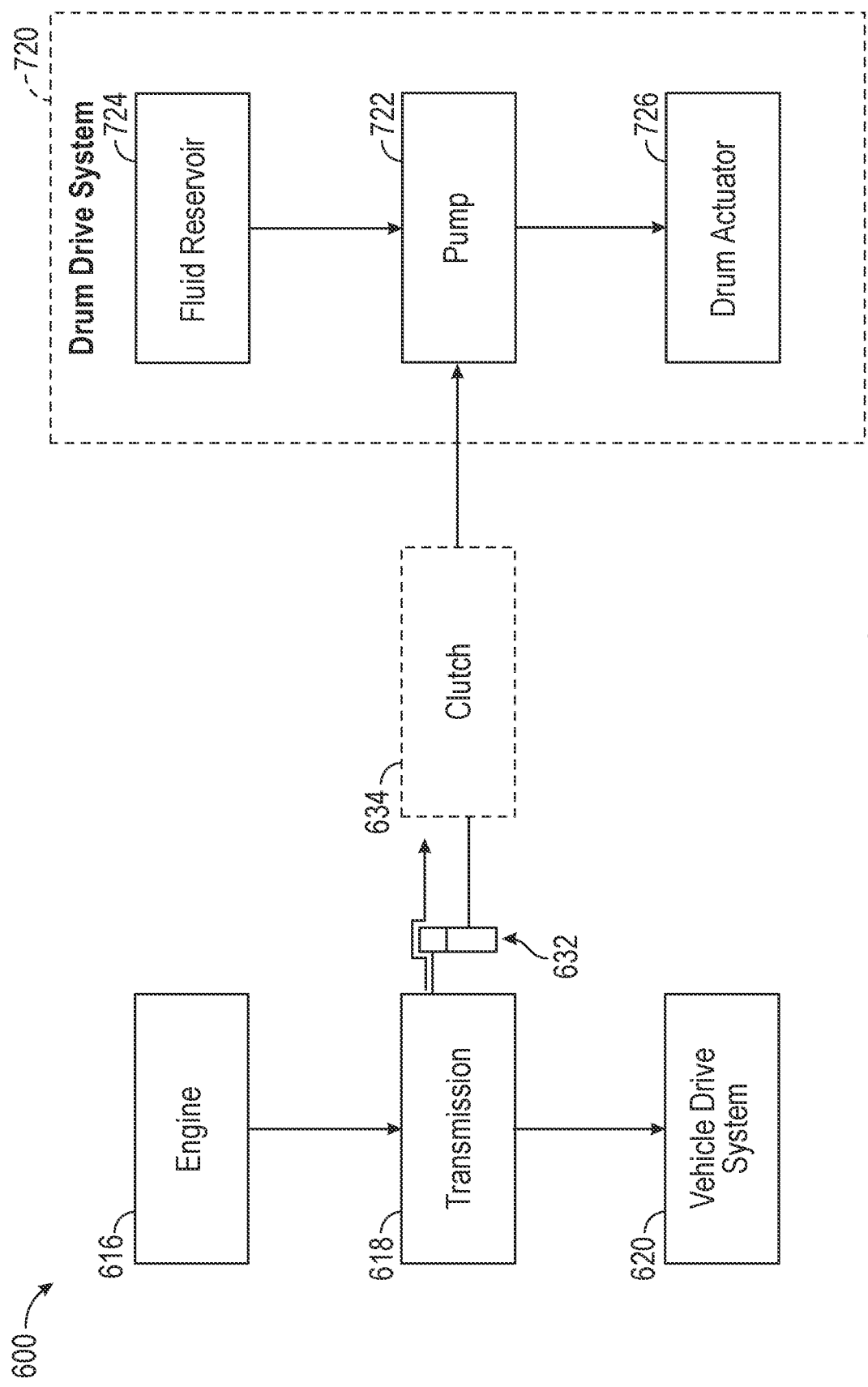
FIG. 9 is a power flow diagram for the concrete mixer truck of FIG. 6 having a drum drive system that is selectively coupled to a transmission with a clutch, according to an exemplary embodiment.
Figure 10:
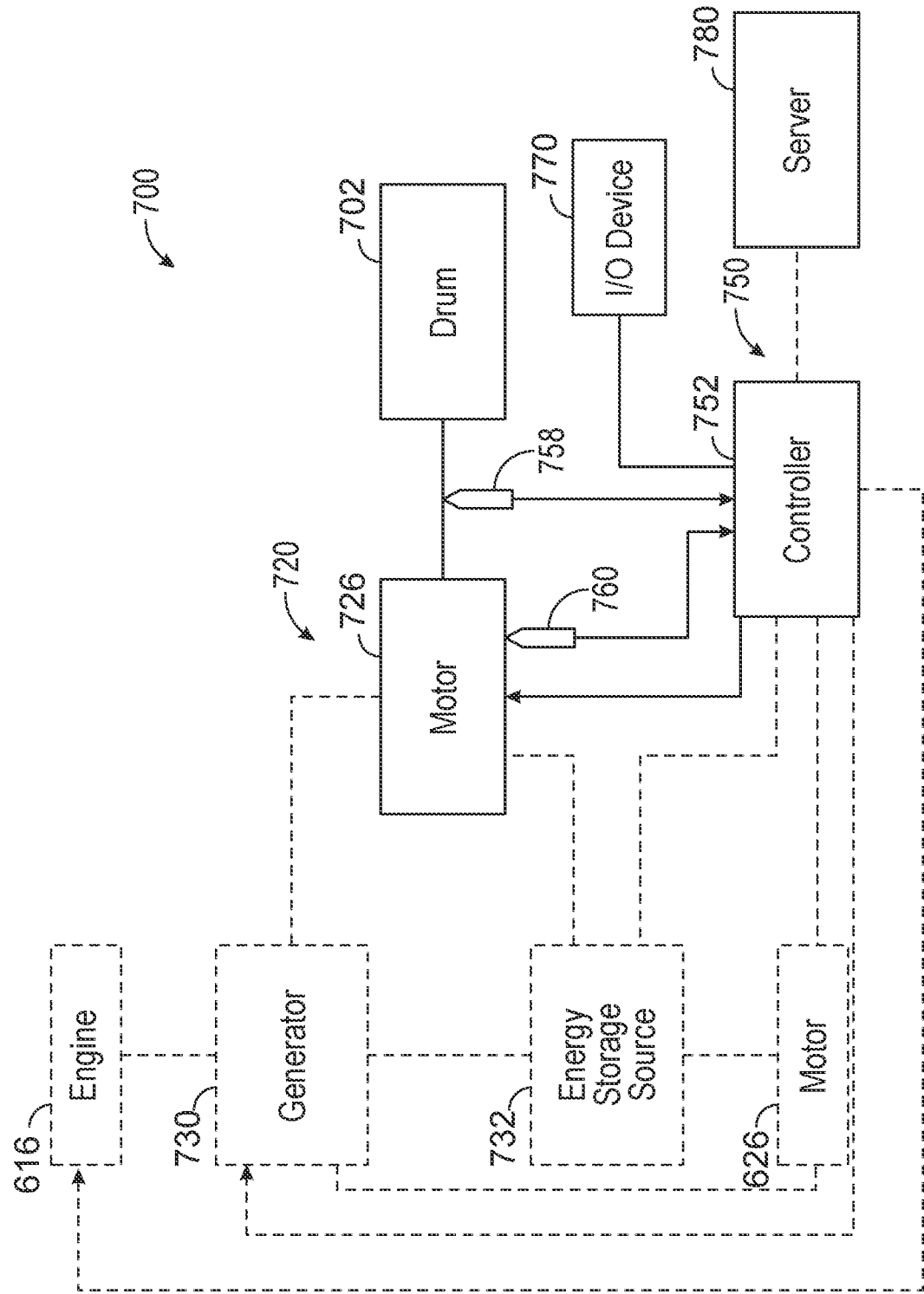
FIG. 10 is a schematic diagram of a drum drive system of the concrete mixer truck of FIG. 1, according to another exemplary embodiment.

As shown in FIGS. 6, 8, and 9, the concrete mixer truck 600 includes a prime mover, shown as engine 616. As shown in FIG. 6, the engine 616 is coupled to the frame 612 at a position beneath the cab 614. The engine 616 may be configured to utilize one or more of a variety of fuels (e.g., gasoline, diesel, bio-diesel, ethanol, natural gas, etc.), according to various exemplary embodiments. According to an alternative embodiment, as shown in FIG. 10 and described in more detail herein, the prime mover additionally or alternatively includes one or more electric motors and/or generators, which may be coupled to the frame 612 (e.g., a hybrid vehicle, an electric vehicle, etc.). The electric motors may consume electrical power from an on-board storage device (e.g., batteries, ultra-capacitors, etc.), from an on-board generator (e.g., an internal combustion engine, a genset, etc.), and/or from an external power source (e.g., overhead power lines, etc.) and provide power to systems of the concrete mixer truck 600.

As shown in FIGS. 6 and 9, the concrete mixer truck 600 includes a power transfer device, shown as transmission 618. In one embodiment, the engine 616 produces mechanical power (e.g., due to a combustion reaction, etc.) that flows into the transmission 618. As shown in FIGS. 6 and 9, the concrete mixer truck 600 includes a first drive system, shown as vehicle drive system 620, that is coupled to the transmission 618. The vehicle drive system 620 may include drive shafts, differentials, and other components coupling the transmission 618 with a ground surface to move the concrete mixer truck 600. As shown in FIG. 6, the concrete mixer truck 600 includes a plurality of tractive elements, shown as wheels 622, that engage a ground surface to move the concrete mixer truck 600. In one embodiment, at least a portion of the mechanical power produced by the engine 616 flows through the transmission 618 and into the vehicle drive system 620 to power at least a portion of the wheels 622 (e.g., front wheels, rear wheels, etc.). In one embodiment, energy (e.g., mechanical energy, etc.) flows along a first power path defined from the engine 616, through the transmission 618, and to the vehicle drive system 620.

Figure 7:
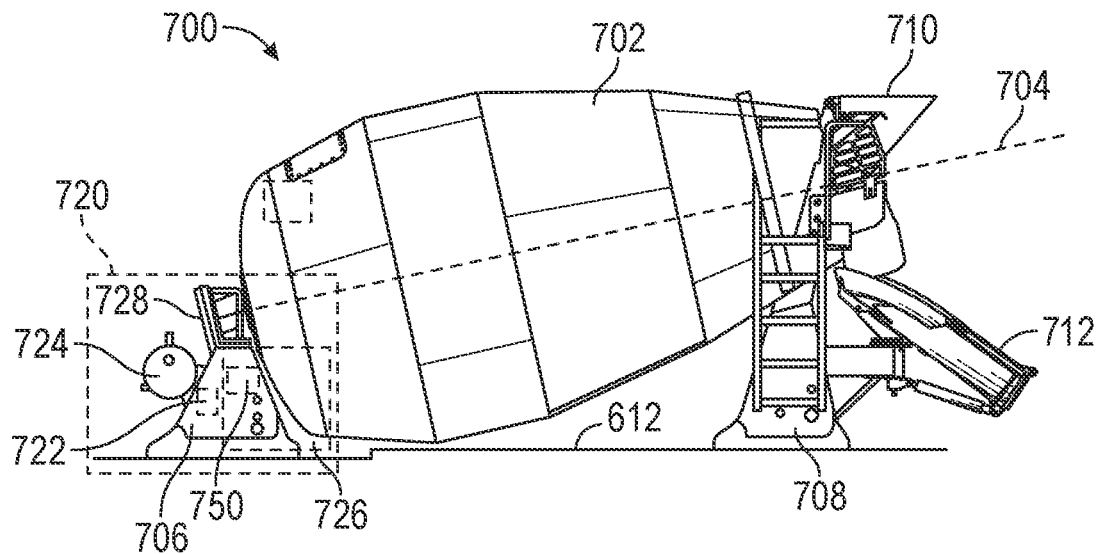
FIG. 7 is a detailed side view of the drum assembly of the concrete mixer truck of FIG. 6, according to an exemplary embodiment.

As shown in FIGS. 6-8 and 10, the drum assembly 700 of the concrete mixer truck 600 includes a drum, shown as mixer drum 702. The mixer drum 702 is coupled to the frame 612 and disposed behind the cab 614 (e.g., at a rear and/or middle of the frame 612, etc.). As shown in FIGS. 6-10, the drum assembly 700 includes a second drive system, shown as drum drive system 720, that is coupled to the frame 612. As shown in FIGS. 6 and 7, the concrete mixer truck 600 includes a first support, shown as front pedestal 706, and a second support, shown as rear pedestal 708. According to an exemplary embodiment, the front pedestal 706 and the rear pedestal 708 cooperatively couple (e.g., attach, secure, etc.) the mixer drum 702 to the frame 612 and facilitate rotation of the mixer drum 702 relative to the frame 612. In an alternative embodiment, the drum assembly 700 is configured as a stand-alone mixer drum that is not coupled (e.g., fixed, attached, etc.) to a vehicle. In such an embodiment, the drum assembly 700 may be mounted to a stand-alone frame. The stand-alone frame may be a chassis including wheels that assist with the positioning of the stand-alone mixer drum on a worksite. Such a stand-alone mixer drum may also be detachably coupled to and/or capable of being loaded onto a vehicle such that the stand-alone mixer drum may be transported by the vehicle.

As shown in FIGS. 6 and 7, the mixer drum 702 defines a central, longitudinal axis, shown as axis 704. According to an exemplary embodiment, the drum drive system 720 is configured to selectively rotate the mixer drum 702 about the axis 704. As shown in FIGS. 6 and 7, the axis 704 is angled relative to the frame 612 such that the axis 704 intersects with the frame 612. According to an exemplary embodiment, the axis 704 is elevated from the frame 612 at an angle in the range of five degrees to twenty degrees. In other embodiments, the axis 704 is elevated by less than five degrees (e.g., four degrees, three degrees, etc.) or greater than twenty degrees (e.g., twenty-five degrees, thirty degrees, etc.). In an alternative embodiment, the concrete mixer truck 600 includes an actuator positioned to facilitate selectively adjusting the axis 704 to a desired or target angle (e.g., manually in response to an operator input/command, automatically according to a control scheme, etc.).

As shown in FIGS. 6 and 7, the mixer drum 702 of the drum assembly 700 includes an inlet, shown as hopper 710, and an outlet, shown as chute 712. According to an exemplary embodiment, the mixer drum 702 is configured to receive a mixture, such as a concrete mixture (e.g., cementitious material, aggregate, sand, etc.), with the hopper 710. The mixer drum 702 may include a mixing element (e.g., fins, etc.) positioned within the interior thereof. The mixing element may be configured to (i) agitate the contents of mixture within the mixer drum 702 when the mixer drum 702 is rotated by the drum drive system 720 in a first direction (e.g., counterclockwise, clockwise, etc.) and (ii) drive the mixture within the mixer drum 702 out through the chute 712 when the mixer drum 702 is rotated by the drum drive system 720 in an opposing second direction (e.g., clockwise, counterclockwise, etc.).

According to the exemplary embodiment shown in FIGS. 7-9, the drum drive system is a hydraulic drum drive system. As shown in FIGS. 7-9, the drum drive system 720 includes a pump, shown as pump 722; a reservoir, shown as fluid reservoir 724, fluidly coupled to the pump 722; and an actuator, shown as drum motor 726. As shown in FIGS. 8 and 9, the pump 722 and the drum motor 726 are fluidly coupled. According to an exemplary embodiment, the drum motor 726 is a hydraulic motor, the fluid reservoir 724 is a hydraulic fluid reservoir, and the pump 722 is a hydraulic pump. The pump 722 may be configured to pump fluid (e.g., hydraulic fluid, etc.) stored within the fluid reservoir 724 to drive the drum motor 726.

According to an exemplary embodiment, the pump 722 is a variable displacement hydraulic pump (e.g., an axial piston pump, etc.) and has a pump stroke that is variable. The pump 722 may be configured to provide hydraulic fluid at a flow rate that varies based on the pump stroke (e.g., the greater the pump stroke, the greater the flow rate provided to the drum motor 726, etc.). The pressure of the hydraulic fluid provided by the pump 722 may also increase in response to an increase in pump stroke (e.g., where pressure may be directly related to work load, higher flow may result in higher pressure, etc.). The pressure of the hydraulic fluid provided by the pump 722 may alternatively not increase in response to an increase in pump stroke (e.g., in instances where there is little or no work load, etc.). The pump 722 may include a throttling element (e.g., a swash plate, etc.). The pump stroke of the pump 722 may vary based on the orientation of the throttling element. In one embodiment, the pump stroke of the pump 722 varies based on an angle of the throttling element (e.g., relative to an axis along which the pistons move within the axial piston pump, etc.). By way of example, the pump stroke may be zero where the angle of the throttling element is equal to zero. The pump stroke may increase as the angle of the throttling element increases. According to an exemplary embodiment, the variable pump stroke of the pump 722 provides a variable speed range of up to about 10:1. In other embodiments, the pump 722 is configured to provide a different speed range (e.g., greater than 10:1, less than 10:1, etc.).

In one embodiment, the throttling element of the pump 722 is movable between a stroked position (e.g., a maximum stroke position, a partially stroked position, etc.) and a destroked position (e.g., a minimum stroke position, a partially destroked position, etc.). According to an exemplary embodiment, an actuator is coupled to the throttling element of the pump 722. The actuator may be positioned to move the throttling element between the stroked position and the destroked position. In some embodiments, the pump 722 is configured to provide no flow, with the throttling element in a non-stroked position, in a default condition (e.g., in response to not receiving a stroke command, etc.). The throttling element may be biased into the non-stroked position. In some embodiments, the drum control system 750 is configured to provide a first command signal. In response to receiving the first command signal, the pump 722 (e.g., the throttling element by the actuator thereof, etc.) may be selectively reconfigured into a first stroke position (e.g., stroke in one direction, a destroked position, etc.). In some embodiments, the drum control system 750 is configured to additionally or alternatively provide a second command signal. In response to receiving the second command signal, the pump 722 (e.g., the throttling element by the actuator thereof, etc.) may be selectively reconfigured into a second stroke position (e.g., stroke in an opposing second direction, a stroked position, etc.). The pump stroke may be related to the position of the throttling element and/or the actuator.

According to another exemplary embodiment, a valve is positioned to facilitate movement of the throttling element between the stroked position and the destroked position. In one embodiment, the valve includes a resilient member (e.g., a spring, etc.) configured to bias the throttling element in the destroked position (e.g., by biasing movable elements of the valve into positions where a hydraulic circuit actuates the throttling element into the destroked positions, etc.). Pressure from fluid flowing through the pump 722 may overcome the resilient member to actuate the throttling element into the stroked position (e.g., by actuating movable elements of the valve into positions where a hydraulic circuit actuates the throttling element into the stroked position, etc.).

As shown in FIG. 9, the concrete mixer truck 600 includes a power takeoff unit, shown as power takeoff unit 632, that is coupled to the transmission 618. In another embodiment, the power takeoff unit 632 is coupled directly to the engine 616. In one embodiment, the transmission 618 and the power takeoff unit 632 include mating gears that are in meshing engagement. A portion of the energy provided to the transmission 618 flows through the mating gears and into the power takeoff unit 632, according to an exemplary embodiment. In one embodiment, the mating gears have the same effective diameter. In other embodiments, at least one of the mating gears has a larger diameter, thereby providing a gear reduction or a torque multiplication and increasing or decreasing the gear speed.

As shown in FIG. 9, the power takeoff unit 632 is selectively coupled to the pump 722 with a clutch 634. In other embodiments, the power takeoff unit 632 is directly coupled to the pump 722 (e.g., without clutch 634, etc.). In some embodiments, the concrete mixer truck 600 does not include the clutch 634. By way of example, the power takeoff unit 632 may be directly coupled to the pump 722 (e.g., a direct configuration, a non-clutched configuration, etc.). According to an alternative embodiment, the power takeoff unit 632 includes the clutch 634 (e.g., a hot shift PTO, etc.). In one embodiment, the clutch 634 includes a plurality of clutch discs. When the clutch 634 is engaged, an actuator forces the plurality of clutch discs into contact with one another, which couples an output of the transmission 618 with the pump 722. In one embodiment, the actuator includes a solenoid that is electronically actuated according to a clutch control strategy. When the clutch 634 is disengaged, the pump 722 is not coupled to (i.e., is isolated from) the output of the transmission 618. Relative movement between the clutch discs or movement between the clutch discs and another component of the power takeoff unit 632 may be used to decouple the pump 722 from the transmission 618.

In one embodiment, energy flows along a second power path defined from the engine 616, through the transmission 618 and the power takeoff unit 632, and into the pump 722 when the clutch 634 is engaged. When the clutch 634 is disengaged, energy flows from the engine 616, through the transmission 618, and into the power takeoff unit 632. The clutch 634 selectively couples the pump 722 to the engine 616, according to an exemplary embodiment. In one embodiment, energy along the first flow path is used to drive the wheels 622 of the concrete mixer truck 600, and energy along the second flow path is used to operate the drum drive system 720 (e.g., power the pump 722, etc.). By way of example, the clutch 634 may be engaged such that energy flows along the second flow path when the pump 722 is used to provide hydraulic fluid to the drum motor 726. When the pump 722 is not used to drive the mixer drum 702 (e.g., when the mixer drum 702 is empty, etc.), the clutch 634 may be selectively disengaged, thereby conserving energy. In embodiments without clutch 634, the mixer drum 702 may continue turning (e.g., at low speed) when empty.

The drum motor 726 is positioned to drive the rotation of the mixer drum 702. In some embodiments, the drum motor 726 is a fixed displacement motor. In some embodiments, the drum motor 726 is a variable displacement motor. In one embodiment, the drum motor 726 operates within a variable speed range up to about 3:1 or 4:1. In other embodiments, the drum motor 726 is configured to provide a different speed range (e.g., greater than 4:1, less than 3:1, etc.). According to an exemplary embodiment, the speed range of the drum drive system 720 is the product of the speed range of the pump 722 and the speed range of the drum motor 726. The drum drive system 720 having a variable pump 722 and a variable drum motor 726 may thereby have a speed range that reaches up to 30:1 or 40:1 (e.g., without having to operate the engine 616 at a high idle condition, etc.). According to an exemplary embodiment, increased speed range of the drum drive system 720 having a variable displacement motor and a variable displacement pump relative to a drum drive system having a fixed displacement motor frees up boundary limits for the engine 616, the pump 722, and the drum motor 726. Advantageously, with the increased capacity of the drum drive system 720, the engine 616 does not have to run at either high idle or low idle during the various operating modes of the drum assembly 700 (e.g., mixing mode, discharging mode, filling mode, etc.), but rather the engine 616 may be operated at a speed that provides the most fuel efficiency and most stable torque. Also, the pump 722 and the drum motor 726 may not have to be operated at displacement extremes to meet the speed requirements for the mixer drum 702 during various applications, but can rather be modulated to the most efficient working conditions (e.g., by the drum control system 750, etc.).

As shown in FIG. 7, the drum drive system 720 includes a drive mechanism, shown as drum drive wheel 728, coupled to the mixer drum 702. The drum drive wheel 728 may be welded, bolted, or otherwise secured to the head of the mixer drum 702. The center of the drum drive wheel 728 may be positioned along the axis 704 such that the drum drive wheel 728 rotates about the axis 704. According to an exemplary embodiment, the drum motor 726 is coupled to the drum drive wheel 728 (e.g., with a belt, a chain, a gearing arrangement, etc.) to facilitate driving the drum drive wheel 728 and thereby rotate the mixer drum 702. The drum drive wheel 728 may be or include a sprocket, a cogged wheel, a grooved wheel, a smooth-sided wheel, a sheave, a pulley, or still another member. In other embodiments, the drum drive system 720 does not include the drum drive wheel 728. By way of example, the drum drive system 720 may include a gearbox that couples the drum motor 726 to the mixer drum 702. By way of another example, the drum motor 726 (e.g., an output thereof, etc.) may be directly coupled to the mixer drum 702 (e.g., along the axis 704, etc.) to rotate the mixer drum 702.

According to the exemplary embodiment shown in FIG. 10, the drum drive system 720 of the drum assembly 700 is configured to be an electric drum drive system. As shown in FIG. 10, the drum drive system 720 includes the drum motor 726, which is electrically powered to drive the mixer drum 702. By way of example, in an embodiment where the concrete mixer truck 600 has a hybrid powertrain, the engine 616 may drive a generator (e.g., with the power takeoff unit 632, etc.), shown as generator 730, to generate electrical power that is (i) stored for future use by the drum motor 726 in storage (e.g., battery cells, etc.), shown as energy storage source 732, and/or (ii) provided directly to drum motor 726 to drive the mixer drum 702. The energy storage source 732 may additionally be chargeable using a mains power connection (e.g., through a charging station, etc.). By way of another example, in an embodiment where the concrete mixer truck 600 has an electric powertrain, the engine 616 may be replaced with a main motor, shown as primary motor 626, that drives the wheels 622. The primary motor 626 and the drum motor 726 may be powered by the energy storage source 732 and/or the generator 730 (e.g., a regenerative braking system, etc.).

According to the exemplary embodiments shown in FIGS. 8 and 10, the drum control system 750 for the drum assembly 700 of the concrete mixer truck 600 includes a controller, shown as drum assembly controller 752. In one embodiment, the drum assembly controller 752 is configured to selectively engage, selectively disengage, control, and/or otherwise communicate with components of the drum assembly 700 and/or the concrete mixer truck 600 (e.g., actively control the components thereof, etc.). As shown in FIGS. 8 and 10, the drum assembly controller 752 is coupled to the engine 616, the primary motor 626, the pump 722, the drum motor 726, the generator 730, the energy storage source 732, a pressure sensor 754, a temperature sensor 756, a speed sensor 758, a motor sensor 760, an input/output ("I/O") device 770, and/or a remote server 780. In other embodiments, the drum assembly controller 752 is coupled to more or fewer components. By way of example, the drum assembly controller 752 may send and/or receive signals with the engine 616, the primary motor 626, the pump 722, the drum motor 726, the generator 730, the energy storage source 732, the pressure sensor 754, the temperature sensor 756, the speed sensor 758, the motor sensor 760, the I/O device 770, and/or the remote server 780.

The drum assembly controller 752 may be implemented as hydraulic controls, a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the drum assembly controller 752 includes a processing circuit having a processor and a memory. The processing circuit may include an ASIC, one or more FPGAs, a DSP, circuits containing one or more processing components, circuitry for supporting a microprocessor, a group of processing components, or other suitable electronic processing components. In some embodiments, the processor is configured to execute computer code stored in the memory to facilitate the activities described herein. The memory may be any volatile or non-volatile computer-readable storage medium capable of storing data or computer code relating to the activities described herein. According to an exemplary embodiment, the memory includes computer code modules (e.g., executable code, object code, source code, script code, machine code, etc.) configured for execution by the processor.

According to an exemplary embodiment, the drum assembly controller 752 is configured to facilitate detecting the buildup of concrete within the mixer drum 702. By way of example, over time after various concrete discharge cycles, concrete may begin to build up and harden within the mixer drum 702. Such buildup is disadvantageous because of the increased weight of the concrete mixer truck 600 and decreased charge capacity of the mixer drum 702. Such factors may reduce the efficiency of concrete delivery. Therefore, the concrete that has built up must be cleaned from the interior of the mixer drum 702 (i.e., using a chipping process). Typically, the buildup is monitored either (i) manually by the operator of the concrete mixer truck 600 (e.g., by inspecting the interior of the mixer drum 702, etc.) or (ii) using expensive load cells to detect a change in mass of the mixer drum 702 when empty. According to an exemplary embodiment, the drum assembly controller 752 is configured to automatically detect concrete buildup within the mixer drum 702 using sensor measurements from more cost effective sensors and processes.

Figure 11:
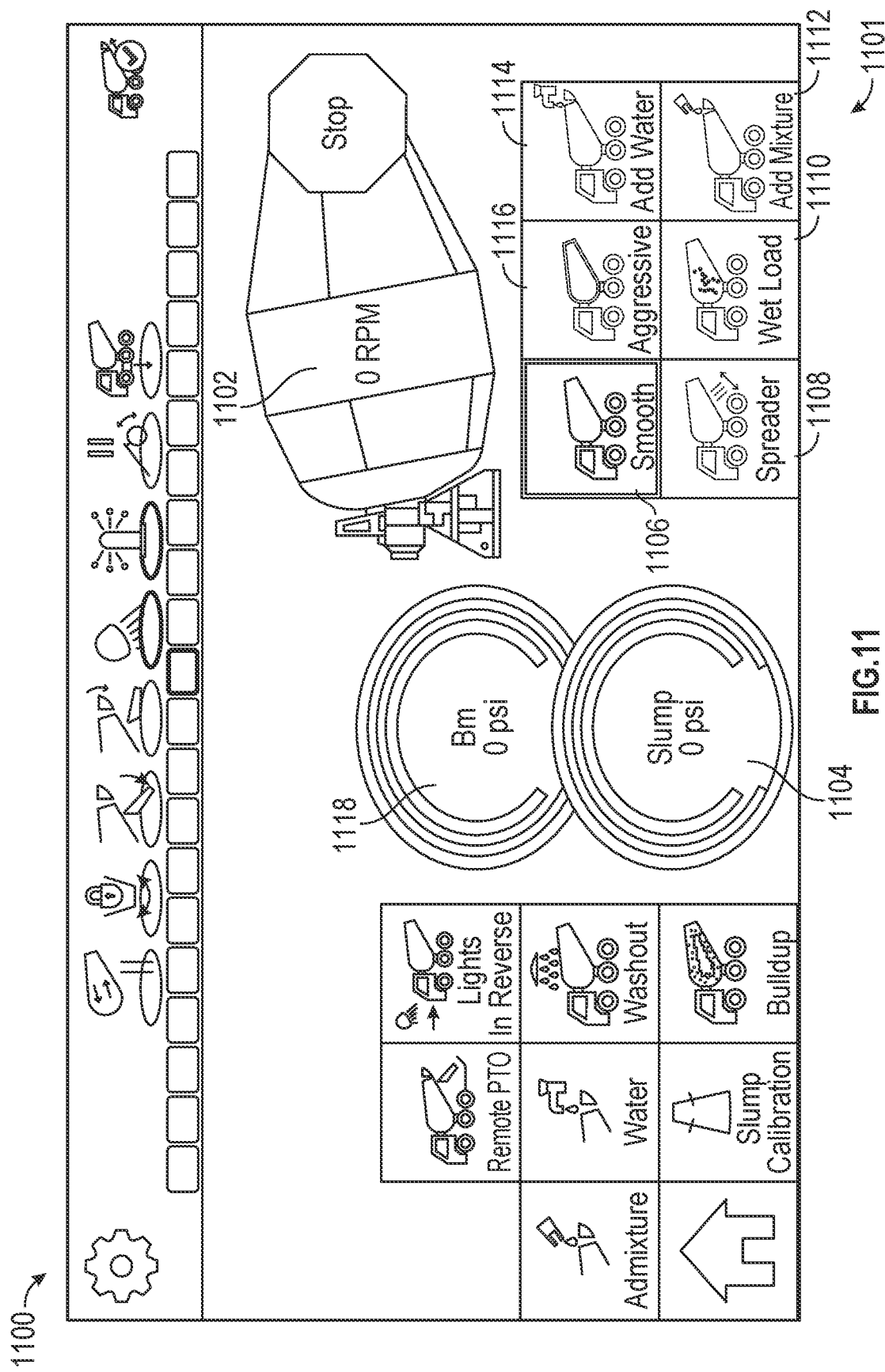
FIG. 11 is a graphical user interface provided by an interface of the concrete mixer truck of FIG. 6, according to an exemplary embodiment.
Figure 12:
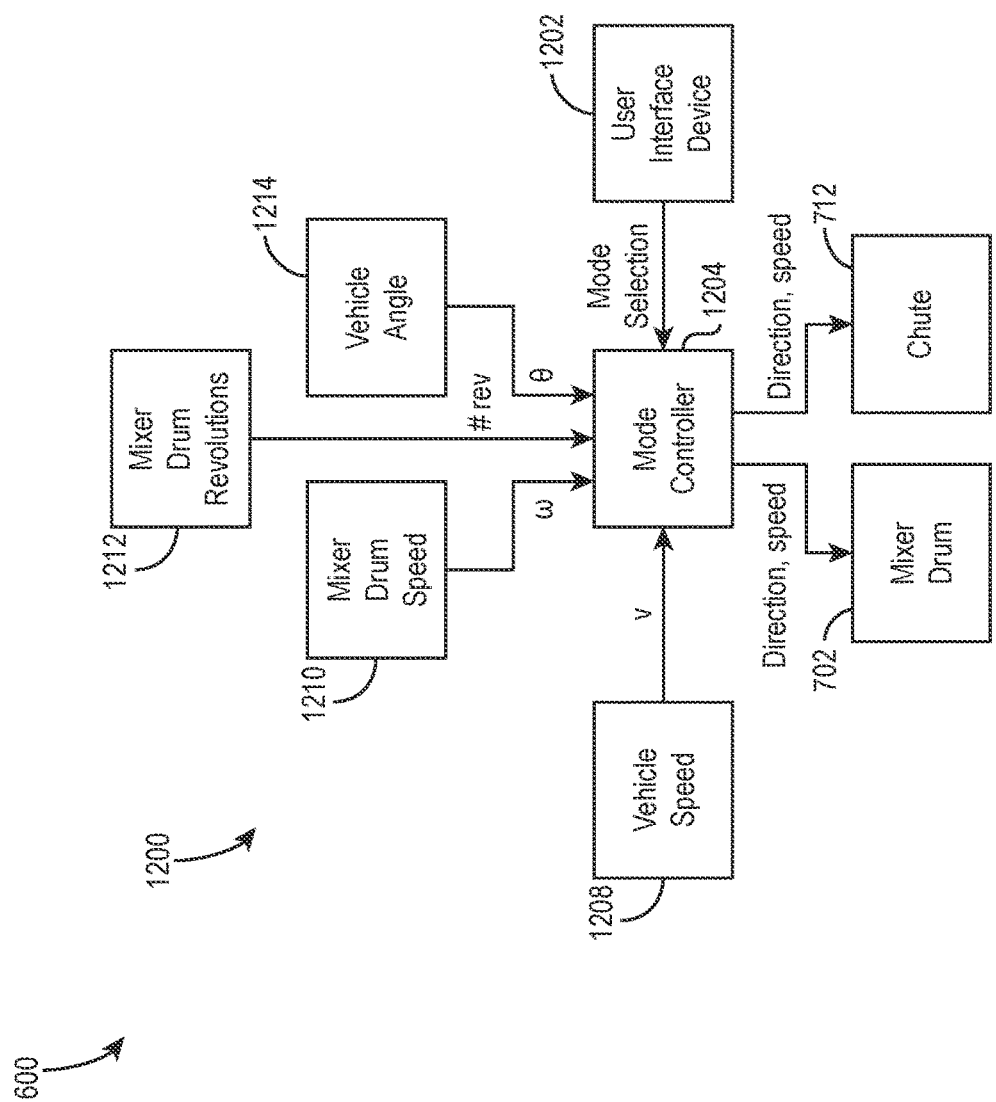
FIG. 12 is a block diagram of a system for selectably transitioning the concrete mixer truck of FIG. 1 between various predefined modes of operation, shown to include a mode controller, according to an exemplary embodiment.

FIG. 11 shows a graphical user interface (GUI) 1100 which may displayed to a vehicle operator (e.g., via user interface device 1202 as shown in FIG. 12), according to an exemplary embodiment. GUI 1100 is shown to include graphical displays indicating a drum speed 1102, a slump 1104 of mixture, a pressure 1118, etc. GUI 1100 is configured to display various operational properties of mixer drum 702, concrete mixer truck 600, and the mixture (e.g., concrete) within mixer drum 702, according to some embodiments. GUI 1100 is configured to receive various user inputs to selectably transition mixer drum 702 and/or concrete mixer truck 600 between various predetermined drum modes 1101, according to some embodiments. According to some embodiments, GUI 1100 includes a smooth drum mode 1106, a spreader drum mode 1108, a wet load drum mode 1110, an admixture drum mode 1112, an add water drum mode 1114, and an aggressive drum mode 1116. GUI 1100 is configured to receive user inputs (e.g., through a touchscreen, buttons, levers, selecting devices, etc.) to select any of smooth drum mode 1106, spreader drum mode 1108, wet load drum mode 1110, admixture drum mode 1112, add water drum mode 1114, and aggressive drum mode 1116, according to some embodiments. In some embodiments, GUI 1100 is configured to receive one or more input parameters for the selected mode in addition to the selected mode. In some embodiments, GUI 1100 prompts an operator to input one or more input parameters in response to a selection of one of drum modes 1101.

GUI 1100 may be implemented in a display device (e.g., a user interface, a human machine interface, user interface device 1202, etc.) positioned within cab 614, according to an exemplary embodiment. Drum modes 1101 cause mixer drum 702 and/or chute 712 to operate according to various predefined modes for different concrete placement and concrete transit environments or to achieve desired characteristics of concrete or mixture within mixer drum 702. Advantageously, drum modes 1101 may remove the need for an operator to manually adjust operations of mixer drum 702 and facilitates automated operation of the concrete mixer truck 600. Drum modes 1101 facilitate a simpler operation of mixer drum 702, and facilitate a more repeatable operation of mixer drum 702, according to some embodiments.

As disclosed above, each of drum modes 1101 cause mixer drum 702 and/or concrete mixer truck 600 to operate according to a predefined mode. Smooth drum mode 1106 causes mixer drum 702 to operate according to a standard drum mode, according to an exemplary embodiment. In an exemplary embodiment, smooth drum mode 1106 is a default operating mode of mixer drum 702. For example, mixer drum 702 may automatically transition or be transitioned into smooth drum mode 1106 in response to a key cycle (e.g., an ignition of engine 616). In some embodiments, smooth drum mode 1106 includes ramps and smoothing features to smoothly reduce drum momentum when a drum stop is engaged or when switching between charge and discharge.

Spreader drum mode 1108 causes mixer drum 702 to operate for the purposes of spreading a cement slurry or the mixture contained in mixer drum 702, according to an exemplary embodiment. When spreader drum mode 1108 is selected, mixer drum 702 and chute 712 are operated for the purpose of spreading the cement slurry, according to some embodiments. When in spreader drum mode 1108, mixer drum 702 and chute 712 are operated based on speed of concrete mixer truck 600, and an angle of concrete mixer truck 600, according to some embodiments.

Wet load drum mode 1110 keeps mixer drum 702 spinning faster when concrete mixer truck 600 is moving at a slower speed, according to an exemplary embodiment. This facilitates keeping mixture or concrete in mixer drum 702 farther forwards in mixer drum 702. Wet load drum mode 1110 may be activated when concrete mixer truck 600 has a full load with a high slump (e.g., immediately after loading at a plant). Wet load drum mode 1110 may use information such as the speed of concrete mixer truck 600 and current mixer drum speed to control speed of mixer drum 702. In some embodiments, wet load drum mode 1110 uses an acceleration, pitch, roll, etc., of concrete mixer truck 600 to control speed of mixer drum 702 to prevent concrete/mixture spillage. In some systems, the operator must manually adjust speed of mixer drum 702 based on vehicle speed, acceleration, fullness, and road grade while driving concrete mixer truck 600. If the operator does not manually adjust speed of mixer drum 702 while driving concrete mixer truck 600, spillage of concrete contained within mixer drum 702 may occur. Advantageously, wet load drum mode 1110 removes the need for the operator to manually adjust the mixer drum speed while driving and reduces the skillset needed to operate concrete mixer truck 600.

Admixture drum mode 1112 causes mixer drum 702 to operate such that a mixture is properly mixed after it is added to mixer drum 702, according to an exemplary embodiment. Admixture drum mode 1112 may cause mixer drum 702 to spin at a mixing drum speed for a settable or predetermined number of revolutions. In response to completing the selected or predetermined number of revolutions, mixer drum 702 may be transitioned into a constant speed mode (where mixer drum 702 rotates at a constant speed) or into smooth drum mode 1106. Advantageously, admixture drum mode 1112 reduces fuel usage by preventing mixer drum 702 from excessive/unneeded revolutions, increases drum life, and reduces the likelihood of over/under mixing the concrete in mixer drum 702. Additionally, admixture drum mode 1112 advantageously removes the need for the operator to manually monitor the number of revolutions of mixer drum 702.

Aggressive drum mode 1116 causes mixer drum 702 to operate without any ramping or smoothing features to smoothly reduce mixer drum momentum when a drum stop is engaged or when switching between charge and discharge, according to an exemplary embodiment. Aggressive drum mode 1116 can be used to rock mixer drum 702 in the case of materials/concrete mixture stuck within mixer drum 702. Advantageously, this can be used to clear clogs, clumps, etc., to clear mixer drum 702. For example, when in aggressive drum mode 1116, mixer drum 702 may be driven to rotate in a first direction for a predetermined amount of time or a predetermined angular distance, then suddenly stopped, then driven to rotate in an opposite direction.

In some embodiments, drum modes 1101 includes an empty load drum mode and a dry load drum mode. In some embodiments, both empty load drum mode and dry load drum mode cause mixer drum 702 to spin at a low speed (e.g., less than 2 rpm). In some embodiments, empty load drum mode keeps mixer drum 702 spinning at a low speed to keep rollers of mixer drum 702 from flat spotting. In some embodiments, empty load drum mode causes mixer drum 702 to spin at an angular speed of less than 1 rpm. In some embodiments, empty load drum mode can be transitioned into after mixture has exited mixer drum 702 and mixer drum 702 is completely empty or nearly empty. In some embodiments, dry load drum mode causes mixer drum 702 to rotate at angular speed less than wet load drum mode 1110. In some embodiments, dry load drum mode causes mixer drum 702 to rotate at an angular speed of approximately 1-1.5 rpm. In some embodiments, dry load drum mode causes mixer drum 702 to rotate just fast enough to keep material in mixer drum 702 and keep rollers of mixer drum 702 from flat spotting. In some embodiments, dry load drum mode can be transitioned into before water has been added to the mixture or if the mixture of mixer drum 702 is relatively dry.

As shown in FIG. 12, a mode controller 1204 of a system 1200 for the mixer truck 600 is configured to perform switching between various predetermined modes of operation, according to an exemplary embodiment. System 1200 illustrates the information which mode controller 1204 may receive and output to mixer drum 702 and chute 712 of concrete mixer truck 600 or to generate control signals (e.g., direction and/or speed) for mixer drum 702 and/or chute 712 of concrete mixer truck 600 to operate mixer truck 600 and/or chute 712 according to a selected mode. Mode controller 1204 can receive mode selection commands from user interface device 1202. User interface device 1202 may include one or more display devices, buttons, switches, touchscreens, etc., configured to display a currently selected mode and configured to receive a user input to cause mixer drum 702 and/or chute 712 to operate according to one of drum modes 1101 or to transition concrete mixer truck 600 between the various drum modes 1101. In some embodiments, user interface device 1202 includes (e.g., displays) GUI 1100, facilitating selection of drum modes 1101 and displaying various information (e.g., slump 1104, pressure 1118, drum speed 1102, a currently selected drum mode, etc.). Mode controller 1204 can be positioned locally on the mixer truck 600.

Mode controller 1204 may adjust an operation of mixer drum 702 and/or chute 712 to operate according to the selected drum mode, or may cause drum assembly controller 752 to operate according to the selected drum mode. In some embodiments, mode controller 1204 is drum assembly controller 752 and/or incorporates some or all of the functionality of drum assembly controller 752 to adjust an operation of mixer drum 702 and/or chute 712. For example mode controller 1204 may provide drum assembly controller 752 with setpoints (e.g., a drum speed setpoint), control signals, etc., and drum assembly controller 752 may use these setpoints and/or control signals to cause mixer drum 702 and/or chute 712 to operate according to the selected predefined mode of operation.

Mode controller 1204 is shown receiving vehicle speed 708 (v), mixer drum speed 1210 ($\omega$), mixer drum revolutions 1212 (# rev), vehicle angle 1214 ($\theta$), and mode selection. Mode controller 1204 may receive any of this information from one or more sensors, systems, devices, etc., present on concrete mixer truck 600. For example, mode controller 1204 may receive any of this information from a McNeilus FLEX Controls™ system present on concrete mixer truck 600. In another example, mode controller 1204 receives mixer drum speed 1210 from a speed sensor configured to measure an angular velocity of mixer drum 702. Similarly, mode controller 1204 may directly receive any of vehicle speed 708, mixer drum speed 1210, mixer drum revolutions 1212, vehicle angle 1214, etc., directly from sensors.

Vehicle speed 708 is a value of a present velocity of concrete mixer truck 600, according to some embodiments. For example, vehicle speed 708 may have units of miles per hour, meters per second, feet per second, etc. Mixer drum speed 1210 is a value of a present angular velocity of mixer drum 702, according to some embodiments. Mixer drum revolutions 1212 is a value of a number of revolutions completed over a time period, according to some embodiments. Vehicle angle 1214 is a value of an orientation of concrete mixer truck 600 relative to a reference orientation, according to some embodiments. For example, vehicle angle 1214 may indicate a current pitch of concrete mixer truck 600 (e.g., if concrete mixer truck 600 is positioned on a hill or an inclined surface). In some embodiments, vehicle angle 1214 is received from an orientation sensor (e.g., a gyroscope) which indicates an orientation of concrete mixer truck 600. In some embodiments, vehicle angle 1214 is an angle of turn of concrete mixer truck 600. In some embodiments, vehicle angle 1214 is an angle of concrete mixer truck 600 relative to a spreading zone (e.g., a zone to be filled with mixture present in mixer drum 702).

Mode controller 1204 uses the vehicle speed 708, mixer drum speed 1210, mixer drum revolutions 1212, and vehicle angle 1214 in addition to the selected mode to determine at least one of direction and speed of mixer drum 702 and/or at least one of direction and speed of chute 712 to cause mixer drum 702 and/or chute 712 to operate according to the selected mode. In some embodiments, mode controller 1204 stores a set of equations, relationships, rules, instructions, functions, programs, etc., associated with each of the drum modes 1101 and based on the selected mode, operates to produce direction/speed of mixer drum 702 and/or direction/speed of chute 712 according to the selected mode. Mode controller 1204 is described in greater detail below with reference to FIG. 13.

Figure 13:
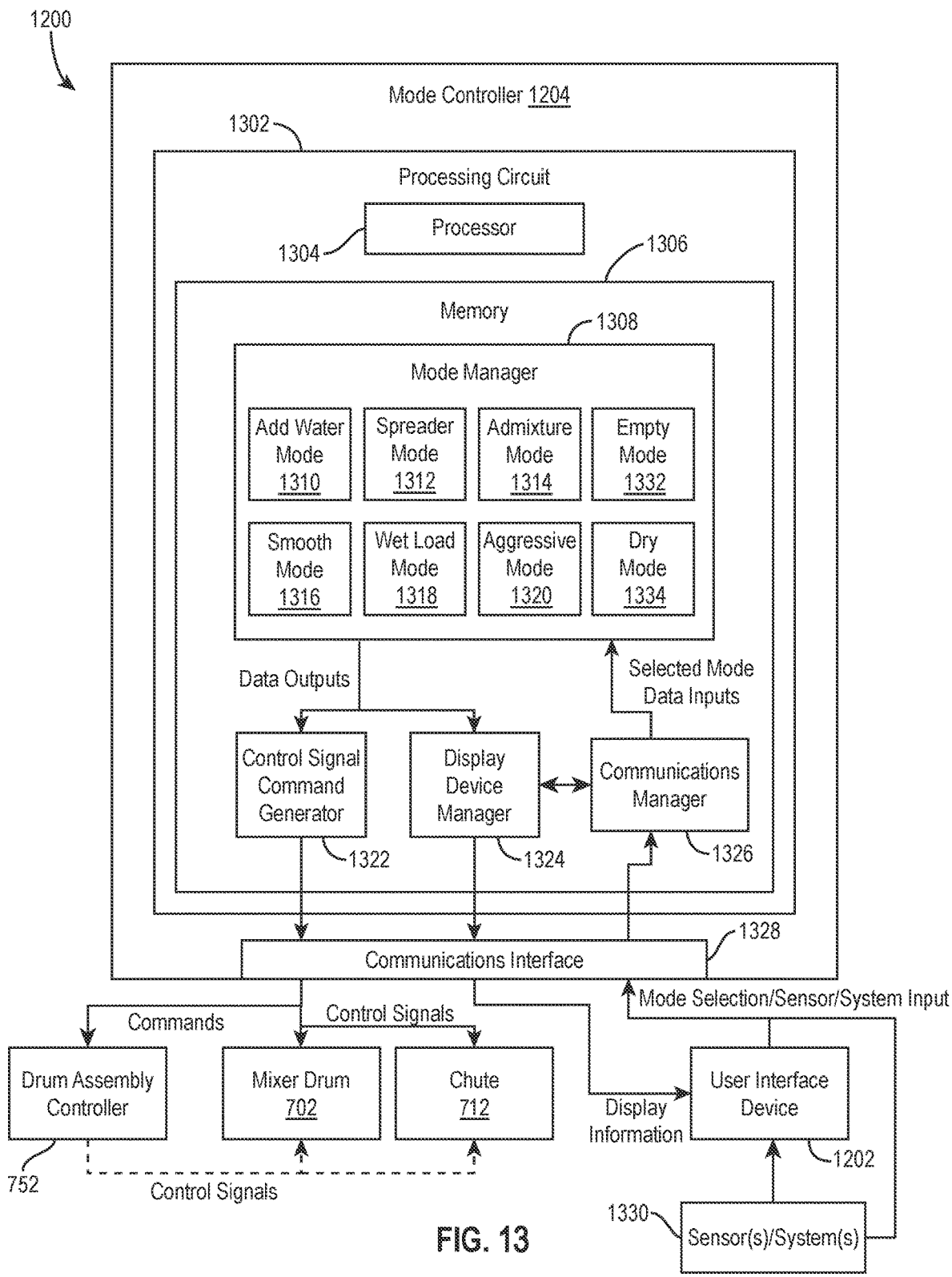
FIG. 13 is a block diagram of the mode controller of FIG. 12, according to an exemplary embodiment.

Referring now to FIG. 13, mode controller 1204 is shown in greater detail, according to an exemplary embodiment. Mode controller 1204 is configured to receive mode selection inputs from user interface device 1202, sensor/system inputs from sensors/systems 1330, and transition mixer drum 702 and/or chute 712 between various predefined modes of operation, according to some embodiments. In some embodiments, sensors/systems 1330 include any sensors present on concrete mixer truck 600 and any systems (e.g., control systems, measurement systems, monitoring systems, vehicle electronic systems, etc.). For example, sensor/systems 1330 may include one or more sensors and/or systems configured to measure and/or monitor mixer drum revolutions 1212, mixer drum speed 1210, vehicle angle 1214, vehicle speed 708, a position of mixer drum 702, a position and speed of chute 712, a weight of mixer drum 702, etc. In some embodiments, sensor/systems 1330 includes a McNeilus FLEX Controls™ system. In some embodiments, sensors/systems 1330 are configured to communicably connect with user interface device 1202 to display various information determined, measured, monitored, detected, etc., by sensors/systems 1330. In some embodiments, sensors/systems 1330 include sensors and/or systems configured to determine an event. In some embodiments, user interface device 1202 is a component of sensors/systems 1330. Mode controller 1204 may receive any sensory information, sensor signals, mode selections (e.g., from user interface device 1202, from sensors/systems 1330, etc.) and determine commands for drum assembly controller 752 and/or control signals to directly control mixer drum 702 and/or chute 712 to operate according to the selected predefined mode of operation. In some embodiments, sensors/systems 1330 is configured to monitor, measure, sense, detect, etc., any of vehicle speed 708, mixer drum speed 1210, mixer drum revolutions 1212, and vehicle speed 708, or any other information required for mode manager 1308 to determine commands/control signals to operate mixer drum 702 and/or chute 712 according to a predefined mode.

In some embodiments, mode controller 1204 uses commands received from user interface device 1202 to transition mixer drum 702 and/or chute 712 between the various predefined modes of operation. In some embodiments, the command to transition between the various predefined modes of operation is an input at user interface device 1202 including but not limited to any of actuating a button, actuating a switch, touching a touchscreen, etc. In some embodiments, user interface device 1202 is configured to receive sensor/system information from sensors/systems 1330 and either display information regarding various sensory inputs and/or information determined by one or more systems. In some embodiments, user interface device 1202 or mode controller 1204 is configured to analyze any of the sensor/system information received from sensors/systems 1330 to determine if an event has occurred (e.g., a high slump event). In some embodiments, sensors/systems 1330 are configured to provide mode controller with information regarding an event. In some embodiments, sensors/systems 1330 are configured to analyze various sensor/system information to determine if an event has occurred which should be responded to with changing an operation of mixer drum 702 and/or chute 712 (e.g., transition into a different predefined mode of operation, transition between drum modes 1101 in response to the event, etc.). In some embodiments, if an event occurs which should be responded to with a transition between drum modes 1101, sensors/systems 1330 provide mode controller 1204 with at least one of the event which occurred and a determination of what drum mode 601 to transition into.

Referring still to FIG. 13, mode controller 1204 includes a communications interface 828 and a processing circuit 1302, according to some embodiments. Communications interface 828 may include wired or wireless interfaces (e.g., jacks, antennas, transmitters, receivers, transceivers, wire terminals, etc.) for conducting data communications with various systems, devices, sensors, or networks. For example, communications interface 828 may include an Ethernet card and port for sending and receiving data via an Ethernet-based communications network and/or a Wi-Fi transceiver for communicating via a wireless communications network. Communications interface 828 may be configured to communicate via local area networks or wide area networks (e.g., the Internet, a building WAN, etc.) and may use a variety of communications protocols (e.g., BACnet, IP, LON, etc.). In some embodiments, communications interface 828 is a universal serial bus interface and is configured to communicate serially with one or more various systems, devices, sensors, or networks. In some embodiments, communications interface 828 is any other serial communications interface.

Communications interface 828 may be a network interface configured to facilitate electronic data communications between mode controller 1204 and various external systems or devices (e.g., user interface device 1202, drum assembly controller 752, mixer drum 702, chute 712, sensors/systems 1330, remote server 780, motor 726, motor 626, drum drive system 720, etc.). For example, mode controller 1204 may receive mode selection and sensor/system inputs from user interface device 1202 and/or sensors/systems 1330 and output commands and/or control signals to drum assembly controller 752, mixer drum 702, chute 712, motor 726, engine 616, motor 626, etc. via communications interface 828.

Still referring to FIG. 13, processing circuit 1302 is shown to include a processor 1304 and memory 1306, according to some embodiments. Processor 1304 may be a general purpose or specific purpose processor, an application specific integrated circuit (ASIC), one or more field programmable gate arrays (FPGAs), a group of processing components, or other suitable processing components. Processor 1304 may be configured to execute computer code or instructions stored in memory 1306 or received from other computer readable media (e.g., CDROM, network storage, a remote server, etc.).

Memory 1306 may include one or more devices (e.g., memory units, memory devices, storage devices, etc.) for storing data and/or computer code for completing and/or facilitating the various processes described in the present disclosure. Memory 1306 may include random access memory (RAM), read-only memory (ROM), hard drive storage, temporary storage, non-volatile memory, flash memory, optical memory, or any other suitable memory for storing software objects and/or computer instructions. Memory 1306 may include database components, object code components, script components, or any other type of information structure for supporting the various activities and information structures described in the present disclosure. Memory 1306 may be communicably connected to processor 1304 via processing circuit 1302 and may include computer code for executing (e.g., by processor 1304) one or more processes described herein.

Referring still to FIG. 13, memory 1306 is shown to include mode manager 1308, communications manager 1326, display device manager 1324, and control signal command generator 1322, according to some embodiments. Communications manager 1326 receives any of a mode selection, sensor/system inputs, and event inputs and determines if mode manager 1308 should transition between drum modes 1101 based on the received mode selection, sensor/system inputs, and even inputs, according to some embodiments. In some embodiments, communications manager 1326 is configured to receive and analyze sensor/system information and determine if an event has occurred (e.g., slump has exceeded a predetermined threshold value, indicating an added water event) and cause mode manager 1308 to transition into an appropriate mode (e.g., wet load mode 1318 or add water mode 1310). In some embodiments, communications manager 1326 receives a command from user interface device 1202 and causes mode manager 1308 to transition between a first mode to a second mode (e.g., from add water mode 1310 to smooth mode 1316) based on the received command.

In some embodiments, communications manager 1326 is configured to receive sensor/system inputs and convert the sensor/system inputs to a data form which mode manager 1308 can use to determine data outputs. For example, in some embodiments, communications manager 1326 receives a signal from an rpm sensor via communications interface 828, and determines an rpm value (w) based on the signal received from the rpm sensor. In some embodiments, communications manager 1326 is configured to receive or determine an event and provide display device manager 1324 with information regarding the type of event and any other relevant event information. In some embodiments, display device manager 1324 uses the received event and relevant event information to provide a notification (e.g., an alert) regarding the event and the relevant event information. In some embodiments, communications manager 1326 is configured to provide mode manager 1308 with a command to transition from a first mode to a second mode (e.g., smooth mode 1316 to spreader mode 1312) and provides display device manager 1324 with an indication regarding the mode transition. In some embodiments, display device manager 1324 uses the indication to cause user interface device 1202 to display an alert and/or notification regarding the mode transition. In some embodiments, communications manager 1326 is configured to provide mode manager 1308 with any of vehicle speed 708, mixer drum speed 1210, mixer drum revolutions 1212, and vehicle angle 1214 as received from sensors/systems 1330 via communications interface 828.

Referring still to FIG. 13, memory 1306 includes mode manager 1308, according to some embodiments. In some embodiments, mode manager 1308 is configured to adjust an operation of at least mixer drum 702 and chute 712 to operate according to a predefined mode of operation. In some embodiments, mode manager 1308 includes add water mode 1310, spreader mode 1312, admixture mode 1314, smooth mode 1316, wet load mode 1318, aggressive mode 1320, empty mode 832, and dry mode 834. In some embodiments, mode manager 1308 includes a set of instructions (e.g., equations, functions, scripts, relationships, rules, data, etc.) for determining operational values (e.g., direction of rotation, speed of rotation) of mixer drum 702 and chute 712 such that mixer drum 702 and/or chute 712 operate according to one of modes 810-820 and 832-834. In some embodiments, mode manager 1308 receives a command from communications manager 1326 to transition into a predefined mode of operation (e.g., aggressive mode 1320) and required informational inputs (e.g., at least one of vehicle speed 708, mixer drum speed 1210, mixer drum revolutions 1212, vehicle angle 1214, etc.) to determine operational properties of mixer drum 702 and/or chute 712 such that mixer drum 702 and/or chute 712 operate according to the predefined mode. In some embodiments, any of the outputs of mode manager 1308 may be referred to as control variables.

Referring still to FIG. 13, mode manager 1308 is shown to include add water mode 1310, according to some embodiments. In some embodiments, add water mode 1310 is add water drum mode 1114 as shown and described in greater detail above with reference to FIG. 11. In some embodiments, add water mode 1310 can be implemented immediately after water is added to mixer drum 702 to sufficient mix the concrete/mixture present in mixer drum 702. When add water mode 1310 is selected, mode manager 1308 determines a speed at which mixer drum 702 should rotate and a number of revolutions mixer drum 702 complete, according to some embodiments. In some embodiments, add water mode 1310 sets mixer drum speed 1210 to a predetermined add water speed. In some embodiments, the predetermined add water speed of mixer drum 702 is greater than 7 rpm. In some embodiments, when in add water mode 1310, mode manager 1308 monitors a total number of revolutions completed, and continues causing mixer drum to operate at the predetermined add water speed until the total number of revolutions meets a predetermined number of revolutions. In some embodiments, the predetermined number of revolutions is a value based on an ASTM C94 standard and is 30 revolutions. In some embodiments, after the predetermined number of revolutions at the predetermined add water speed has been completed, mode manager 1308 automatically transitions into a constant speed mode or smooth mode 1316. In some embodiments, add water mode 1310 causes mixer drum 702 to operate according to the following conditions:

If: $rev_{total} < rev_{threshold}$ Then: $\omega = \omega_{AWM}$

If $rev_{total} \geq rev_{threshold}$ Then: Transition Mode where $rev_{total}$ is a total number of revolutions completed since add water mode 1310 was first implemented, $\omega$ is an angular speed of mixer drum 702, $rev_{threshold}$ is a predetermined number of revolutions for add water mode 1310 (e.g., 30 revolutions as set by ASTM C94), and $\omega_{AWM}$ is a predetermined add water speed (e.g., >7 rpm).

In some embodiments, $rev_{threshold}$ is a predefined value, while in other embodiments, $rev_{threshold}$ is a value set by a user before add water mode 1310 is implemented. In some embodiments, $\omega_{AWM}$ is also settable by a user before add water mode 1310 is implemented. In some embodiments, once the total number of completed revolutions satisfies/meets the total number of revolutions for add water mode 1310, mode manager 1308 transitions into another mode. For example, mode manager 1308 may transition into smooth mode 1316 after add water mode 1310 has been completed (e.g., $rev_{total} \geq rev_{threshold}$).

Advantageously, add water mode 1310 facilitates proper mixing after water addition without the need for an operator/user to manually watch a drum counter, according to some embodiments. This may save fuel, increase life of mixer drum 702, and reduce the occurrence of under/over mixing concrete.

Referring still to FIG. 13, mode manager 1308 includes admixture mode 1314, according to some embodiments. In some embodiments, admixture mode 1314 is admixture drum mode 1112 as shown and described in greater detail above with reference to FIG. 11. In some embodiments, admixture mode 1314 can be implemented immediately after an admixture is added to mixer drum 702 to sufficient mix the concrete/mixture present in mixer drum 702. In some embodiments, admixture mode 1314 causes mixer drum 702 to operate similarly to add water mode 1310. For example, admixture mode 1314 may cause mixer drum 702 to rotate for a predefined number of revolutions at a predetermined mixer drum speed. However, in some embodiments, admixture mode 1314 causes mixer drum 702 to rotate at an admixture mode speed, $\omega_{admixture}$, for a predetermined number of revolutions, $rev_{threshold,admixture}$. In some embodiments, the admixture mode drum speed $\omega_{admixture}$ is the same as $\omega_{AWM}$ (e.g., greater than 7 rpm). In some embodiments, the predetermined number of revolutions $rev_{threshold,admixture}$ for admixture mode 1314 is different than $rev_{threshold}$. In some embodiments, the predetermined number of revolutions for admixture mode 1314 is 70 revolutions as set by ASTM C94. Admixture mode 1314 facilitates the same advantages of add water mode 1310 by reducing the need for an operator to manually watch a drum counter and saving fuel, increasing life of mixer drum 702, and reducing the occurrence of over/under mixing concrete/mixture present in mixer drum 702, according to some embodiments.

Referring still to FIG. 13, mode manager 1308 includes smooth mode 1316, according to some embodiments. In some embodiments, smooth mode 1316 is smooth drum mode 1106 as shown and described in greater detail above with reference to FIG. 11. In some embodiments, smooth mode 1316 is a standard mode of operation, and unless mode manager 1308 transitions into one of the other modes, mode manager 1308 defaults to causing mixer drum 702 to operate according to smooth mode 1316. In some embodiments, smooth mode 1316 causes mixer drum 702 to rotate at a predetermined smooth mode speed $\omega_{smooth}$ indefinitely. In some embodiments, $\omega_{smooth}$ is less than $\omega_{admixture}$ and $\omega_{AWM}$. In some embodiments, mode manager 1308 returns to smooth mode 1316 in response to a key cycle (e.g., ignition).

Referring still to FIG. 13, mode manager 1308 includes wet load mode 1318, according to some embodiments. In some embodiments, wet load mode 1318 is wet load drum mode 1110 as shown and described in greater detail above with reference to FIG. 11. In some embodiments, when mode manager 1308 is in wet load mode 1318, mixer drum 702 is kept rotating faster when concrete mixer truck 600 is moving at a slower speed. Advantageously, this keeps material/concrete/cement present in mixer drum 702 further forwards (e.g., towards cab 614). Advantageously, this may prevent wet loads from spilling out of mixer drum 702. In some embodiments, wet load mode 1318 causes mixer drum 702 to rotate at a wet load speed $\omega_{wet}$. In some embodiments, $\omega_{wet}$ is inversely proportional to a speed of concrete mixer truck 600, v:

$$\omega_{wet} \propto \frac{1}{v}.$$

In some embodiments, wet load mode 1318 determines $\omega_{wet}$ based on speed v of concrete mixer truck 600 and a current speed of mixer drum 702. This relationship is shown as:

$$\omega_{wet} = f_{wet}(v, \omega_{current})$$

where $\omega_{current}$ is a current speed of mixer drum 702, and $f_{wet}$ is a function (e.g., linear, non-linear, etc.) relating $\omega_{wet}$ to the speed v of concrete mixer truck 600 and the current speed $\omega_{current}$ of mixer drum 702, according to some embodiments. In some embodiments, wet load mode 1318 determines an amount to increase or decrease the current speed of mixer drum 702 based on the current speed of mixer drum 702 and the speed v of concrete mixer truck 600. In some embodiments, the increase or decrease is determined by:

$$\Delta\omega_{current} = f_{\Delta}(v, \omega_{current})$$

where $\Delta\omega_{current}$ is an amount to increase or decrease $\omega_{current}$ to achieve $\omega_{wet}$, and $f_{\Delta}$ is a function relating $\Delta\omega_{current}$ to v and $\omega_{current}$.

Wet load mode 1318 may be activated by an operator when a full load with a high slump is present in mixer drum 702 (usually before leaving the plant). Advantageously, wet load mode 1318 removes the need for the operator to manually control the speed of mixer drum 702 while driving. In some embodiments, wet load mode 1318 includes rotating or driving mixer drum 702 at a specific speed for a full load with a high slump.

Referring still to FIG. 13, mode manager 1308 includes spreader mode 1312, according to some embodiments. In some embodiments, spreader mode 1312 is spreader drum mode 1108 as shown and described in greater detail above with reference to FIG. 11. In some embodiments, spreader drum mode 1108 is activated by an operator for spreading a cement slurry contained in mixer drum 702. In some embodiments, when mode manager 1308 is in spreader mode 1312, mode manager 1308 controls an operation of mixer drum 702 and chute 712 to deliver and spread the cement slurry mixture. In some embodiments, spreader mode 1312 includes determining at least one of when to start rotating mixer drum 702, when to stop rotating mixer drum 702, speed of mixer drum 702, pivoting speed of chute 712, a direction which chute 712 should pivot, a distance (e.g., an angle) that chute 712 should pivot in each direction to spread the slurry mixture, an amount of time that chute 712 should pivot in each direction to spread the slurry mixture, etc., based on vehicle speed 708 and vehicle angle 1214. In some embodiments, spreader mode 1312 determines a discharge speed, $v_{discharge}$, and a drum speed, $\omega_{discharge,drum}$ to provide the cement of mixer drum 702 to a receiving site/area at a constant volumetric flow rate. In some embodiments, spreader mode 1312 determines a speed at which to pivot chute 712 in each direction such that a certain amount of mixture (e.g., concrete, cement, etc.) is delivered to the receiving site/area.

In some embodiments, mode manage 808, when operating in spreader mode 1312, receives an input from user interface device 1202 regarding a desired depth of concrete, $d_{concrete}$, for the receiving area, an angular displacement of chute 712 in a first direction (e.g., counterclockwise), $\theta_1$, and an angular displacement of chute 712 in a second direction (e.g., clockwise), $\theta_2$. In some embodiments, $\theta_1$ and $\theta_2$ indicate a width of the receiving site/area which the mixture is to be delivered to.

In some embodiments, $d_{concrete}$, $\theta_1$, and $\theta_2$ are used to in addition to vehicle speed 708 (v) and vehicle angle 1214 ($\theta$) to determine operations of mixer drum 702 and chute 712 to provide material/mixture from mixer drum 702 to the receiving area at a constant rate. For example, as concrete mixer truck 600 drives forwards, at least one of $\omega_{discharge,drum}$ and a pivoting speed of chute 712 ($\omega_{chute}$) increases such that material/mixture is provided to the receiving area, regardless of vehicle speed 708. In some embodiments, $\omega_{chute}$ and $\omega_{discharge,drum}$ are limited to maximum speed, and therefore the operator must not operate concrete mixer truck 600 such that vehicle speed 708 exceeds a predetermined threshold value. In some embodiments, vehicle speed 708 is limited to a maximum value, $v_{vehicle,max}$. In some embodiments, as long as vehicle speed 708 remains below the maximum value $v_{vehicle,max}$, the concrete/mixture is evenly distributed throughout the receiving area.

In some embodiments, $\omega_{discharge,drum}$ and $\omega_{chute}$ are determined based on time-values. For example, in some embodiments, a first amount of time $t_1$ for chute 712 to rotate/move in a first direction, and a second amount of time $t_2$ for chute 712 to rotate in a second direction, opposite the first direction, are input through user interface device 1202. In some embodiments, the first amount of time and the second amount of time are determined based on $\theta_1$ and $\theta_2$. In some embodiments, a current position of chute 712 is determined by receiving information from a sensor configured to detect a position of chute 712. In some embodiments, the sensor is a proximity sensor, configured to sense if chute 712 is centered. In some embodiments, spreader mode 1312 centered chute 712 before implementing automatic control of mixer drum 702 and chute 712.

In some embodiments, spreader mode 1312 causes user interface device 1202 to prompt an operator of concrete mixer truck 600 to input required parameters. In some embodiments, the required parameters include at least one of $\theta_1$, $\theta_2$, $t_1$, $t_2$, and $d_{concrete}$. Spreader mode 1312 uses the input parameters in addition to vehicle speed v and vehicle angle $\theta$ to determine $\omega_{discharge,drum}$ and $\omega_{chute}$ to facilitate delivery of the mixture/concrete/cement to the receiving area at the desired thickness $d_{concrete}$, according to some embodiments.

Advantageously, automatically determining $\omega_{discharge,drum}$ and $\omega_{chute}$ facilitates easy spreading/discharge of mixture (e.g., concrete, cement, etc.) present in mixer drum 702 to a receiving site, according to some embodiments. An operator can position concrete mixer truck 600 near the receiving area such that chute 712 is above the receiving area and can implement spreader mode 1312 through user interface device 1202. The operator may be prompted to input required parameters (e.g., $d_{concrete}$, $\theta_1$, $\theta_2$, etc.). After the operator has input the required parameters and spreader mode 1312 is engaged, the operator can pull concrete mixer truck 600 forwards (or backwards depending on which end of concrete mixer truck 600 chute 712 is positioned at), and spreader mode 1312 automatically determines operations of mixer drum 702 and chute 712 (e.g., $\omega_{discharge,drum}$, $\omega_{chute}$) to provide the mixture to the receiving site across the range specified by the operator (e.g., from $\theta_1$ to $\theta_2$) at the required rate/with the required thickness/depth ($d_{concrete}$). Advantageously, this removes the need for manually moving or controlling chute 712 and mixer drum 702 to deliver the mixture to the receiving area, according to some embodiments. In some embodiments, the operator can manually input (e.g., at user interface device 1202) any of the parameters/values which spreader mode 1312 determines automatically or uses to determine the operational values of mixer drum 702 and/or chute 712 (e.g., $\omega_{discharge,drum}$, $\omega_{chute}$, $t_1$, $t_2$, $v_{discharge}$, volumetric discharge rate, etc.).

Referring still to FIG. 13, mode manager 1308 includes aggressive mode 1320, according to some embodiments. In some embodiments, aggressive mode 1320 is aggressive drum mode 1116 as shown and described in greater detail above with reference to FIG. 11. In some embodiments, aggressive mode 1320 causes mixer drum 702 to operate to clear clogged or built up mixture present within mixer drum 702. For example, if during spreader mode 1312, mixer drum 702 and/or any components between mixer drum 702 and chute 712 to facilitate egress of the mixture from mixer drum 702 to chute 712 become clogged, mode manager 1308 can transition mixer drum 702 into aggressive mode 1320. In some embodiments, mode manager 1308 automatically transitions into spreader mode 1312 in response to a received event (e.g., a blockage/clog/build up event). In some embodiments, mode manager 1308 transitions into spreader mode 1312 in response to a manual command received from user interface device 1202. For example, if an operator sees that mixer drum 702 is clogged, the operator may manually transition mixer drum 702 into aggressive mode 1320 by inputting a command at user interface device 1202.

Aggressive mode 1320 may cause mixer drum 702 to actuatably start and stop rotating. In some embodiments, aggressive mode 1320 does not incorporate any ramping or smoothed stopping functions. For example, McNeilus FLEX Controls™ includes a Smooth Drum Stop technology which smoothly reduces drum momentum when a drum stop is engaged. In some embodiments, aggressive mode 1320 implements a drum stop but does not use the Smooth Drum Stop technology.

In some embodiments, aggressive mode 1320 includes rocking mixer drum 702 back and forth to clear any blockages or clogging. In some embodiments, aggressive mode 1320 causes mixer drum 702 to rotate a certain amount or for a certain amount of time in a first direction at a first angular speed (e.g., $\omega_1$), then rapidly decelerates mixer drum 702, bringing mixer drum 702 to a complete stop. In some embodiments, this is repeated a predetermined number of times. In some embodiments, this is repeated until a clogging or a buildup is mitigated. In some embodiments, after causing mixer drum 702 to rotate the certain amount or for the certain amount of time in the first direction at the first angular speed, mixer drum 702 is caused to rotate in an opposite direction for a second amount of time or for a second certain amount. In this way, mixer drum 702 is rocked back and forth (e.g., clockwise, then counter clockwise) and the inertial forces and momentum of mixer drum 702 cause any blockages or clogging or buildups of material within mixer drum 702 to be cleared.

Advantageously, aggressive mode 1320 facilitates easy un-clogging of mixer drum 702 and/or any other components which concrete/mixture/material may build up on, according to some embodiments. This removes the need for an operator to manually unclog mixer drum 702. In some embodiments, the rocking of mixer drum 702 is performed such that excessive inertial/momentum forces are not introduced to mixer drum 702 or components which mount mixer drum 702 to concrete mixer truck 600. In some embodiments, aggressive mode 1320 can only be activated/transitioned into if concrete mixer truck 600 is stationary, or if vehicle speed 708 is less than a maximum threshold value (e.g., 10 mph).

Referring still to FIG. 13, memory 1306 includes empty mode 832 and dry mode 834, according to some embodiments. In some embodiments, empty mode 832 is empty load drum mode and dry mode 834 is dry load drum mode as described above with reference to FIG. 11. In some embodiments, both empty mode 832 and dry mode 834 cause mixer drum 702 to spin at a low speed (e.g., less than 2 rpm). In some embodiments, empty mode 832 keeps mixer drum 702 spinning at a low speed to keep rollers of mixer drum 702 from flat spotting. In some embodiments, empty mode 832 causes mixer drum 702 to spin at an angular speed of less than 1 rpm. In some embodiments, empty mode 832 can be transitioned into after mixture has exited mixer drum 702 and mixer drum 702 is completely empty or nearly empty (e.g., in response to mode controller 1204 determining that mixer drum 702 is empty). In some embodiments, dry mode 834 causes mixer drum 702 to rotate at angular speed less than wet load mode 1318. In some embodiments, dry mode 834 causes mixer drum 702 to rotate at an angular speed of approximately 1-1.5 rpm. In some embodiments, dry mode 834 causes mixer drum 702 to rotate fast enough to keep material in mixer drum 702 and prevent rollers of mixer drum 702 from flat spotting. In some embodiments, dry mode 834 can be transitioned into before water has been added to the mixture or if the mixture of mixer drum 702 is relatively dry.

In some embodiments, mode controller 1204 automatically transitions into either dry mode 834 or empty mode 832 in response to determining that mixer drum 702 is empty, or in response to a command from user interface device 1202. For example, if mode controller 1204 receives an indication that the mixture within mixer drum 702 is dry, mode controller 1204 can automatically transition into dry mode 834. Likewise, if mode controller 1204 receives an indication that there is no material/mixture within mixer drum 702, or there is a negligible amount of material/mixture within mixer drum 702, mode controller 1204 can transition into empty mode 832.

Referring still to FIG. 13, memory 1306 includes control signal/command generator 1322 and display device manager 1324, according to some embodiments. In some embodiments, mode manager 1308 is configured to output data regarding operational settings of mixer drum 702 and/or chute 712 to cause mixer drum 702 and/or chute 712 to operate according to the selected mode. In some embodiments, control signal/command generator 1322 is configured to determine/generate control signals and provide the control signals to mixer drum 702 and/or chute 712 to cause mixer drum 702 and/or chute 712 to operate according to the output data from mode manager 1308. For example, if mode manager 1308 outputs a drum speed of 10 rpm, control signal/command generator 1322 may generate control signals to cause mixer drum 702 to rotate at the drum speed of 10 rpm. In some embodiments, control signal/command generator 1322 outputs the control signals to an element (e.g., a mover) configured to control a desired operation of mixer drum 702 and/or chute 712. For example, control signal/command generator 1322 may output control signals to one or more motors, actuators, engines, etc., to cause mixer drum 702 and/or chute 712 to operate according to the operation/data as determined by mode manager 1308.

In some embodiments, control signal/command generator 1322 is configured to output a command to a controller (e.g., drum assembly controller 752) to cause mixer drum 702 and/or chute 712 to function according to the determined operation (e.g., as determined by mode manager 1308). In some embodiments, control signal/command generator 1322 is configured to output a command to a system, controller, device, etc., which is configured to generate control signals for mixer drum 702 and/or chute 712 to adjust an operation of mixer drum 702 and/or chute 712. In some embodiments, control signal/command generator 1322 outputs any of the command and the control signal via communications interface 828. In some embodiments, the command and/or the control signal(s) are transmitted wirelessly to a controller or device (e.g., drum assembly controller 752 and motor 726). In some embodiments, the command(s) and/or the control signal(s) are transmitted via a wired connection between communications interface 828 and one or more controllers, motors, systems, etc., configured to adjust an operation of mixer drum 702 and/or chute 712.

In some embodiments, display device manager 1324 is configured to cause user interface device 1202 to display information regarding a selected mode. In some embodiments, display device manager 1324 receives the data outputs/determined operational values of mixer drum 702 and/or chute 712 from mode manager 1308 and causes user interface device 1202 to display the data outputs/determined operational values of mixer drum 702 and/or chute 712. For example, if mode manager 1308 outputs $\omega_{discharge,drum}=-7$ rpm, display device manager 1324 may cause user interface device 1202 to display a notification that indicates the present value (i.e., −7 rpm) of $\omega_{discharge,drum}$.

Figure 14:
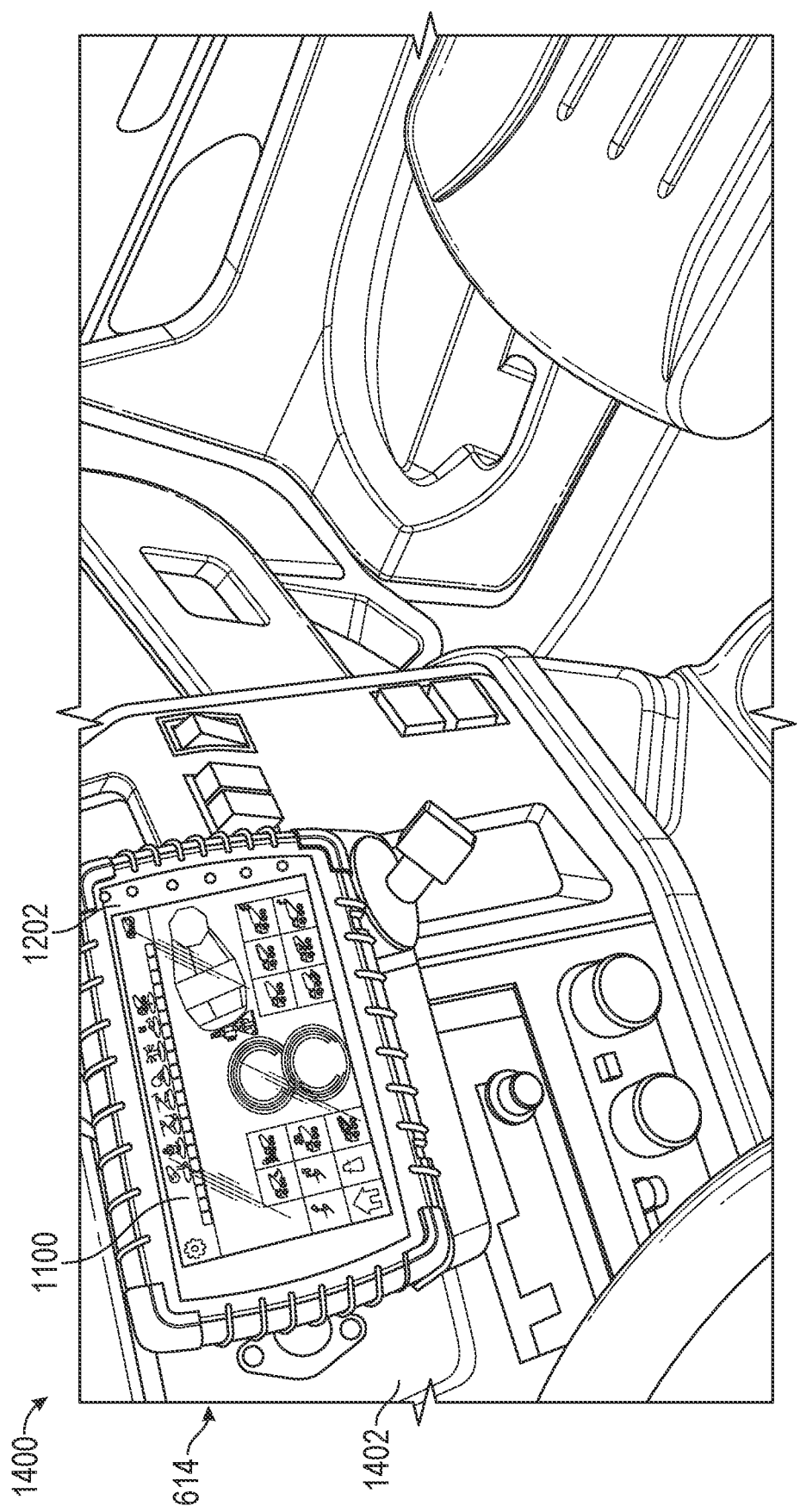
FIG. 14 is an interior view of a cab of the concrete mixer truck of FIG. 6, shown to include a display device, according to an exemplary embodiment.

Referring now to FIG. 14, display system 1400 includes user interface device 1202 positioned within cab 614 of concrete mixer truck 600, according to some embodiments. In some embodiments, user interface device 1202 is configured to display GUI 1100 to provide notifications, messages, alerts, etc., to an operator of concrete mixer truck 600. In some embodiments, user interface device 1202 is a touchscreen device, configured to receive an input from the operator to transition mixer drum 702 and/or chute 712 between various predefined modes of operation, as described in greater detail above with reference to FIGS. 6 and 8. In some embodiments, user interface device 1202 is mounted to a dashboard 1402 of cab 614.

Figure 15:
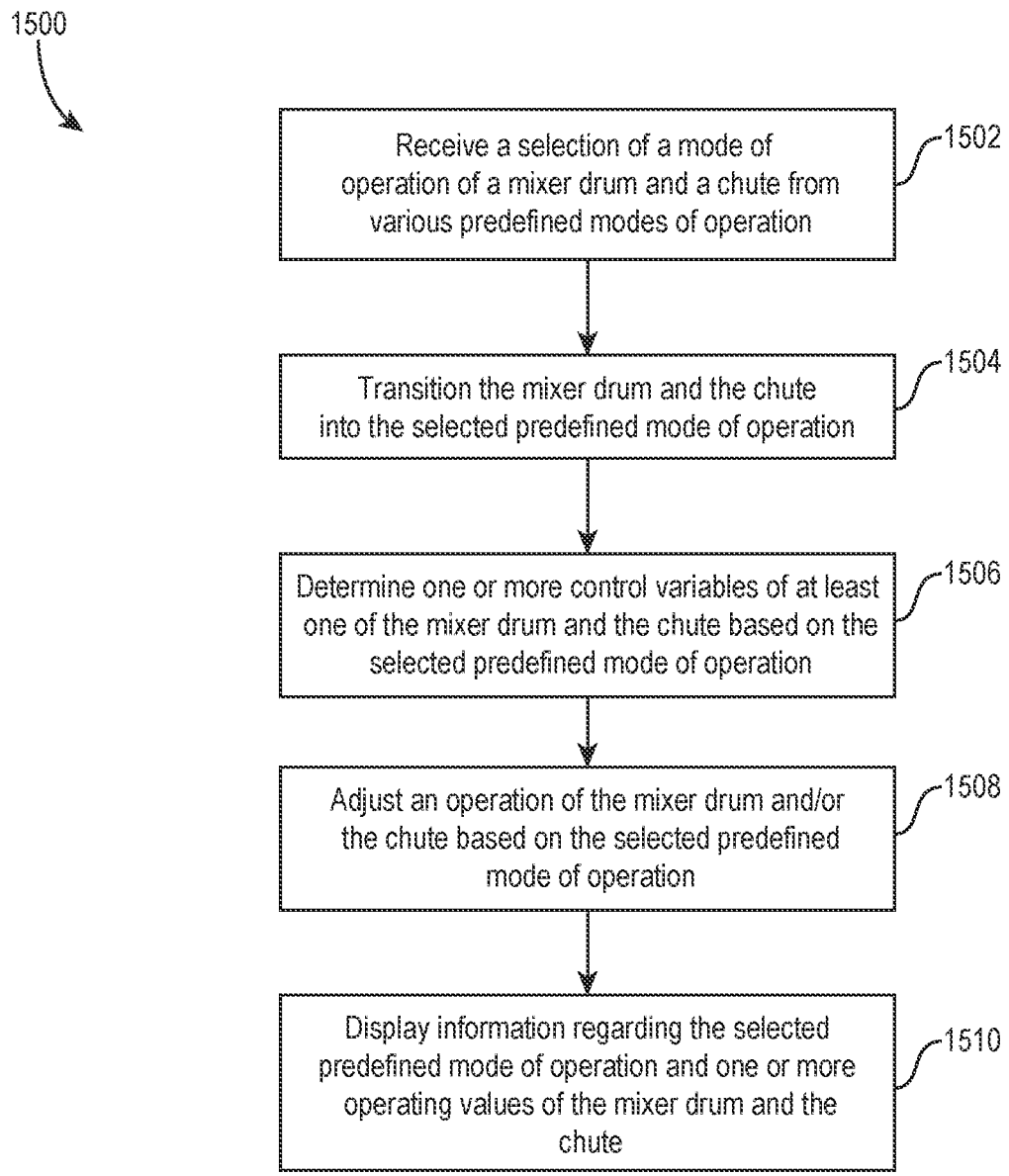
FIG. 15 is a method for selectably transitioning a concrete mixer truck between various predefined modes of operation, according to an exemplary embodiment.

Referring now to FIG. 15, a process 1500 for transitioning a concrete mixer truck between various predefined modes of operation is shown, according to some embodiments. In some embodiments, process 1500 may be performed by mode controller 1204, user interface device 1202, and drum assembly controller 752, or any other device, system, controller, etc., configured to control an operation of mixer drum 702 and/or chute 712.

Process 1500 includes receiving a selection of a mode of operation of a mixer drum (e.g., mixer drum 702) and a chute (e.g., chute 712) from various predefined modes of operation (step 1502), according to some embodiments. In some embodiments, step 1502 includes receiving the selection from a user interface device. In some embodiments, the received selection is an event. In some embodiments, the event indicates a transition from one predefined mode to another predefined mode of operation of the mixer drum and the chute. In some embodiments, the selection and/or the event are received by mode controller 1204 (or more specifically, communications manager 1326) via communications interface 828. In some embodiments, the various predefined modes of operation include but are not limited to an add water mode, a spreader mode, an admixture mode, a smooth mode, a wet load mode, and an aggressive mode.

Process 1500 includes transitioning the mixer drum and the chute into the selected predefined mode of operation (step 1504), according to some embodiments. In some embodiments, step 1504 is performed by mode controller 1204 or, more particularly, mode manager 1308. In some embodiments, the mixer drum and the chute are selected into the predefined mode of operation in response to at least one of an event, a selected input, etc.

Process 1500 includes determining one or more control variables of at least one of the mixer drum and the chute based on the selected predefined mode of operation (step 1506), according to some embodiments. In some embodiments, the one or more control variables are determined by mode controller 1204 or more specifically mode manager 1308 of mode controller 1204. In some embodiments, the one or more control variables are determined using at least one of an equation, a set of equations, a set of rules, a function, a lookup table, etc., corresponding the selected predefined mode of operation. In some embodiments, each of the various predefined modes of operation includes a corresponding equation, set of equations, set of rules, function, or lookup table, etc., used to determine one or more control variables for the mixer drum (e.g., mixer drum 702) and the chute (e.g., chute 712) for the selected predefined mode of operation. In some embodiments, the one or more control variables are used to determine control signals for controllable elements (e.g., mixer drum 702, chute 712) to adjust an operation of the controllable elements. In some embodiments, mode controller 1204 is configured to use the one or more control variables to determine control signals for the controllable elements. In some embodiments, mode controller 1204 is configured to provide the one or more control variables to another controller, system, device, etc., configured to use the one or more control variables to generate control signals for the controllable elements to implement the selected predefined mode of operation.

Process 1500 includes adjusting an operation of the mixer drum (e.g., mixer drum 702) and/or the chute (e.g., chute 712) based on the selected predefined mode of operation (step 1508), according to some embodiments. In some embodiments, the operation of the mixer drum and/or the chute are adjusted based on the one or more control variables determined in step 1506. In some embodiments, the operation of the mixer drum and/or the chute are adjusted based on the control variables determined in step 1506 and one or more operational values of the concrete mixer truck, or the mixer drum, or the chute (e.g., v of the truck, w of the mixer drum, etc.). In some embodiments, step 1508 is performed by mode controller 1204. In some embodiments, step 1508 is performed by another controller configured to communicably connect with mode controller 1204, receive the one or more control variables, and generate control signals to adjust an operation of the mixer drum and/or the chute.

Process 1500 includes displaying information regarding the selected predefined mode of operation and one or more operating values of the mixer drum and/or the chute (step 1510), according to some embodiments. In some embodiments, step 1510 is performed by mode controller 1204 and/or user interface device 1202. In some embodiments, user interface device 1202 displays information regarding the selected predefined mode of operation to a user (e.g., an operator of the concrete mixer truck). In some embodiments, the one or more operation values of the mixer drum and the chute are live-values, indicating a present operational status of the mixer drum and/or the chute.

Concrete Mixer Vehicle with Autonomous Modes

Figure 16:
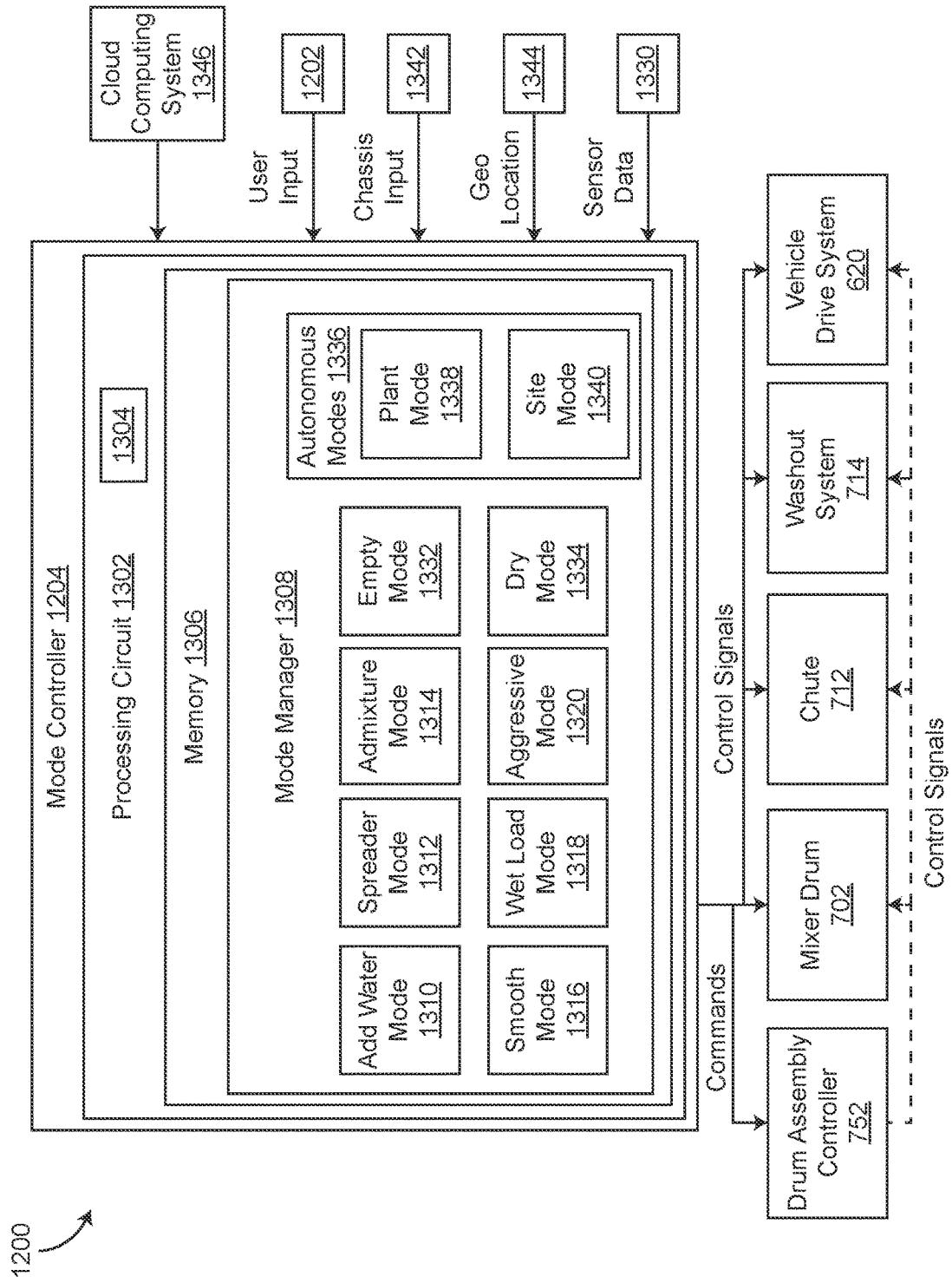
FIG. 16 is a block diagram of the mode controller of FIG. 13 including one or more autonomous modes, according to an exemplary embodiment.
Figure 17:
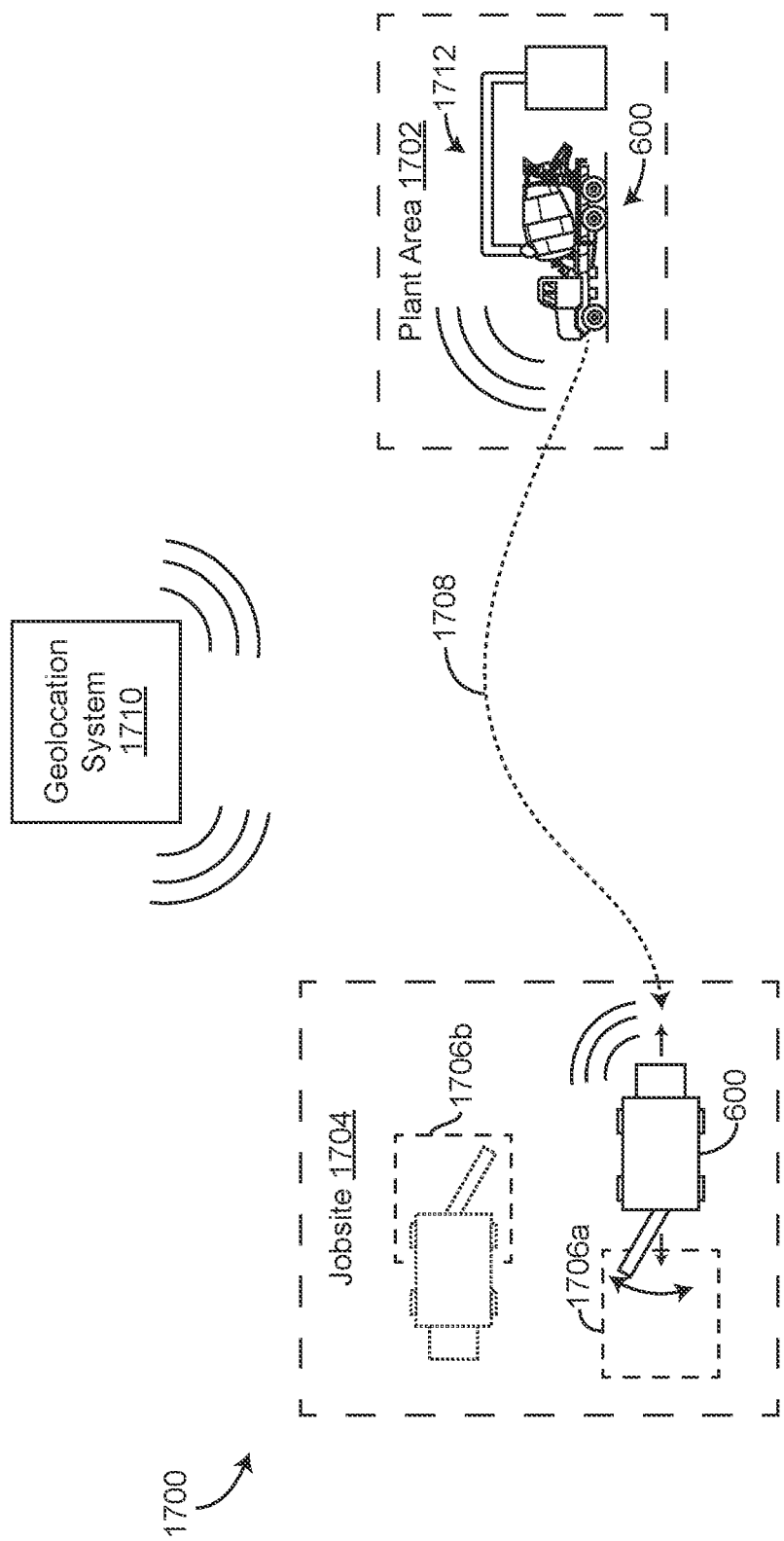
FIG. 17 is a diagram showing a concrete mixer truck transporting between a plant area and a jobsite while communicating with a geolocation system, according to an exemplary embodiment.
Figure 18:
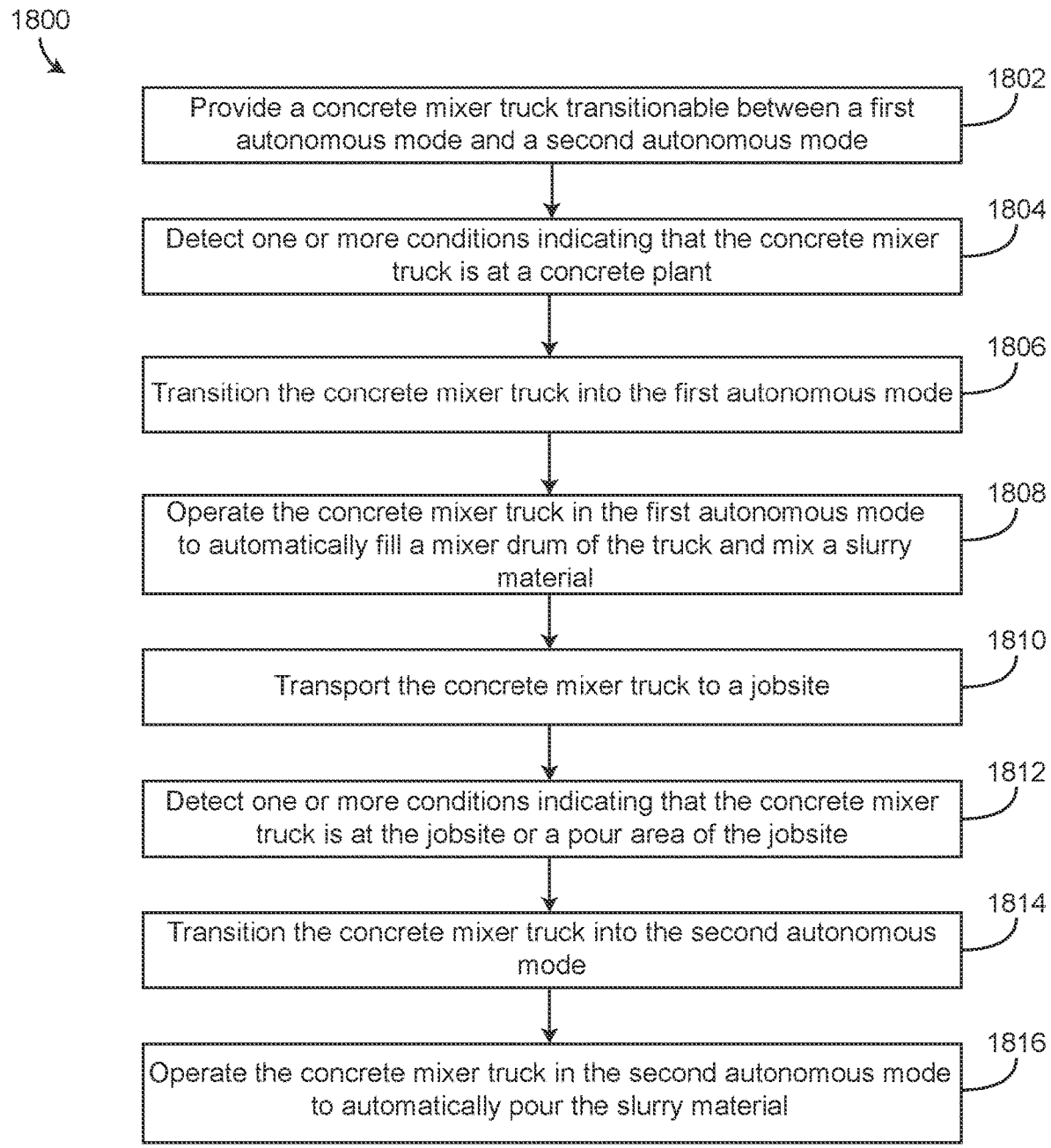
FIG. 18 is a flow diagram for operating a concrete mixer truck according to different autonomous modes, according to an exemplary embodiment.

Referring particularly to FIGS. 16-18, the concrete mixer truck 600 is transitionable between different autonomous modes, according to an exemplary embodiment. For example, the concrete mixer truck 600 may be transitionable between a first autonomous mode when geographically located at a plant, and a second autonomous mode when geographically located at a jobsite. The concrete mixer truck

600 can be automatically or manually transitioned between the first and the second autonomous mode. The concrete mixer truck 600 can implement any of the functionality of tracking and alert system 300 to facilitate operation of the concrete mixer truck 600 while in any of the autonomous modes (e.g., operation of systems, transportation, implements, etc., thereof) or to facilitate automatic transitioning between the autonomous modes. In some embodiments, any of the autonomous modes described herein are also configured to perform any of the functionality of the add water mode 1310, the spreader mode 1312, the admixture mode 1314, the smooth mode 1316, the wet load mode 1318, the aggressive mode 1320, or the dry mode 1334.

Referring particularly to FIG. 16, a diagram of the system 1200 according to another embodiment is shown. The mode controller 1204 includes the mode manager 1308 and is configured to generate control signals or commands for the drum assembly controller 752, the mixer drum 702, the chute 712, a washout system 714 of the concrete mixer truck 600, or the vehicle drive system 620 of the concrete mixer truck 600. The washout system 714 of the concrete mixer truck 600 is a system that is configured to clear various tubular members (e.g., by providing pressurized air, water, etc., therethrough). The tubular members can be configured to fluidly couple with an additive source, and the washout system 714 may clear or clean the tubular members.

Referring still to FIG. 16, the mode manager 1308 includes autonomous modes 1336. Specifically, the autonomous modes 1336 include a plant mode 1338 and a site mode 1340. The mode manager 1308 can transition the concrete mixer truck 600 between the plant mode 1338 and the site mode 1340 in response to a user input received from the user interface device 1202 (e.g., a button), a chassis input (e.g., a sensor or system signal, an identified behavior, an identified function, etc.) received from a chassis sensor 1342 of frame 612, a geolocation received from a geosystem 1344 (e.g., a GPS sensor, the tracking and alert system 300, a satellite, a network system, etc.), sensor data received from a sensor 1330 of the concrete mixer truck 600 (e.g., any of the sensors described herein, a weight sensor, a revolution sensor, etc.), or a command from a cloud computing system 1346.

When the mode manager 1308 transitions the concrete mixer truck 600 into the plant mode 1338, the mode manager 1308 can generate control signals for the concrete mixer truck 600 (e.g., for the drum assembly controller 752, the mixer drum 702, and the vehicle drive system 620) to facilitate automatic loading or filling of the mixer drum 702 without requiring driver interaction. For example, when the concrete mixer truck 600 is in the plant mode 1338, the mode controller 1204 can generate control signals to autonomously control the speed of the mixer drum 702, and detect when filling of the mixer drum 702 is completed. The mode controller 1204 can detect or sense when the mixer drum 702 is being loaded based on the sensor data received from the sensor(s) 1330 (e.g., hydraulic sensor information, weight information, etc.), or based on the geolocation received from the geosystem 1344 (e.g., indicating that the concrete mixer truck 600 is positioned beneath a filling or concrete plant). The mode controller 1204 can also monitor sensor data indicating a fill level of the mixer drum 702 and can integrate or communicate with a plant-local system (e.g., wirelessly) to facilitate loading or filling of the mixer drum 702 with appropriate slurry material, ingredients, additives, concrete, etc. The mode controller 1204 can also automatically operate the vehicle drive system 620 to align the mixer drum 702 for filling at the concrete plant (e.g., using the geolocation as feedback). For example, if the geolocation indicates that the concrete mixer truck 600 is within a geofence at a concrete plant, the mode controller 1204 may transition the concrete mixer truck 600 into the plant mode 1338 to facilitate autonomous filling of the mixer drum 702.

The mode controller 1204 also facilitates or controls the concrete mixer truck 600 to mix the materials within the mixer drum 702 after the mixer drum 702 has been filled. In some embodiments, the mode controller 1204 operates the drum assembly controller 752 or the mixer drum 702 (or motor, engine, or motive element thereof) to drive the mixer drum 702 to rotate to mix the material. For example, when the mode controller 1204 detects that the mixer drum 702 has been sufficiently filled with material, the mode controller 1204 may then implement an autonomous mixing function. The plant mode 1338 can implement any of the functionality of the add water mode 1310, the smooth mode 1316, the aggressive mode 1320, the dry mode 1334, etc., to facilitate autonomous mixing of the material within the mixer drum 702. The mode controller 1204 may commence mixing when it detects that a specific number of revolutions of the mixer drum 702 have been completed, or when a sensor signal from a material sensor in the mixer drum 702 indicating that the material has been sufficiently mixed, or in response to a signal from another source indicating a completion of the mixing (e.g., an input or cell signal received from the cloud computing system 1346 indicating that the concrete is mixed). The mode controller 1204 may also initiate a washout sequence to be performed by the washout system 714 based on data or information indicating a completion of loading, mixing, and/or the geolocation of the concrete mixer truck 600.

Referring still to FIG. 16, the mode controller 1204 can also be configured to transition the concrete mixer truck 600 into the site mode 1340. The concrete mixer truck 600 can automatically transition into the site mode 1340 when the geolocation of the concrete mixer truck 600 indicates that the concrete mixer truck 600 is at a jobsite. In some embodiments, the concrete mixer truck 600 is transitioned into the site mode 1340 automatically in response to the chassis input. In some embodiments, the concrete mixer truck 600 is transitioned into the site mode 1340 in response to receiving a user input from the user interface device 1202.

When the concrete mixer truck 600 is in the site mode 1340, the mode controller 1204 may generate commands or control signals for the drum assembly controller 752, the mixer drum 702, the chute 712, and/or the vehicle drive system 620 to facilitate a fully-autonomous or semi-autonomous discharge or pouring of the concrete to a jobsite, or a specific area. For example, the concrete mixer truck 600 can operate to control speed of the mixer drum 702, direction of rotation of the mixer drum 702, rotation angle of the chute 712, lift angle of the chute 712, whether or not one or more chutes are extended or unfolded (e.g., by operation of a hydraulic, pneumatic, or electric system) for autonomous pouring of the concrete.

In some embodiments, the mode controller 1204 is configured to receive information regarding the jobsite (e.g., from a user input, from the cloud computing system 1346, when at the concrete plant, etc.) and use the information to autonomously pour concrete. In some embodiments, the information regarding the jobsite includes one or more geofences, geozones, or areas where concrete should be poured, a depth of concrete to be poured, a type of concrete to be poured, etc.). Based on the information, the mode controller 1204 can adjust speed of the mixer drum 702, operation of the chute 712, etc., to pour concrete at the jobsite into the correct location or across the one or more areas. For example, feedback from a position or angle sensor of the chute 712 may be used by the mode controller 1204 to direct the chute 712 to pour concrete at a consistent depth across a patio, zone, area, slab, etc. In some embodiments, the mode controller 1204 also controls the vehicle drive system 620 to automatically cause the concrete mixer truck 600 to stop, drive forwards, drive in reverse, turn, etc., to facilitate proper dispensing or pouring of the concrete for the one or more areas of the jobsite (e.g., to reposition the concrete mixer truck 600).

In some embodiments, the mode controller 1204 receives the one or more areas where concrete should be poured at a jobsite as a geofence on a map (e.g., drawn on a map by an individual). The mode controller 1204 can autonomously facilitate transportation of the concrete mixer truck 600 to the one or more areas using the map and the geolocation provided by the geosystem 1344. The mode controller 1204 can also use information for the one or more areas indicating required depth of concrete to autonomously operate the concrete mixer truck 600 to pour the concrete at the required depth. In some embodiments, the mode controller 1204 is configured to determine where to pour the concrete based on data received from a visual sensor, camera, etc. The mode controller 1204 can identify a visual indicator at the jobsite (e.g., shapes of forms) and may operate the concrete mixer truck 600 to pour the concrete until the forms are full. In some embodiments, the mode controller 1204 is configured to determine where to pour concrete based on a signal from an operator (e.g., an individual at the jobsite holding a symbol or signal generator that the mode controller 1204 identifies). For example, the symbol or signal generator can be an orange circle which can be identified by the mode controller 1204 using a camera. The operator may move the visual indicator (e.g., the orange circle) and the mode controller 1204 or concrete mixer truck 600 can track and follow the visual indicator to facilitate pouring the concrete. The visual indicator may be moved to direct flow of pouring of the concrete or to indicate an extent of the area that requires concrete.

Referring particularly to FIG. 17, a diagram 1700 depicts the functionality of the autonomous modes 1336. Diagram 1700 illustrates a plant area 1702 and a jobsite 1704 that are at different geographic locations. The concrete mixer truck 600 or controllers thereof may wirelessly communicate with a geolocation system 1710 (e.g., a cloud computing system, a satellite, a GPS system, etc.). The geolocation system 1710 can implement any of the functionality of system 300, or may be geosystem 1344 (or vice versa). When the concrete mixer truck 600 is geographically located at the plant area 1702, the concrete mixer truck 600 can be transitioned into the plant mode 1338 (e.g., automatically). The concrete mixer truck 600 may automatically transport itself beneath a filling station 1712 and communicate with local controllers at the filling station 1712 to facilitate autonomous filling and mixing of the mixer drum 702 of the concrete mixer truck 600.

The concrete mixer truck 600 can then transport along a route 1708 to the jobsite 1704. In some embodiments, the concrete mixer truck 600 is configured to be driven by an operator along the route 1708 and can be tracked by the geolocation system 1710 as it transports along the route 1708. In some embodiments, the mode controller 1204 is configured to autonomously transport the concrete mixer truck 600 along the route 1708 to the jobsite 1704.

When the concrete mixer truck 600 arrives at the jobsite 1704, the mode controller 1204 can transition the concrete mixer truck 600 into the site mode 1340. The jobsite 1704 includes one or more pour areas, shown as area 1706a and area 1706b. The concrete mixer truck 600 operates in the site mode 1340 to autonomously pour the concrete at the area 1706a and the area 1706b. In some embodiments, the concrete mixer truck 600 operates in the site mode 1340 to automatically pour the concrete at the areas 1706 and to transport between the area 1706a and the area 1706b.

Referring particularly to FIG. 18, a process 1800 for operating a concrete mixer truck according to various autonomous modes is shown, according to some embodiments. Process 1800 includes steps 1802-1816 and can be performed by the concrete mixer truck 600 and the mode controller 1204. In some embodiments, process 1800 facilitates autonomous filling, mixing, and pouring of a concrete material.

Process 1800 includes providing a concrete mixer truck that is transitionable between at least a first autonomous mode and a second autonomous mode (step 1802), according to some embodiments. In some embodiments, the concrete mixer truck is the concrete mixer truck 600. In some embodiments, the first autonomous mode is the plant mode 1338 to facilitate autonomous operations at a concrete plant. In some embodiments, the second autonomous mode is the site mode 1340 to facilitate the performance of autonomous operations at a site (e.g., automatic pouring).

Process 1800 includes detecting one or more conditions indicating that the concrete mixer is at a concrete plant (step 1804), according to some embodiments. In some embodiments, step 1804 includes detecting one or more conditions that indicate that the concrete mixer truck should be transitioned into the first autonomous mode. The one or more conditions can be sensor data indicating a relative position of the concrete mixer truck, a geotracking data indicating a geographic location of the concrete mixer, a chassis signal, a user input, communications with a plant controller or system, near field communications, wireless communications, proximity data (e.g., relative location between the concrete mixer truck and a fill location), etc. Step 1804 can be performed by the mode controller 1204.

Process 1800 includes transitioning the concrete mixer truck into the first autonomous mode (step 1806) in response to detecting the one or more conditions, according to some embodiments. In some embodiments, step 1806 is performed by the mode controller 1204. Step 1806 can be performed for subsequent autonomous actions in the first autonomous mode to facilitate automatic filling, mixing, etc., of a mixer drum of the concrete mixer truck.

Process 1800 includes operating the concrete mixer truck in the first autonomous mode to automatically fill a mixer drum of the truck and mix a slurry material (step 1808), according to some embodiments. Step 1808 can be performed by the mode controller 1204, the drum assembly controller 752, the mixer drum 702, the chute 712, the washout system 714, and/or the vehicle drive system 620. Step 1808 can include positioning the concrete mixer truck beneath a fill station, and initiating mixing once sensor data or a command indicates that the mixer drum has been filled. Once the mixer drum has been filled, the mode controller 1204 may operate the mixer drum to rotate to mix the slurry material. Step 1808 can also include operating a washout system after the slurry material has been sufficiently mixed.

Process 1800 includes transporting the concrete mixer truck to a jobsite (step 1810), according to some embodiments. In some embodiments, step 1810 is performed manually by a driver (e.g., driving the concrete mixer truck to the jobsite). In some embodiments, step 1810 is performed autonomously by an autonomous drive system of the concrete mixer truck which may communicate with a geolocation system.

Process 1800 includes detecting one or more conditions that indicate that the concrete mixer truck is at the jobsite or is at a pour area of the jobsite (step 1812), according to some embodiments. In some embodiments, the one or more conditions include sensor data (e.g., camera data) indicating that the concrete mixer truck is at the jobsite, a user input that the concrete mixer truck is at the jobsite, geolocation data indicating that the concrete mixer truck is at the jobsite, etc. Step 1812 can be performed by the mode controller 1204.

Process 1800 includes transitioning the concrete mixer truck into the second autonomous mode (step 1814), according to some embodiments. In some embodiments, step 1814 is performed in response to step 1812. In some embodiments, step 1814 is performed by the mode controller 1204. Step 1814 can include re-configuring the mode controller 1204 for controlling the concrete mixer truck to autonomously perform various pouring operations.

Process 1800 includes operating the concrete mixer truck in the second autonomous mode to automatically pour the slurry material (step 1816), according to some embodiments. In some embodiments, step 1816 is performed by mode controller 1204. Step 1816 can include operating a mixer drum (or a drum drive system) and various motors, engines, etc., thereof, in combination a chute to pour the slurry material (e.g., discharge from the mixer drum) to or across the pour area of the jobsite. In some embodiments, step 1816 is performed to fully or semi-autonomously pour the slurry material or concrete to different pour areas or jobsites.

Automatic Chute Control and Concrete Placement

Referring particularly to FIGS. 19-22, the concrete mixer truck 600 can be configured to implement the techniques described herein to automatically control the chute to pour the concrete or discharge the slurry material from the mixer drum 702. The concrete mixer truck 600 can include a system to operate positioning and angle based on real-time sensor data indicating a relative position of a form into which the concrete or slurry material is to be formed.

Figure 19:
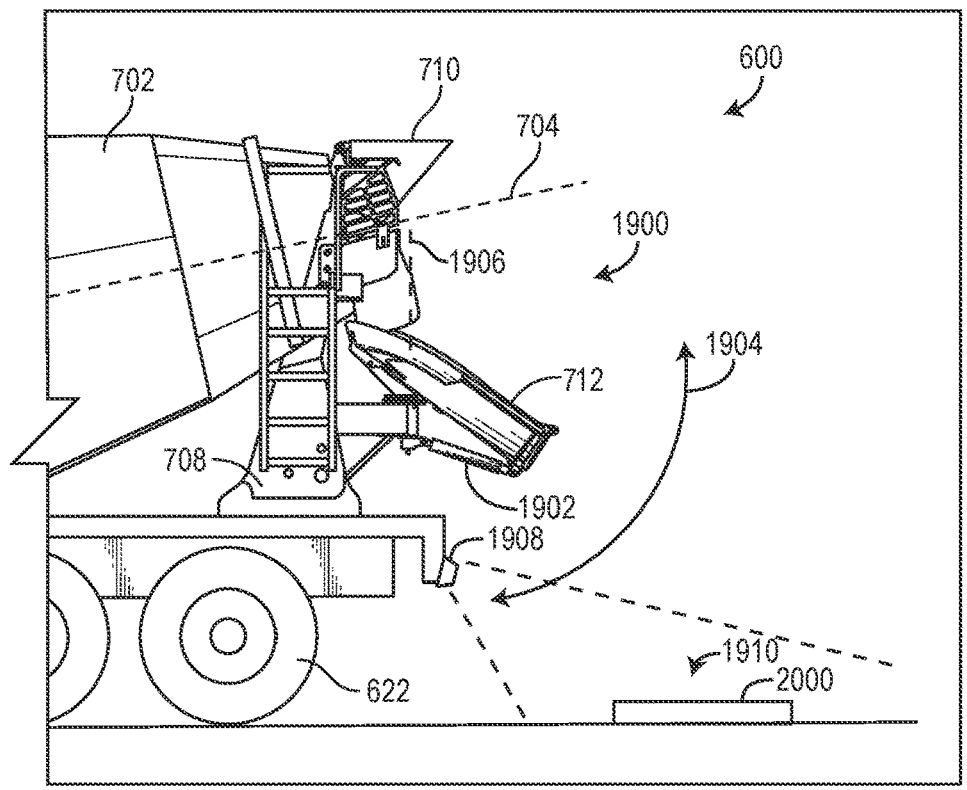
FIG. 19 is a side view of a concrete mixer truck including an electronic control system for autonomous operation of a chute of the concrete mixer truck to pour a slurry material to a jobsite, according to an exemplary embodiment.
Figure 22:
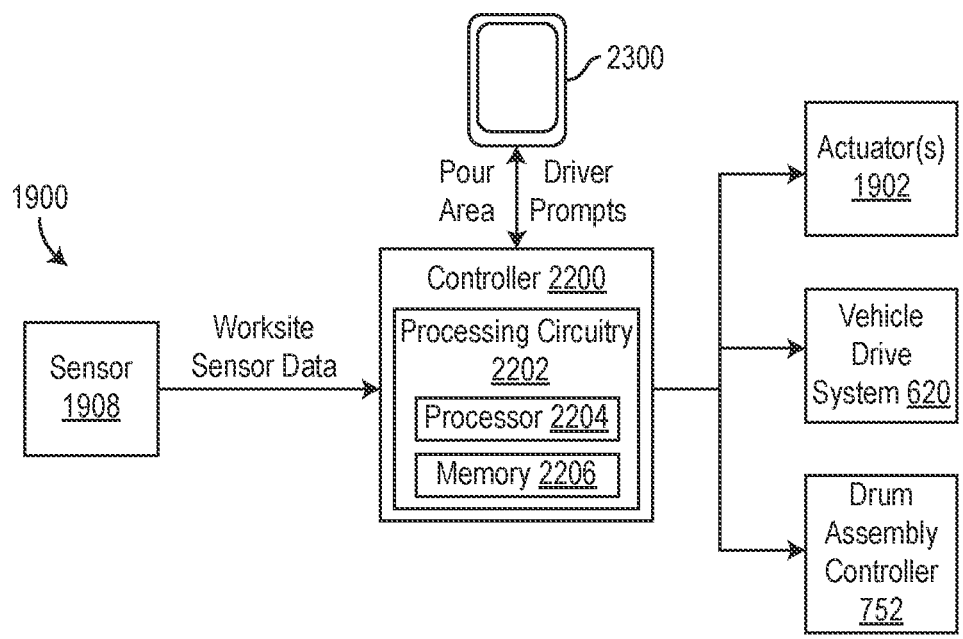
FIG. 22 is a block diagram of the electronic control system of FIG. 19, according to an exemplary embodiment.

Referring particularly to FIGS. 19 and 22, the concrete mixer truck 600 includes an electronic control system 1900, according to an exemplary embodiment. The electronic control system 1900 can be a part of the drum control system 750 or may integrate with the drum control system 750. In some embodiments, the electronic control system 1900 includes the chute 712. The electronic control system 1900 is configured to operate the chute 712 to rotate upwards or downwards (e.g., in direction 1904) and/or about an axis 1906. In some embodiments, any of the functionality of the electronic control system 1900 as described herein is implemented by mode controller 1204.

The electronic control system 1900 also includes one or more sensors 1908 that are configured to obtain sensor data, image data, etc., of a pour site 1910. The pour site 1910 may be a jobsite or an area where concrete or slurry material is to be discharged. The pour site 1910 can include a form 2000 into which the concrete or slurry material is to be poured. The sensor 1908 can be or include a radar sensor, a camera, an ultrasonic sensor, a lidar sensor, a GPS sensor, etc., and may be configured to detect, measure, obtain, etc., geometry, relative distance, topology, etc., of the pour site 1910. In some embodiments, the sensor 1908 is configured to detect relative location and geometry of the form 2000.

The electronic control system 1900 also includes one or more actuators 1902. The one or more actuators 1902 can be configured to change the position, extension, rotation, angle, etc., of the chute 712 to adjust a discharge direction or destination of the slurry material or concrete in the mixer drum 702 (e.g., as the concrete mixer truck 600 operates to discharge the slurry material). In some embodiments, the one or more actuators 1902 include a hydraulic actuator, an electric actuator, an electric motor, an engine, a pneumatic actuator, etc., configured to drive the chute 712 (e.g., upwards and downwards in direction 1904 and/or about axis 1906 in either direction). The electronic control system 1900 also includes a controller 2200 that is configured to obtain sensor data from the one or more sensors 1908 and operate the chute 712 (e.g., orientation, position, extension, angle, rotation, movement, etc.) based on the sensor data. The controller 2200 can be the same as or similar to the mode controller 1204. In some embodiments, the controller 2200 is configured to integrate or communicate with the mode controller 1204 to receive commands from the mode controller 1204 for operation of the chute 712. In some embodiments, operation of the chute 712 (e.g., by the controller 2200 or through operation of the actuators 1902) is tied with operation of the mixer drum 702, so that the chute 712 and the mixer drum 702 operate cooperatively to discharge the slurry material to the pour site 1910.

Advantageously, the sensor(s) 1908 can be configured to detect the pour site 1910 (e.g., a work area) and its environment. The electronic control system 1900 (e.g., a chute, discharge, or pouring control system) can be configured to automatically or autonomously operate discharge of the slurry material (e.g., operation of the chute 712) based on the detection of the pour site 1910 and its environment. In some embodiments, the techniques or functionality described herein with regards to the electronic control system 1900 can be implemented by mode controller 1204 when the concrete mixer truck is in the site mode 1340. The electronic control system 1900 can also be configured to control or operate speed of the mixer drum 702, and/or direction of rotation of the mixer drum 702. In some embodiments, the electronic control system 1900 (e.g., the controller 2200) is configured to determine an amount of concrete or slurry material to be dispensed or discharged (e.g., based on the sensor data obtained from the sensors 1908). In some embodiments, the sensor data obtained from the sensors 1908 can include detection of individuals or people at the pour site 1810 and/or ground level and/or terrain (e.g., surface topology) of the pour site 1910. Advantageously, the electronic control system 1900 facilitates automatic or autonomous discharge and pouring of concrete/slurry material, provides improved safety (e.g., by detecting if people are present at the pour site 1910 or proximate the chute 712 and implementing one or more safety features), reduces a required skill level for the driver/operator, and reduces a need for an operator to be at the chute 712 or proximate the pour site 1910 during concrete pouring.

The controller 2200 can be configured to receive the sensor data (e.g., worksite sensor data) from the sensors 1908, and desired pour area data from a user device 2300. The desired pour area data may be a user input received from the user device 2300 indicating an area and depth where concrete or slurry material should be discharged. The controller 2200 is configured to generate control signals for any of the actuators 1902, the vehicle drive system 620 (e.g., to pull the vehicle forwards as the concrete or slurry material is discharged), or the drum assembly controller 752. The controller 2200 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to an exemplary embodiment, the controller 2200 includes processing circuitry 2202 having a processor 2204 and memory 2206. The processing circuitry 2202 may include an ASIC, one or more FPGAs, a DSP, circuits containing one or more processing components, circuitry for supporting a microprocessor, a group of processing components, or other suitable electronic processing components. In some embodiments, the processor 2204 is configured to execute computer code stored in the memory 2206 to facilitate the activities described herein. The memory 2206 may be any volatile or non-volatile computer-readable storage medium capable of storing data or computer code relating to the activities described herein. According to an exemplary embodiment, the memory 2206 includes computer code modules (e.g., executable code, object code, source code, script code, machine code, etc.) configured for execution by the processor 2204.

Figure 20:
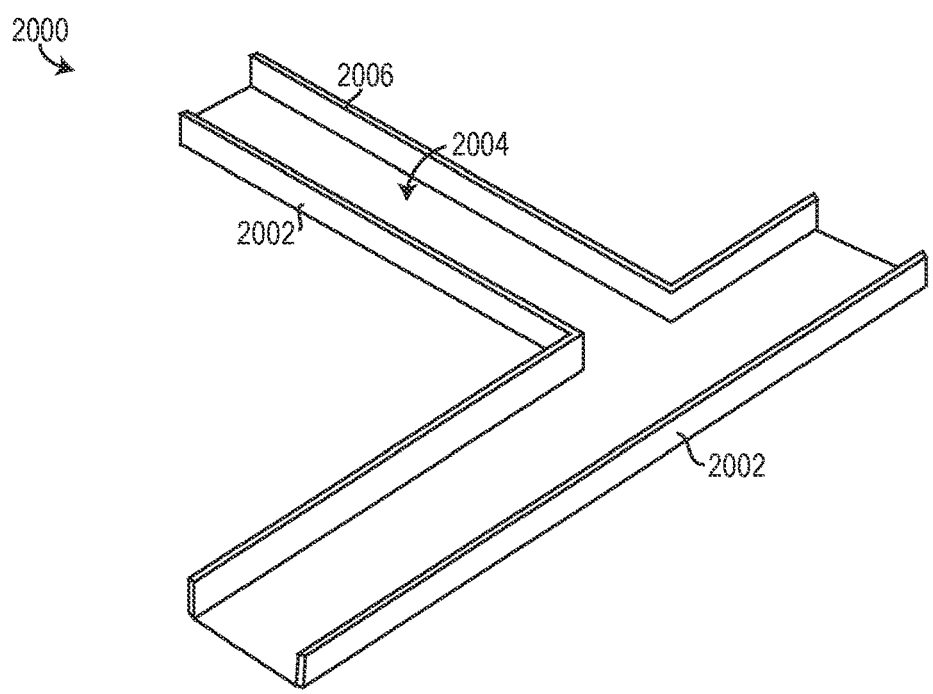
FIG. 20 is a perspective view of a form or structure that can be positioned at the jobsite of FIG. 19, according to an exemplary embodiment.

Referring particularly to FIG. 20, the form 2000 is shown, according to an exemplary embodiment. The form 2000 includes sidewalls 2002 which may rest upon a ground surface at the pour site 1910. The sidewalls 2002 can define a space, area, volume, etc., shown as volume 2004 into which concrete or slurry material is to be poured. In some embodiments, the sensor(s) 1908 are configured to obtain data indicating the different positions, height, geometry, etc., of the sidewalls 2002, or more generally, the form 2000. In some embodiments, a top surface 2006 of the form 2000 includes a reflective material, a color coating, a reflective tape, etc. Advantageously, the top surface 2006 can be identified by the controller 2200 based on the sensor data obtained from sensors 1908 to identify boundaries or peripheries of the form 2000. In some embodiments, the controller 2200 is configured to perform an image analysis or image processing technique to identify the top surfaces 2006, edges, etc., and boundaries of the form 2000, or the sidewalls 2102 of the form 2000. The form 2000 can generally be a structure that stands upright from the ground surface to form a path, area, space, etc., where the concrete or slurry material can be poured. The form 2000 can have any shape (e.g., rectangular, irregular, etc.). The reflective tape on the top surface 2006 may be optional and, if used, can improve accuracy of the determination of the boundaries of the form 2000.

Figure 21:
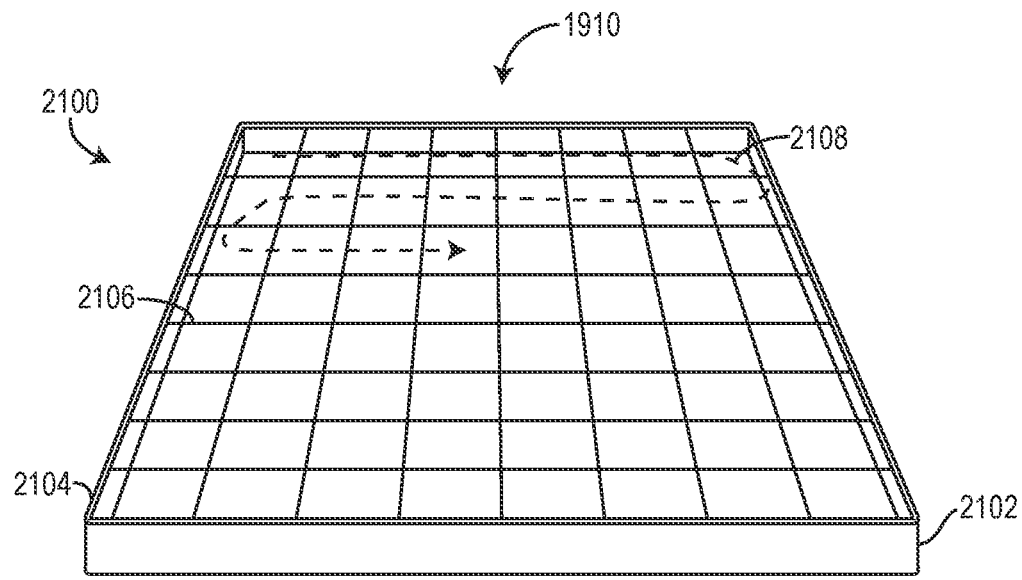
FIG. 21 is a perspective view of another form or structure that can be positioned at the jobsite of FIG. 19, according to an exemplary embodiment.
Figure 23:
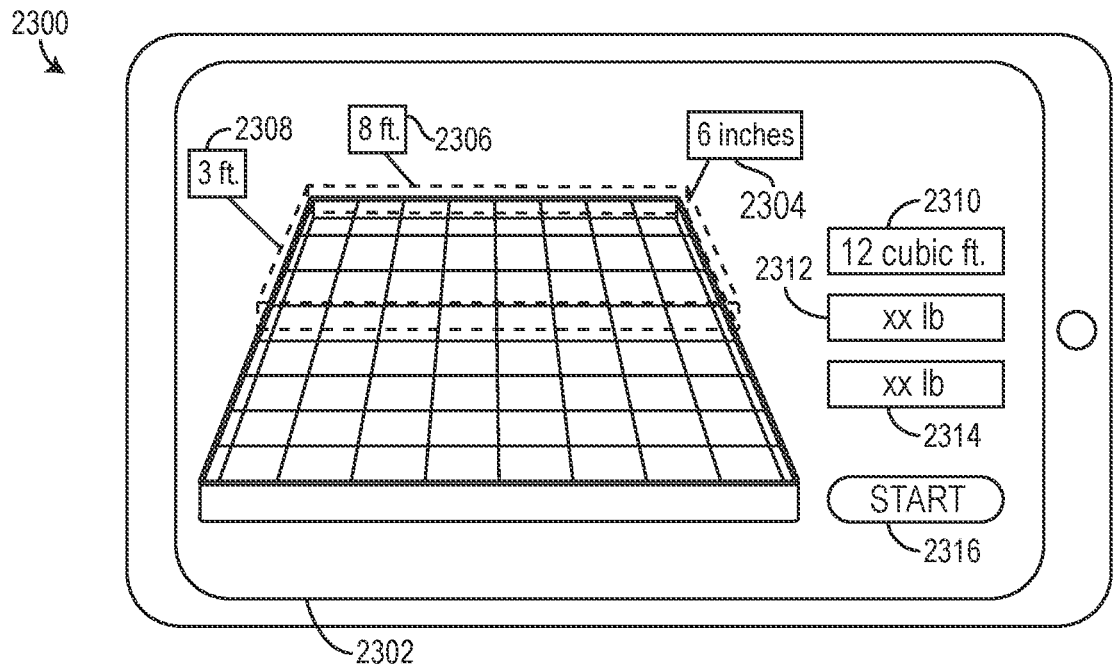
FIG. 23 is a depiction of a user input device of the electronic control system of FIGS. 19 and 22, according to an exemplary embodiment.

Referring particularly to FIGS. 21 and 23, the form 2000 can be provided as form 2100. Form 2100 is shown as rectangular area including reinforcement 2106 (e.g., metal bars). Form 2100 includes sidewalls 2102 that define an inner volume or pour area therebetween. The controller 2200 can be configured to generate control signals for the actuators 1902, the vehicle drive system 620, and the drum assembly controller 752 to cause the chute 712 to follow a path 2108 while dispensing slurry material or concrete (e.g., into the form 2100). The controller 2200 can also use user inputs obtained from the user device 2300 (e.g., a personal computer device, a tablet, etc.) to determine the path 2108 and to determine a rate at which the concrete or slurry material should be discharged.

Referring particularly to FIG. 23, the user device 2300 can include a display screen 2302 (e.g., a touchscreen) for displaying the sensor data obtained from the sensor 1908, or a graphical representation of the pour site 1910. In some embodiments, the user or operator can provide different inputs (e.g., width, length, and depth) to define a pour volume of slurry material or concrete to be poured into the form 2100 or 2000. For example, the user can provide a length 2308, a width 2306, and a depth 2304. The length 2308, width 2306, and depth 2304 can be provided to the controller 2200 and can be used to determine the path 2108 for the chute 712, and a rate at which the slurry material or concrete should be discharged as the chute 712 is operated to travel along the path 2108. In some embodiments, the user device 2300 is configured to display a total volume 2310 of slurry material to be dispensed or poured based on the length 2308, the width 2306, and the depth 2304 as provided by the user. In some embodiments, the user device 2300 is configured to display an estimated weight 2312 of the slurry material or concrete to be dispensed. In some embodiments, the user device 2300 is configured to display an available weight 2314 of slurry material or concrete present in the mixer drum 702. If there is sufficient weight or amount of slurry material or concrete present in the mixer drum 702, the user may select a start button 2316 to initiate a fully-autonomous or semi-autonomous pouring process. The user device 2300 may be locally positioned at the concrete mixer truck 600 (e.g., in a cab) or may be positioned remotely. For example, the user inputs received at the user device 2300 can be remotely provided to the controller 2200.

Referring again to FIG. 22, the controller 2200 may determine control signals for the actuators 1902, the vehicle drive system 620, and the drum assembly controller 752 to pour the slurry material based on the sensor data obtained from the sensors 1908, and the user inputs received from the user device 2300, while accounting for any of slump of the slurry material (e.g., based on a slump sensor), discharge speed of the slurry material, an amount of concrete in the mixer drum 702, an amount of time that the concrete takes to transport along the chute 712, an amount of time for the concrete to travel from the mixer drum 702 to a bottom of the chute 712, an outdoor temperature, a temperature of the concrete or slurry material, or a truck angle. The controller 2200 can control the actuators 1902, the vehicle drive system 620, or the drum assembly controller 752 using sensor data that indicates speed of the mixer drum 702 and direction of rotation of the mixer drum 702. In some embodiments, the controller 2200 is configured to generate control signals for the vehicle drive system 620 to cause the concrete mixer truck 600 to drive forwards or backwards as required. In some embodiments, the controller 2200 prompts a driver to pull forwards or backwards (e.g., by providing driver prompts to the driver via a human machine interface positioned in a cab of the concrete mixer truck 600, the user device 2300, or the vehicle drive system 620) to achieve concrete pouring in a semi-autonomous manner. The controller 2200 can also provide feedback to the driver (e.g., real-time sensor data obtained from the sensor 1908) as the concrete is poured. The controller 2200 can also prompt the driver or an operator to provide the user inputs shown in FIG. 23 (e.g., a spatial area, a length, width, depth for the spatial area, etc.).

Figure 24:
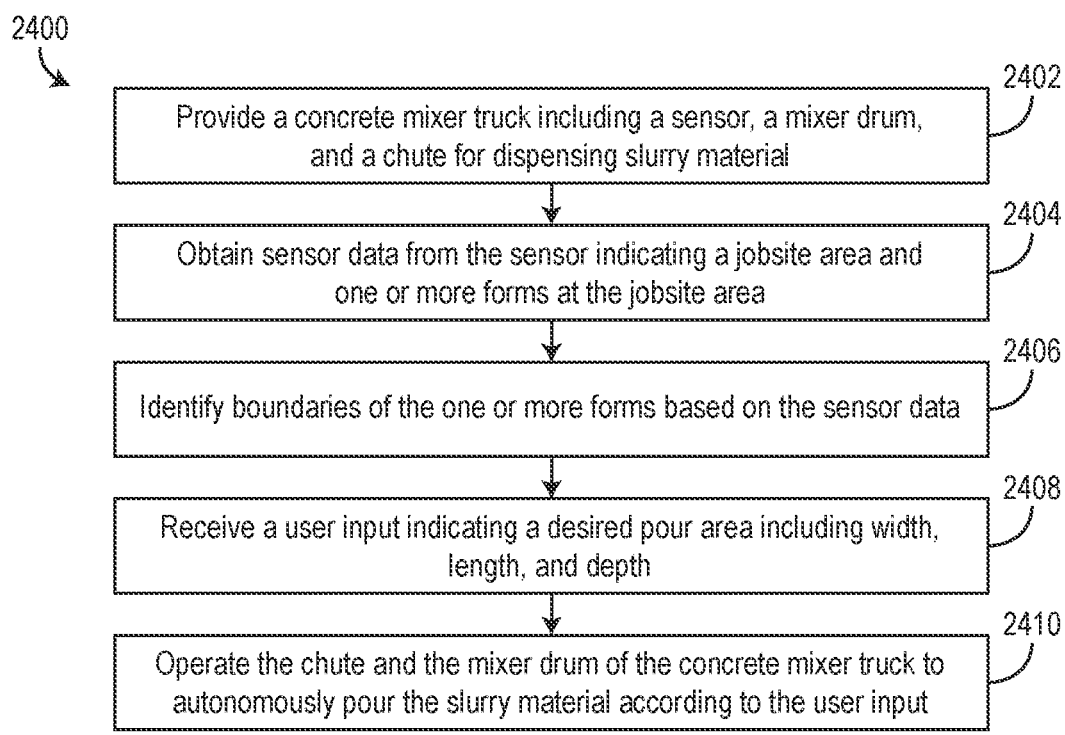
FIG. 24 is a flow diagram of a process for autonomously operating a chute and mixer drum of a concrete mixer truck to pour a slurry material, according to an exemplary embodiment.

Referring particularly to FIG. 24, a process 2400 for automatically pouring concrete from a concrete mixer truck is shown, according to an exemplary embodiment. Process 2400 includes steps 2402-2410 and can be performed by the concrete mixer truck 600, or electronic control system 1900 as described in greater detail above. In some embodiments, process 2400 is performed as step 1816 of process 1800.

Process 2400 includes providing a concrete mixer truck including a sensor, a mixer drum, and a chute for dispensing slurry material (step 2402), according to some embodiments. In some embodiments, the concrete mixer truck is the concrete mixer truck 600. In some embodiments, the sensor is or includes the sensors 1908. In some embodiments, the sensor is configured to obtain data of a jobsite, work area, pour area, zone, etc., proximate a discharge portion of the concrete mixer truck (e.g., where the slurry material will be dispensed from). In some embodiments, the sensor is a camera, a radar system, a LIDAR system, a scanning system, etc., configured to obtain sensor data indicating an environment, surface topology, etc., of the jobsite where the slurry material is to be dispensed. In some embodiments, the sensor data also indicates boundaries of one or more forms, structure, etc., positioned at the jobsite, into which the slurry material is to be poured.

Process 2400 includes obtaining sensor data from the sensor indicating the jobsite area and one or more forms at the jobsite area (step 2404), according to some embodiments. In some embodiments, step 2404 is performed by the sensors 1908 and the controller 2200. In some embodiments, the sensor data is image or camera data (e.g., obtained from a real-time video camera that is directed towards the jobsite area).

Process 2400 includes identifying boundaries of the one or more forms based on the sensor data (step 2406), according to some embodiments. In some embodiments, the one or more forms include a reflective material (e.g., a reflective tape) positioned along a top edge or surface of the one or more forms to facilitate identifying the boundaries of the one or more forms. In some embodiments, step 2406 is performed by the controller 2200. In some embodiments, step 2406 includes performing an image analysis technique, or otherwise analyzing the sensor data (e.g., depending on a type of sensor that the sensor data originates from) to identify the boundaries of the one or more forms. In some embodiments, step 2406 includes presenting the identified boundaries to a user or operator (e.g., on the user device 2300) and prompting or requesting a confirmation from the user. Step 2406 can also include allowing the user or operator to adjust the boundaries and provide a user input indicating that the automatically identified boundaries and/or manually updated boundaries are correct.

Process 2400 includes receiving a user input indicating a desired pour area including width, length, and depth (step 2408), according to some embodiments. In some embodiments, the user input is received from an operator, technician, user, etc., at a user device (e.g., a tablet having a display screen) such as user device 2300. In some embodiments, the user input includes a specific area of the one or more forms across which the slurry material should be poured. The user input can include the width, length, and depth of the specific area. In some embodiments, step 2408 is optional and process 2400 can be performed to deposit or pour the slurry material into an area within the boundaries identified in step 2406.

Process 2400 includes operating the chute and the mixer drum of the concrete mixer truck to autonomously pour the slurry material according to the user input (step 2410), according to some embodiments. In some embodiments, step 2410 includes operating or controlling the chute and the mixer drum of the concrete mixer truck to pour the slurry material across the specific area at the depth as indicated in the user input. In some embodiments, step 2410 is performed by the controller 2200 by providing control signals to any of the actuators 1902, the vehicle drive system 620, or the drum assembly controller 752. In some embodiments, step 2410 can include adjusting an angle of the chute of the concrete mixer truck to follow a path across the specific area. The chute can be controlled through operation of one or more electric motors, actuators, engines, etc., to rotate the chute (e.g., the chute 712) side to side and/or up and down. In some embodiments, step 2410 also includes operating a drive system of the concrete mixer truck to control the concrete mixer truck to pull forwards or backwards (e.g., to facilitate dispensing or pouring the slurry material along the path). In some embodiments, step 2410 includes prompting a driver to pull the concrete mixer truck forwards or rearwards (e.g., in a semi-autonomous implementation). In some embodiments, step 2410 includes controlling rotational speed of the mixer drum to pour the slurry material to the jobsite according to the depth specified in step 2408.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for tracking refuse collection vehicles, the system comprising:
   one or more memory devices having instructions stored thereon that, when executed by one or more processors, cause the one or more processors to perform operations comprising:
   receiving, from a user device operated by a customer of a refuse collection company, a first user input indicating one or more parameters of a geofence, the geofence defining a virtual perimeter around a geographical location of a stop along a collection route for refuse pickup in which the customer allows initiation of access, by a refuse collection vehicle of the refuse collection company, to an area in which a waste receptacle is positioned;
   determining whether the refuse collection vehicle is within the virtual perimeter of the geofence based on cellular communications obtained via a cellular network from the refuse collection vehicle, the cellular communications including a current location of the refuse collection vehicle;
   transmitting, to the user device, a first notification based on a determination that the refuse collection vehicle is within the geofence, the first notification indicating to a user of the user device that the refuse collection vehicle is within the geofence and is approaching the stop along the collection route; and
   in response to the refuse collection vehicle being within the geofence, transmitting a command to an access control system that is at the stop along the collection route, the command initiating operation of an actuator of the access control system to open a door or gate to allow access to the area in which the waste receptacle is positioned while the refuse collection vehicle is en route to the area such that the door or gate is open when the refuse collection vehicle arrives at the door or gate;
   wherein the one or more processors are remote from the stop along the collection route and wherein the refuse collection vehicle does not communicate directly with the access control system at the stop along the collection route.

2. The system of claim 1, wherein the first notification is transmitted to the user device by at least one of a text message, a push notification, an automated phone call, or an email.

3. The system of claim 1, wherein the first notification further indicates a distance of the refuse collection vehicle from a central point of the geofence.

4. The system of claim 1, the operations further comprising transmitting, to the user device, a second notification based on a determination that the refuse collection vehicle has left the geofence.

5. The system of claim 1, wherein the one or more parameters of the geofence comprise a central location for the geofence and a radius of the geofence.

6. The system of claim 1, the operations further comprising:
   presenting, via a user interface, a map of an area based on a second user input of an address; and
   receiving, via the user interface, a third user input defining one or more boundaries of the geofence within the map.

7. The system of claim 1, wherein the refuse collection vehicle comprises a global positioning system (GPS) transceiver, wherein the current location of the refuse collection vehicle is determined based on GPS data received by the one or more processors from the refuse collection vehicle.

8. The system of claim 1, wherein the refuse collection vehicle comprises a cellular network transceiver, wherein the current location of the refuse collection vehicle is triangulated based on signals from one or more cellular towers.

9. A method for tracking a refuse collection vehicle, the method comprising:
   receiving, by a server and from a user device operated by a customer of a refuse collection company, a first user input indicating one or more parameters of a geofence, the geofence defining a virtual perimeter around a geographical location of a stop along a collection route for refuse pickup in which the customer allows initiation of access, by the refuse collection vehicle of the refuse collection company, to an area in which a waste receptacle is positioned;

determining, by the server, whether the refuse collection vehicle is within the virtual perimeter of the geofence based on cellular communications obtained via a cellular network from the refuse collection vehicle, the cellular communications including a current location of the refuse collection vehicle;

transmitting, by the server to the user device, a first notification based on a determination that the refuse collection vehicle is within the geofence, the first notification indicating to a user of the user device that the refuse collection vehicle is within the geofence and is approaching the stop along the collection route; and in response to the refuse collection vehicle being within the geofence, transmitting, by the server to an access control system that is at the stop along the collection route, a command initiating operation of an actuator of the access control system to open a door or gate to allow access to the area in which the waste receptacle is positioned while the refuse collection vehicle is en route to the area such that the door or gate is open when the refuse collection vehicle arrives at the door or gate;

wherein the server is remote from the stop along the collection route and wherein the refuse collection vehicle does not communicate directly with the access control system at the stop along the collection route.

10. The method of claim 9, wherein the first notification is transmitted to the user device by at least one of a text message, a push notification, an automated phone call, or an email.

11. The method of claim 9, wherein the first notification further indicates a distance of the refuse collection vehicle from a central point of the geofence.

12. The method of claim 9, further comprising transmitting, by the server to the user device, a second notification based on a determination that the refuse collection vehicle has left the geofence.

13. The method of claim 9, wherein the one or more parameters of the geofence comprise a central location for the geofence and a radius of the geofence.

14. The method of claim 9, further comprising:
presenting, via a user interface, a map of an area based on a second user input of an address; and
receiving, via the user interface, a third user input defining one or more boundaries of the geofence within the map.

15. The method of claim 9, wherein the refuse collection vehicle comprises a global positioning system (GPS) transceiver, wherein the current location of the refuse collection vehicle is determined based on GPS data received by the server from the refuse collection vehicle.

16. A device comprising:
a user interface;
one or more processors; and
one or more memory devices having instructions stored thereon that, when executed by the one or more processors, cause the one or more processors to:
receive, via the user interface operated by a customer of a refuse collection company, a first user input indicating one or more boundaries of a geofence, the geofence defining a virtual perimeter around a geographical location of a stop along a collection route of a refuse collection vehicle in which the customer allows initiation of access, by the refuse collection vehicle of the refuse collection company, to an area in which a waste receptacle is positioned, the geofence configured to trigger a server to transmit, in response to the refuse collection vehicle being within the geofence, a command to an access control system, the command initiating operation of an actuator of the access control system to open a door or gate to allow access to the area in which the waste receptacle is positioned while the refuse collection vehicle is en route to the area such that the door or gate is open when the refuse collection vehicle arrives at the door or gate, wherein the server is remote from the access control system and the refuse collection vehicle communicates with the server and does not communicate directly with the access control system;
transmit the first user input to a remote server;
receive a first notification based on a determination that the refuse collection vehicle is within the geofence and is approaching the area, the first notification indicating a distance of the refuse collection vehicle from a central point of the geofence; and
receive a second notification based on a determination that the refuse collection vehicle has left the geofence.

17. The device of claim 16, wherein the first notification and the second notification are received as at least one of a text message, a push notification, an automated phone call, or an email.

18. The device of claim 16, further comprising:
presenting, via the user interface, a map of an area based on a current location of the device; and
receiving, via the user interface, the first user input defining the one or more boundaries of the geofence within the map.

* * * * *